US011833805B2

(12) United States Patent
Peck et al.

(10) Patent No.: US 11,833,805 B2
(45) Date of Patent: *Dec. 5, 2023

(54) BONDED LAMINATE INCLUDING A FORMED NONWOVEN SUBSTRATE

(71) Applicant: The Procter & Gamble Company, Cincinnati, OH (US)

(72) Inventors: Daniel Charles Peck, Mason, OH (US); John Brian Strube, Okeana, OH (US); Matthew William Waldron, Hamilton, OH (US); Jill Marlene Orr, Liberty Township, OH (US); Eric Bryan Bond, Maineville, OH (US)

(73) Assignee: The Procter & Gamble Company, Cincinnati, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/241,107

(22) Filed: Apr. 27, 2021

(65) Prior Publication Data

US 2021/0245475 A1    Aug. 12, 2021

Related U.S. Application Data

(63) Continuation of application No. 16/690,164, filed on Nov. 21, 2019, now Pat. No. 11,020,938.

(60) Provisional application No. 62/782,536, filed on Dec. 20, 2018.

(51) Int. Cl.
*B32B 7/10* (2006.01)
*B32B 5/08* (2006.01)
*B32B 23/10* (2006.01)

(52) U.S. Cl.
CPC .................. *B32B 7/10* (2013.01); *B32B 5/08* (2013.01); *B32B 23/10* (2013.01)

(58) Field of Classification Search
CPC .............. B32B 7/10; B32B 5/08; B32B 23/10
See application file for complete search history.

(56) References Cited

U.S. PATENT DOCUMENTS

| | | |
|---|---|---|
| 3,908,659 A | 9/1975 | Wehrmeyer |
| 3,955,022 A | 5/1976 | Sands |
| 5,518,801 A | 5/1996 | Chappell et al. |
| 5,522,811 A | 6/1996 | Igaue |
| 5,620,545 A | 4/1997 | Braun et al. |

(Continued)

FOREIGN PATENT DOCUMENTS

| | | |
|---|---|---|
| CA | 2448220 A1 | 1/2003 |
| CN | 1502736 A | 6/2004 |

(Continued)

OTHER PUBLICATIONS

All Office Actions, U.S. Appl. No. 16/690,164.
International Search Report and Written Opinion, PCT/US2019/062517, dated Feb. 13, 2020, 10 pgs.

*Primary Examiner* — Tahseen Khan
(74) *Attorney, Agent, or Firm* — William E. Gallagher; Sarah M. Decristofaro

(57) ABSTRACT

Bonded formed laminates, and methods for making bonded formed laminates, are made from multiple layers of formed substrates comprising at least one nonwoven formed substrate which are bonded together at the distal ends or bases of protrusions formed in the substrates. The bonded formed laminate provides a very soft and lofty structure that is sustainable under compression.

12 Claims, 26 Drawing Sheets

(56) References Cited

U.S. PATENT DOCUMENTS

| | | |
|---|---|---|
| 5,626,571 A | 5/1997 | Young |
| 5,656,232 A | 8/1997 | Takai |
| 5,691,035 A | 11/1997 | Chappell |
| 5,723,087 A | 3/1998 | Chappell |
| 5,891,544 A | 4/1999 | Chappell |
| 5,916,663 A | 6/1999 | Chappell |
| 6,010,766 A | 1/2000 | Braun |
| 6,027,483 A | 2/2000 | Chappell |
| 6,090,469 A | 7/2000 | Wadsworth |
| 6,395,957 B1 | 5/2002 | Chen et al. |
| 6,403,505 B1 | 6/2002 | Groitzsch et al. |
| 6,468,931 B1 | 10/2002 | Reeder |
| 6,481,484 B1 | 11/2002 | Isshiki |
| 6,716,514 B2 | 4/2004 | Nissing |
| 6,846,376 B2 | 1/2005 | Kobayashi |
| 7,410,683 B2 | 8/2008 | Curro |
| 7,527,615 B2 | 5/2009 | Roe |
| 7,691,760 B2 | 4/2010 | Bergsten |
| 7,829,173 B2 | 11/2010 | Turner |
| 8,021,591 B2 | 9/2011 | Curro |
| 8,053,074 B2 | 11/2011 | Miyamura |
| 8,357,445 B2 | 1/2013 | Hammons |
| 8,393,374 B2 | 3/2013 | Sato |
| 8,450,556 B2 | 5/2013 | Miyamoto |
| 8,524,355 B2 | 9/2013 | Nakaoka |
| 9,095,477 B2 | 8/2015 | Yamaguchi |
| 9,108,839 B2 | 8/2015 | Dijkema |
| 9,220,638 B2 | 12/2015 | Hammons |
| 9,222,206 B2 | 12/2015 | Yamaguchi et al. |
| 9,296,176 B2 | 3/2016 | Escaffre et al. |
| 9,498,794 B2 | 11/2016 | Heilman |
| 9,694,556 B2 | 7/2017 | Turner |
| 10,045,888 B2 | 8/2018 | Strube |
| 10,045,889 B2 * | 8/2018 | Strube ............... B32B 5/022 |
| 10,064,766 B2 * | 9/2018 | Orr ............... A61F 13/51104 |
| 10,182,949 B2 * | 1/2019 | Strube ............... B32B 5/26 |
| 2002/0150610 A1 | 10/2002 | Kono et al. |
| 2003/0096548 A1 | 5/2003 | Groitzsch |
| 2004/0142151 A1 | 7/2004 | Toyoshima et al. |
| 2005/0197027 A1 | 9/2005 | Crane |
| 2011/0039054 A1 | 2/2011 | Cabell |
| 2011/0250390 A1 | 10/2011 | Terada |
| 2014/0072767 A1 | 3/2014 | Klaska |
| 2015/0314555 A1 | 11/2015 | Cabell |
| 2016/0052228 A1 | 2/2016 | Larsen |
| 2016/0074251 A1 * | 3/2016 | Strube ............... A61F 13/51108 428/178 |
| 2016/0074253 A1 * | 3/2016 | Strube ............... B32B 5/06 428/171 |
| 2016/0074255 A1 * | 3/2016 | Strube ............... D04H 13/001 428/166 |
| 2016/0075122 A1 * | 3/2016 | Strube ............... B32B 38/06 156/91 |
| 2016/0076184 A1 * | 3/2016 | Orr ............... A61F 13/51104 428/178 |
| 2020/0198293 A1 | 6/2020 | Peck et al. |

FOREIGN PATENT DOCUMENTS

| | | |
|---|---|---|
| CN | 201102327 Y | 8/2008 |
| CN | 105147460 A | 12/2015 |
| CN | 106714747 A | 5/2017 |
| CN | 106714756 A | 5/2017 |
| CN | 107072835 A | 8/2017 |
| CN | 107073869 A | 8/2017 |
| CN | 108025536 A | 5/2018 |
| DE | 4237298 A1 | 4/1994 |
| EP | 0626159 A2 | 8/2013 |
| EP | 1397101 B1 | 2/2016 |
| EP | 1227181 B1 | 11/2017 |
| GB | 2268757 A | 1/1994 |
| IN | 193993 B | 5/2006 |
| JP | 10245757 A | 9/1998 |
| JP | 2005334374 A | 12/2005 |
| JP | 2009263811 A | 11/2009 |
| KR | 102036670 | 10/2019 |
| WO | 9506770 A1 | 3/1995 |
| WO | 0300487 A2 | 1/2002 |
| WO | 201598373 A1 | 1/2003 |
| WO | 2012176656 A1 | 12/2012 |
| WO | 2016040120 A1 | 3/2016 |

* cited by examiner

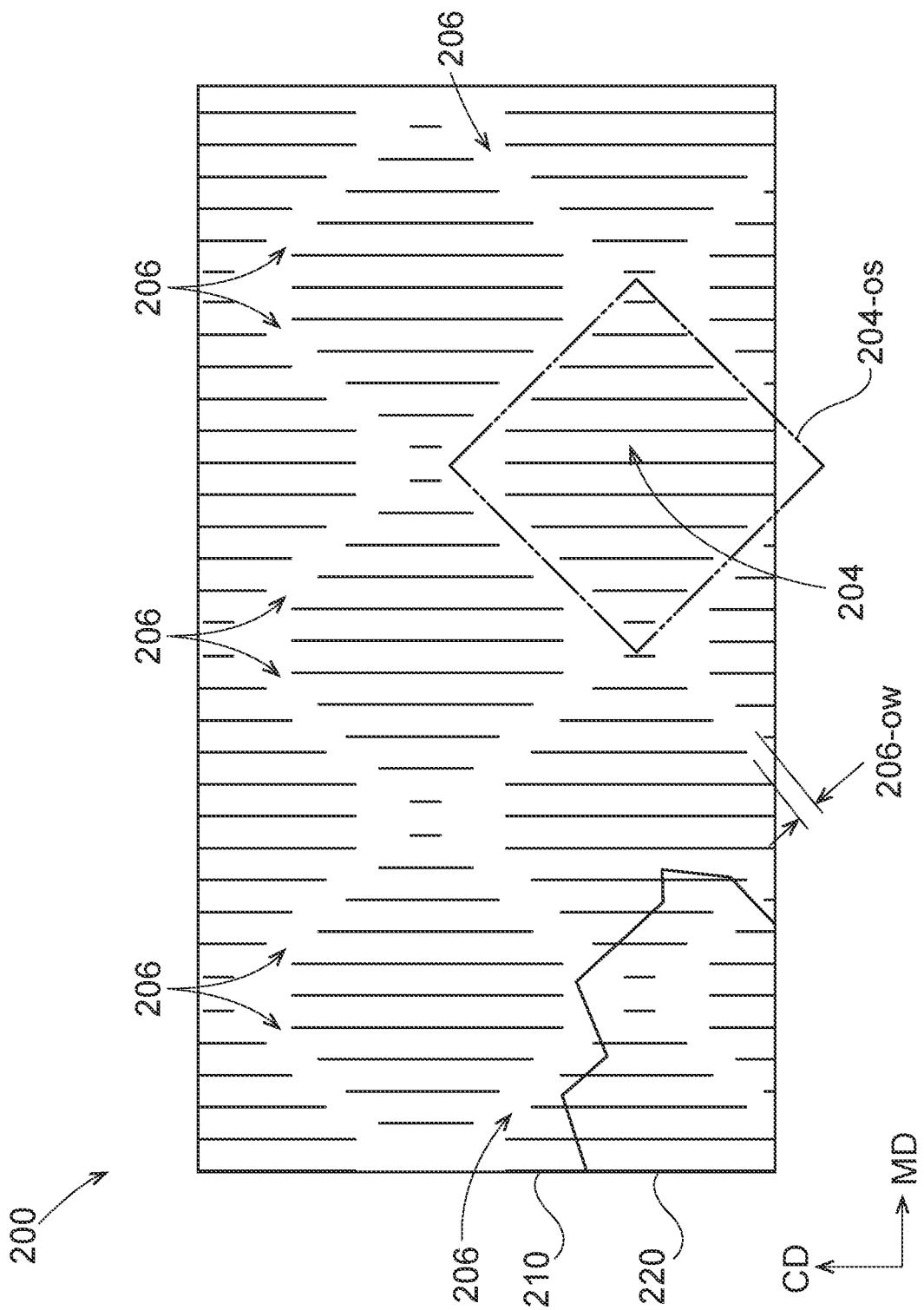

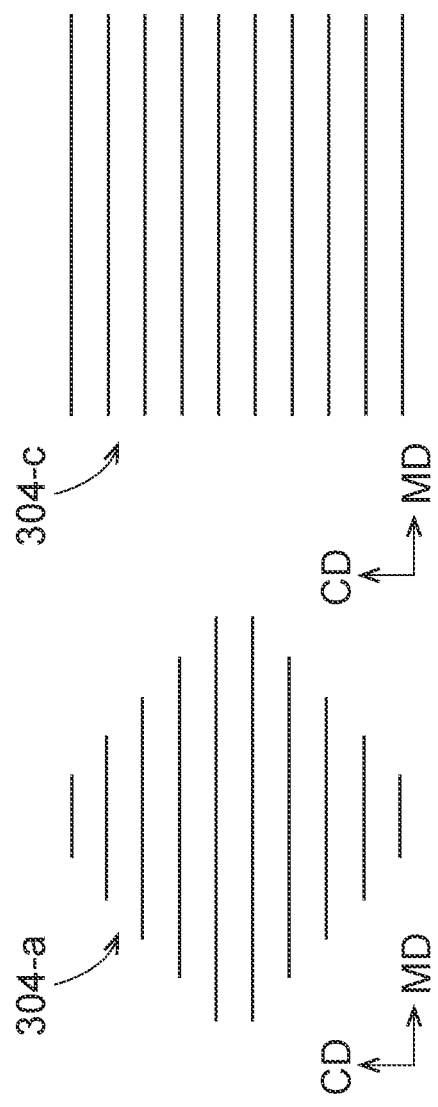
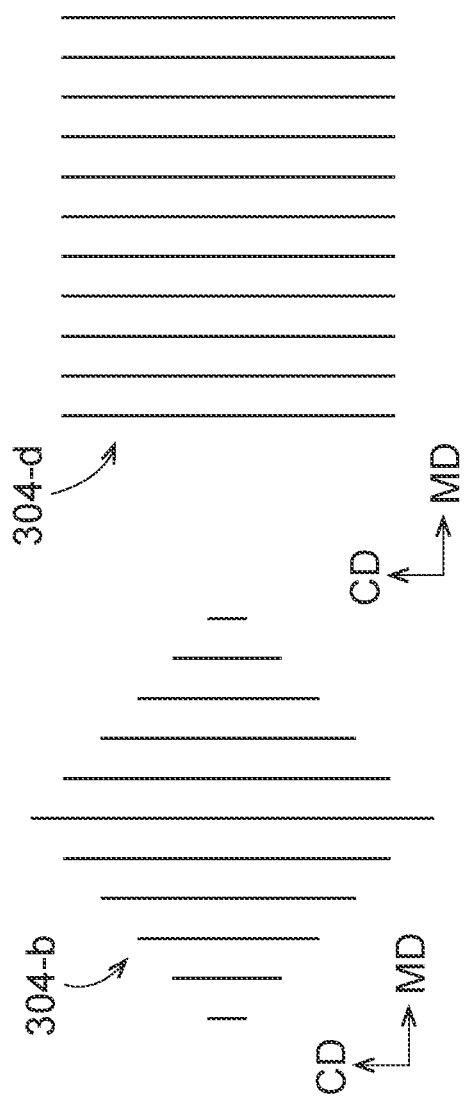

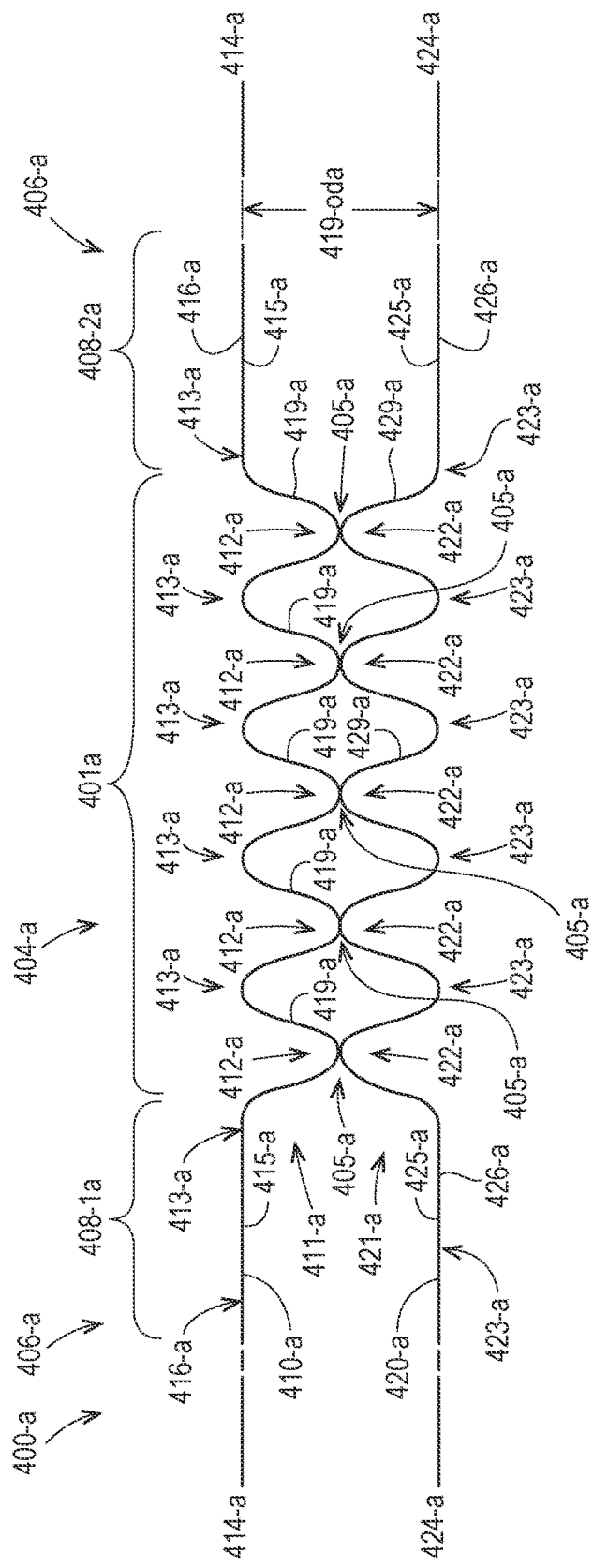
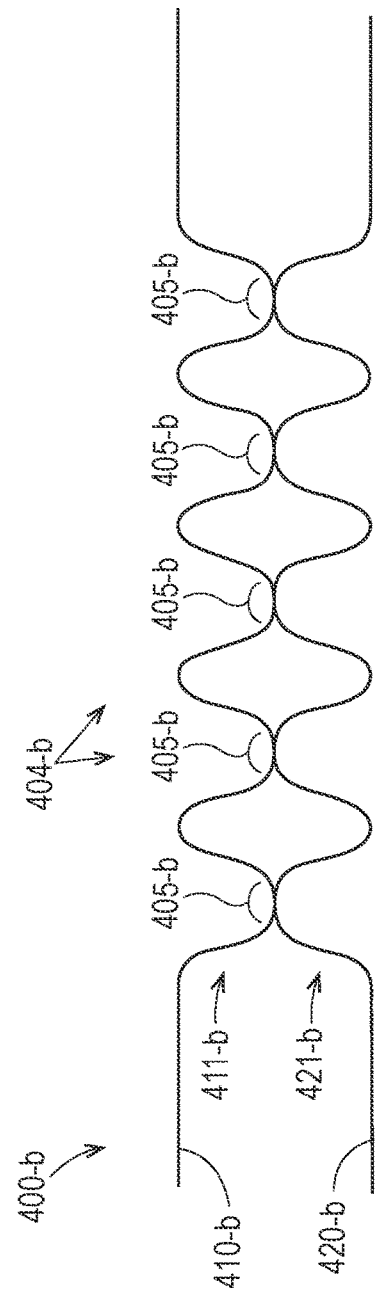
FIG. 4A
FIG. 4B

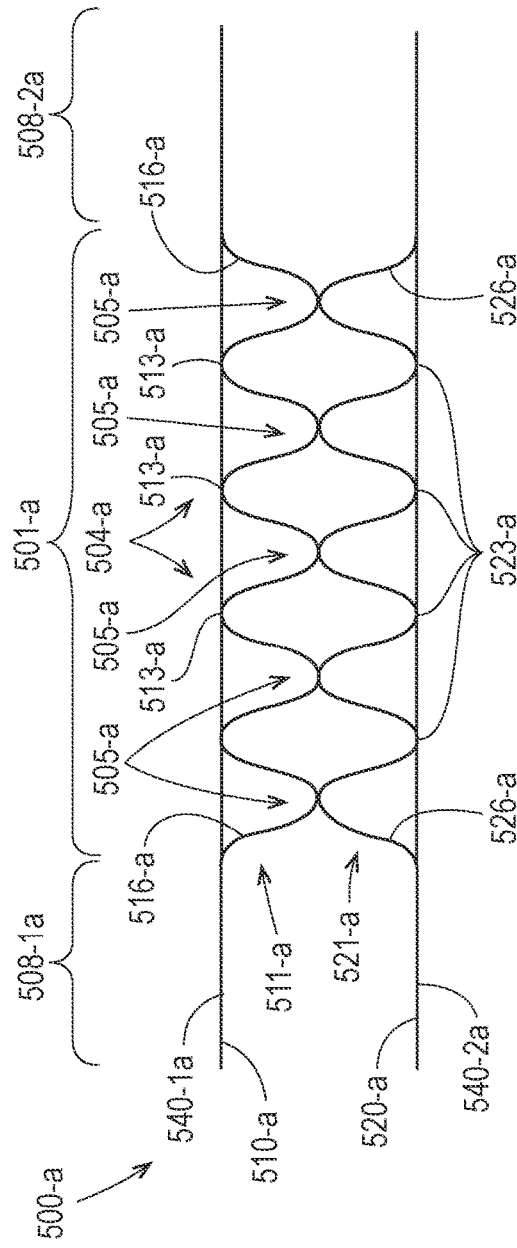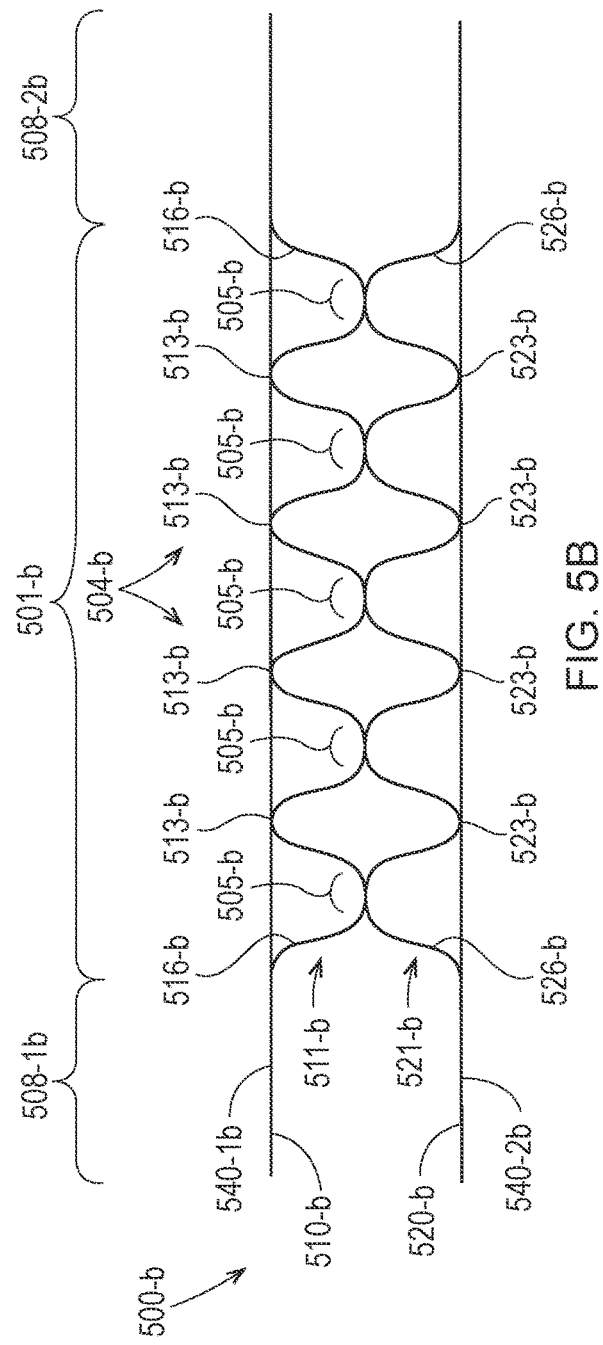

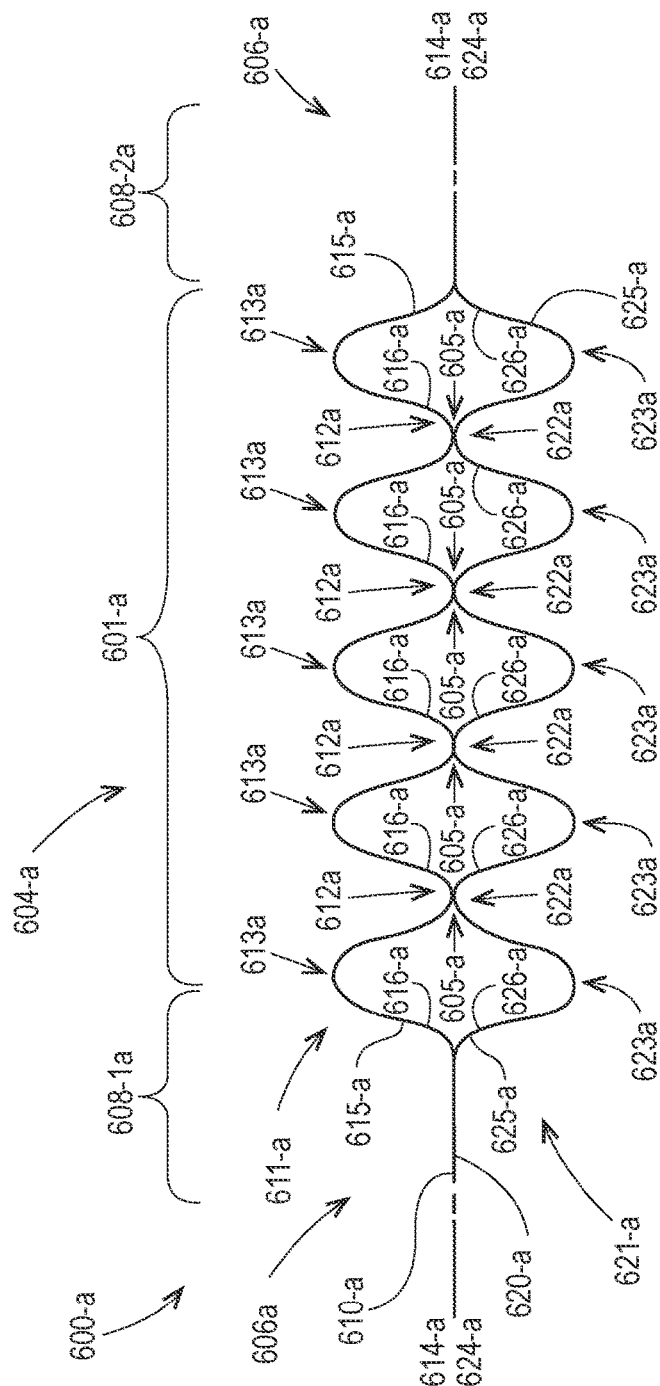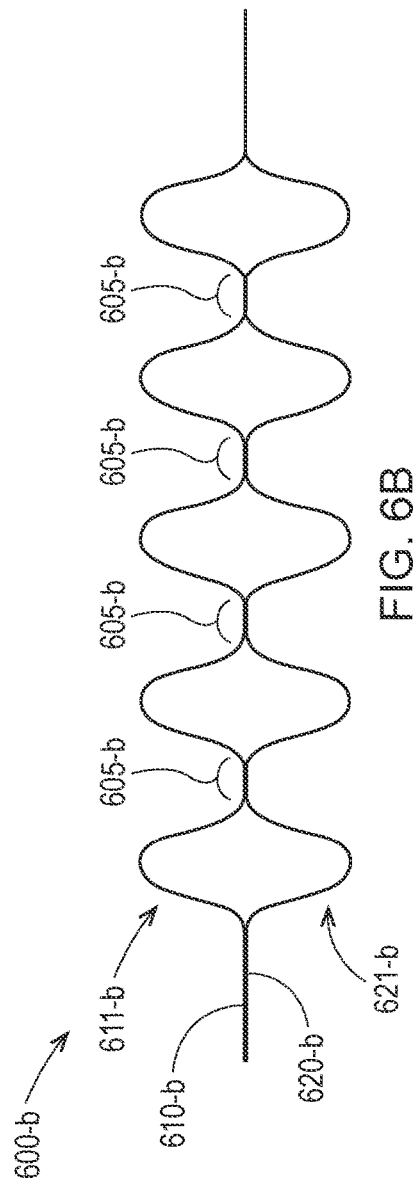
FIG. 6A
FIG. 6B

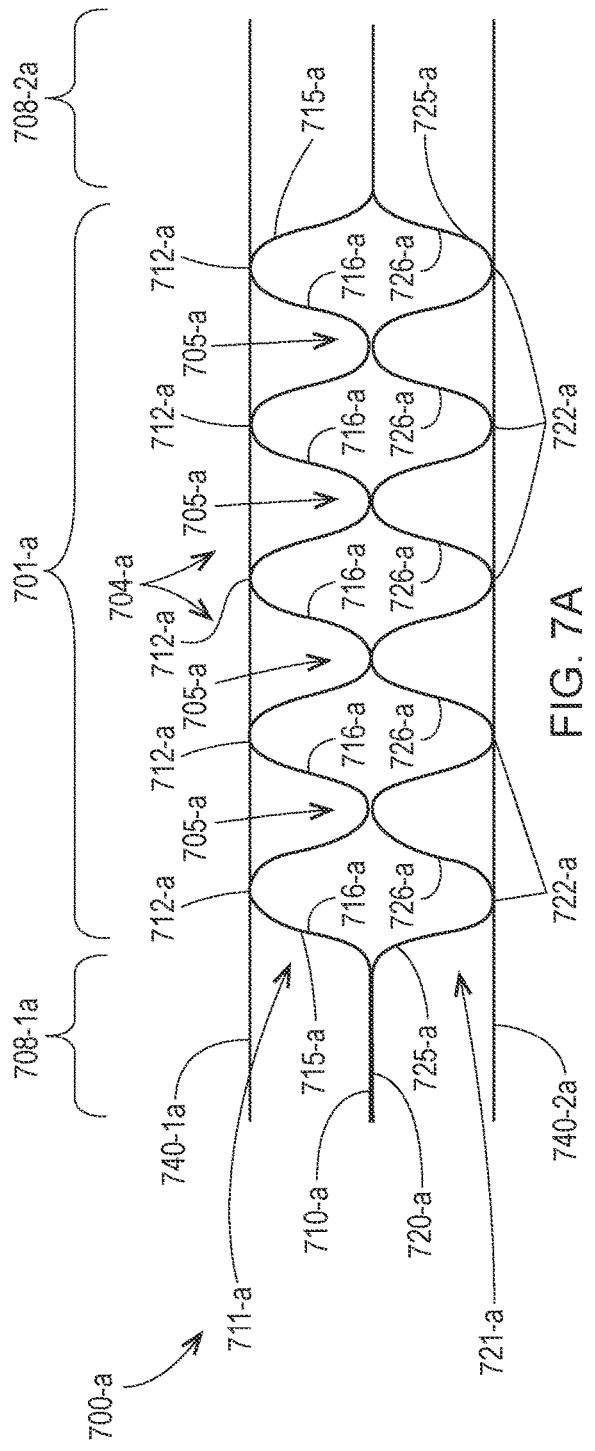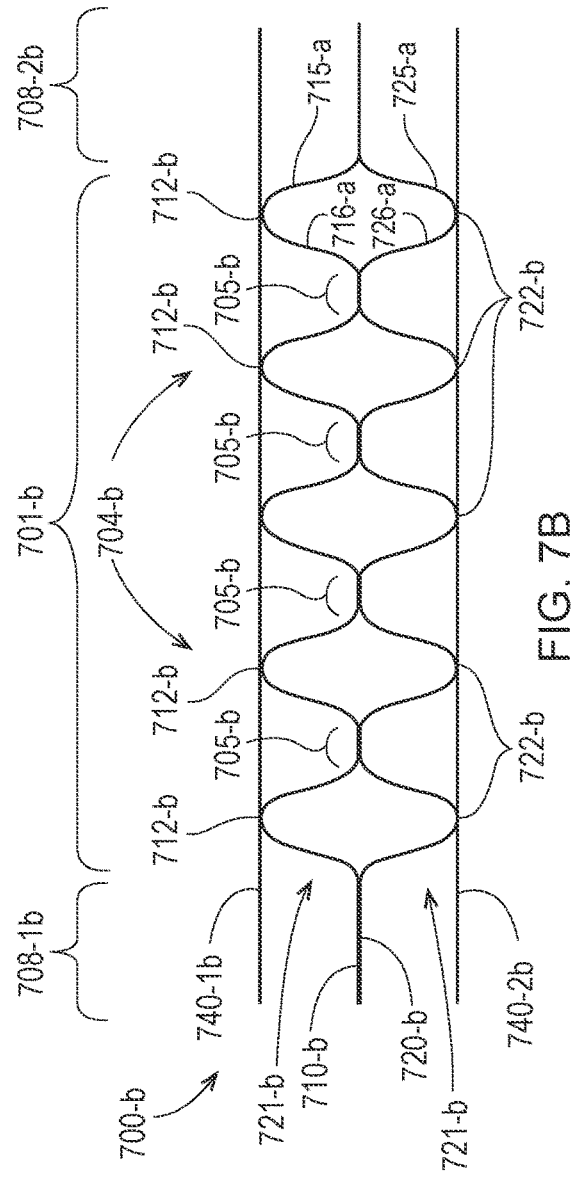

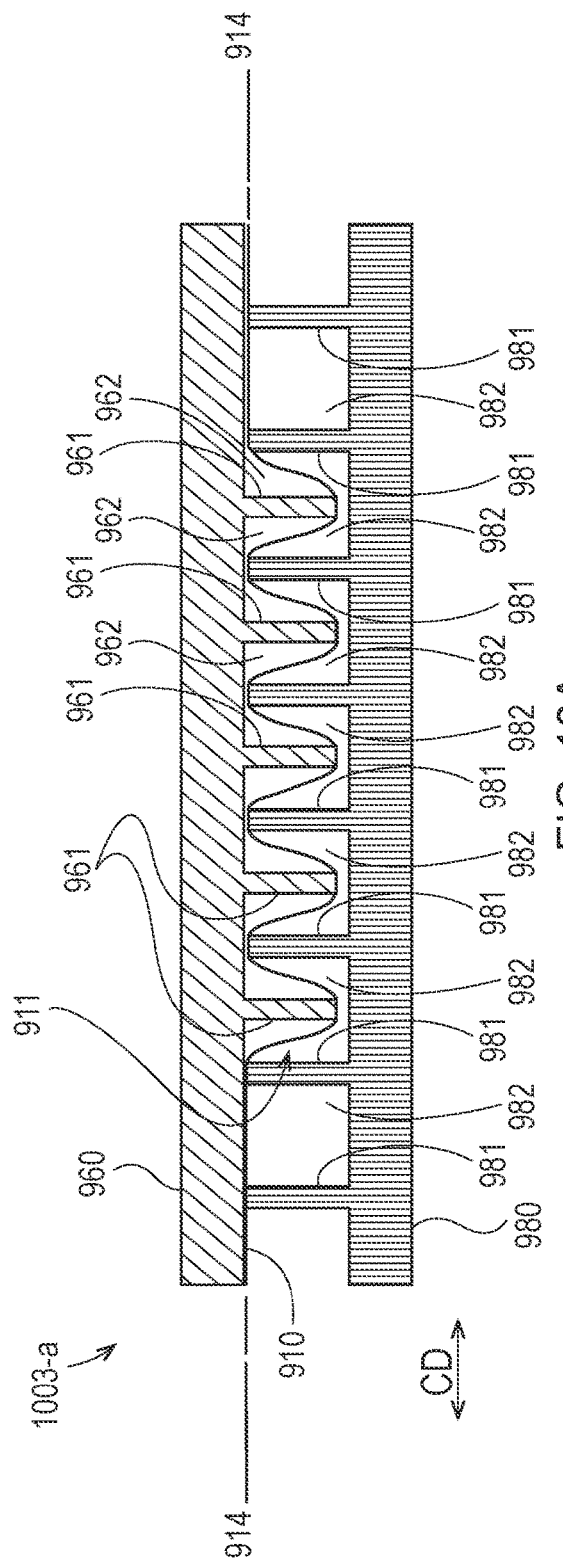
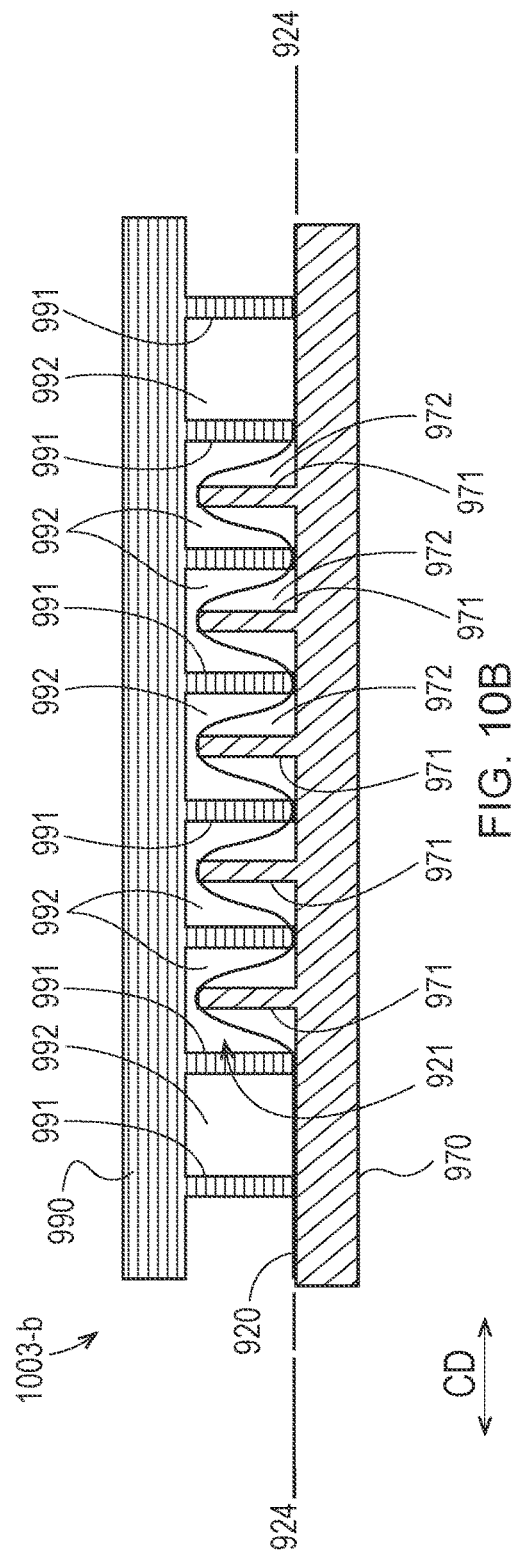
FIG. 10A
FIG. 10B

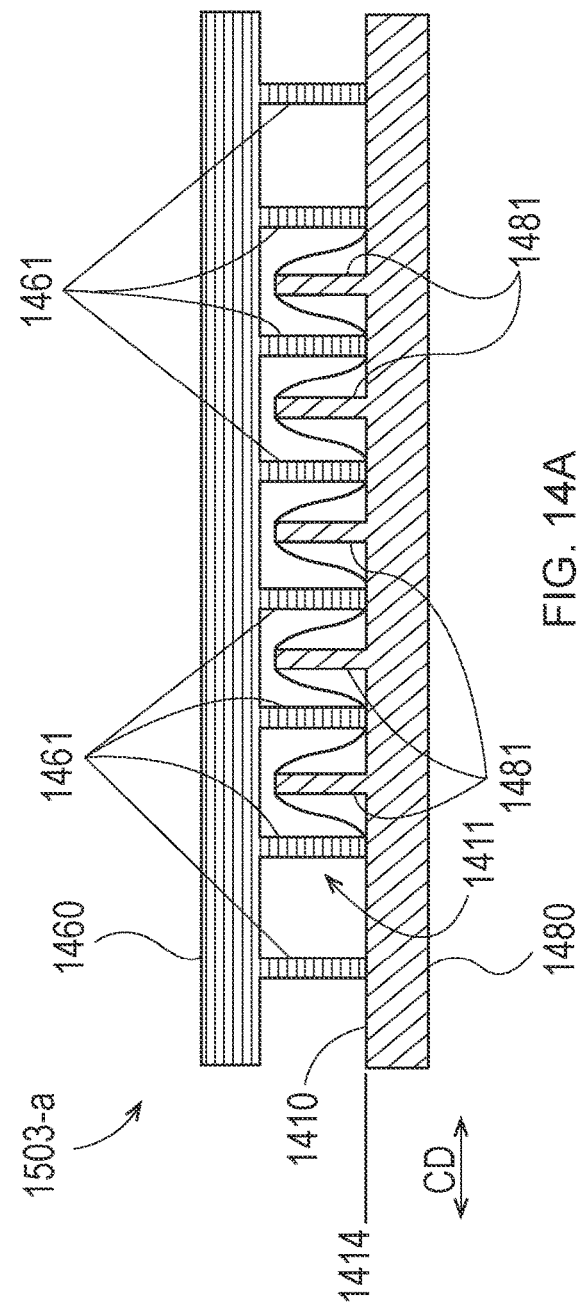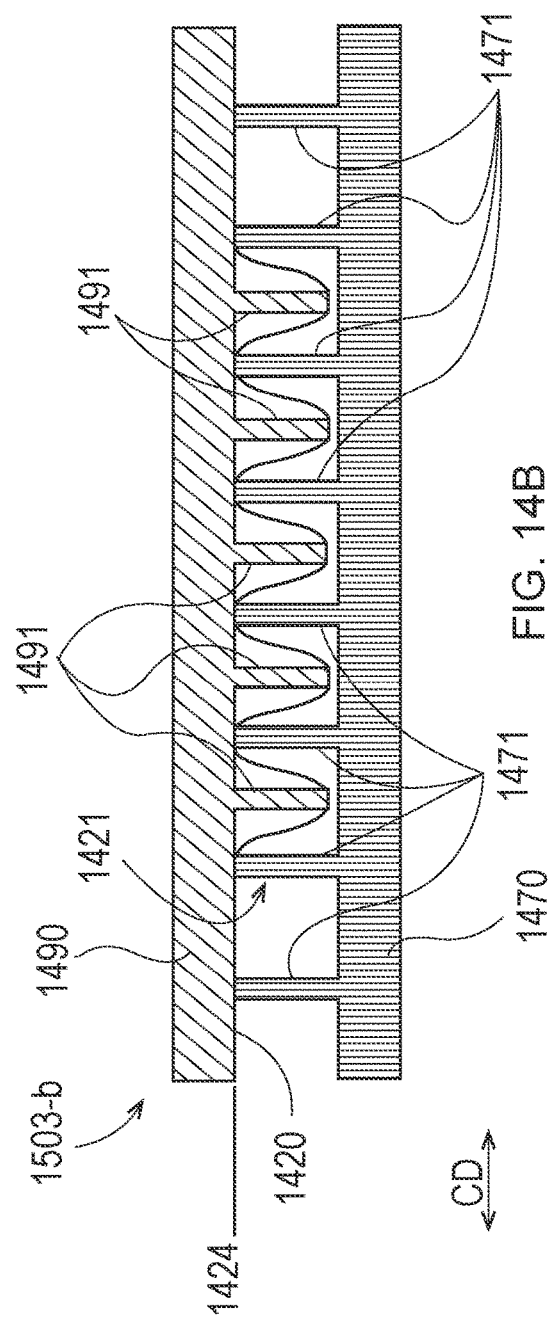

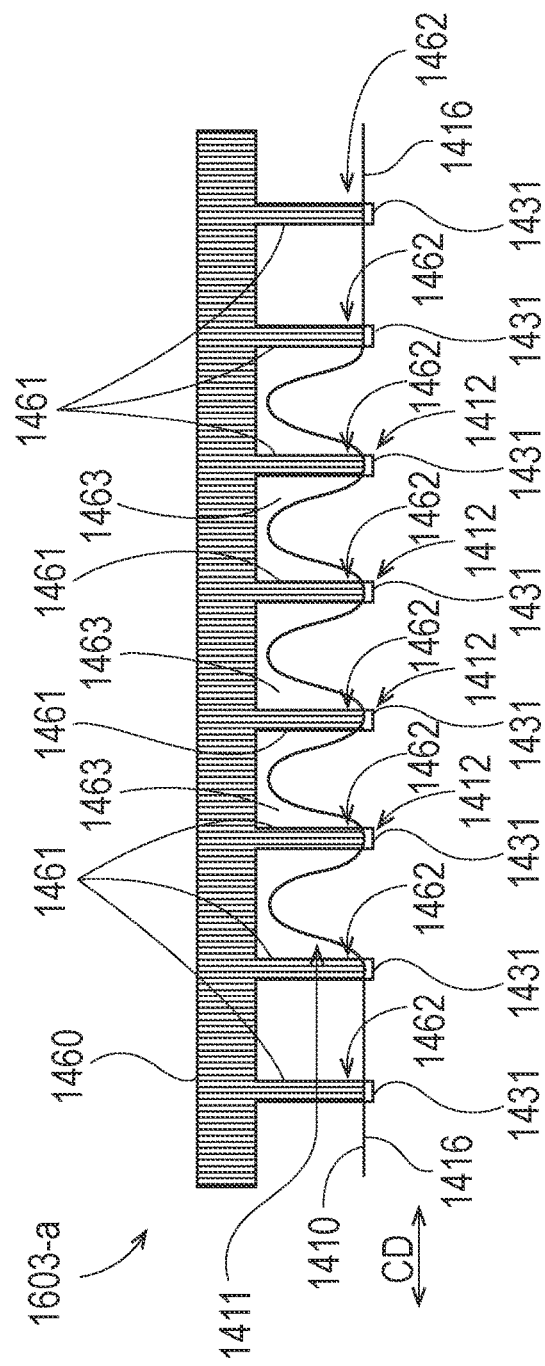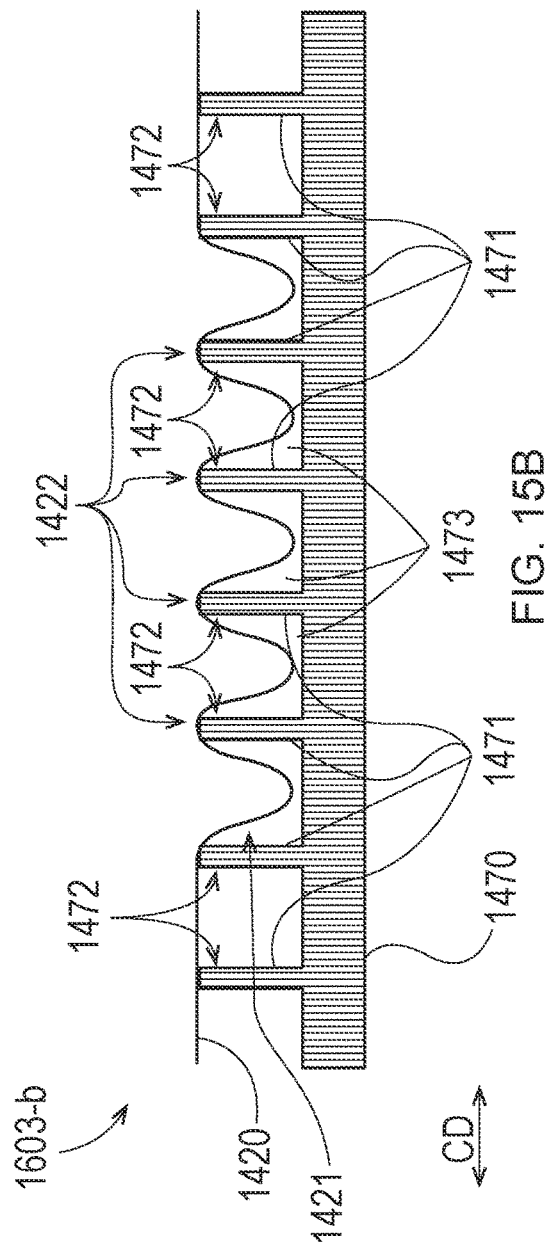

BONDED LAMINATE INCLUDING A FORMED NONWOVEN SUBSTRATE

FIELD

The present disclosure relates in general to laminates and in particular to laminates made from multiple layers of formed substrates made from nonwovens, which are bonded together at their formed deformations.

BACKGROUND

Substrates such as nonwovens and films can serve as useful materials in many different articles, especially disposable consumer products; however, unformed, single layer substrates have certain limitations and disadvantages. Unformed, single layer substrates have little resistance to bending, slight resilience to compression, and generally isotropic responses to tensile loads. Further, unformed, single layer substrates rely heavily on the chemistry of their polymers and additives to provide aesthetics (e.g. opacity) and structural properties (e.g. puncture resistance, softness). In addition, unformed, single layer substrates are usually thin and plain, which is unappealing to consumers.

SUMMARY

Laminates made from multiple layers of formed substrates having deformed regions comprising three dimensional deformations, which are bonded together at the distal ends of the deformations or regions adjacent to the deformations, as described herein, offer significant improvements over unformed, single layer substrates. Such bonded formed laminates can be designed with greater resistance to bending, improved resilience to compression, and can be patterned for directionally oriented responses to tensile loads. Also, bonded formed laminates made from multiple layers of formed substrates can use their layered structure to provide better aesthetics; for example, multiple layers of substrate can diffract and diffuse light more completely, resulting in increased opacity. For laminates comprising a formed nonwoven substrate, the bonding process can create a structure that is very soft and lofty, both before and after undergoing compression. Further, bonded formed laminates made from multiple layers of formed substrates can use their substrate formations to provide enhanced structural properties; for example, substrates with varying formations can distribute and absorb concentrated forces more effectively, resulting in improved puncture resistance. In addition, such bonded formed laminates can be configured with thicker portions and designed patterns, which are appealing to consumers. A bonded formed laminate can be made from two or more formed substrates and can be used instead of a single, thick, unformed, substrate, so the laminate can use about the same amount of material, while still providing the functional benefits described above. And, such bonded formed laminates can provide these benefits without relying on more expensive polymers and/or high concentrations of additives. As a result, bonded formed laminates made from multiple layers of formed substrates, offer significant improvements at a reasonable cost, when compared with unformed, single layer substrates. Nonwovens while supplying clothlike feel, loft and softness suffer from losing that softness and loft when processed into a laminate by conventional methods such as simple thermal bonding. The laminate described herein preserves softness and loftiness while creating a three-dimensional texture.

The present disclosure thus relates to a laminate comprising a first nonwoven formed substrate having a first plane, a first upper surface, a first lower surface and a plurality of three dimensional deformations comprising first protrusions that extend out of the first plane on the first upper surface. Each first protrusion has a first distal end and a first sidewall connecting the first distal end to the first upper surface. The laminate also comprises a second formed substrate having a second plane, a second upper surface, a second lower surface and a plurality of three dimensional deformations comprising second protrusions that extend out of the second plane on the second upper surface. Each of second protrusion have a second distal end and a second sidewall connecting the second distal end to the second upper surface. The first nonwoven formed surface is connected to the second formed substrate at a plurality of attachment area. Each of the attachment areas is directly connected to the first distal ends of the first protrusions and the second distal ends of the second protrusions.

The present disclosure also relates to a laminate comprising a first nonwoven formed substrate having a first plane, a first upper surface, a first lower surface; a plurality of first protrusions that extend out of the first plane on the first upper surface and a first region on the first lower surface in the first plane adjacent to the plurality of first protrusion. Each first protrusion has a first distal end and a first sidewall connecting the first distal end to the first plane. The laminate further comprises a second formed substrate having a second plane, a second upper surface, a second lower surface, a plurality of second protrusions that extend out of the second plane on the second upper surface, and a second region on the second lower surface in the second plane adjacent to the plurality of second protrusion. Each second protrusion has a second distal end and a second sidewall connecting the second distal end to the second upper surface. The first nonwoven formed surface is connected to the second formed substrate at a plurality of attachment areas. Each of the attachment areas is directly connected to the first region in the first plane adjacent to the plurality of first protrusions and the second region in the second plane adjacent to the plurality of second protrusions.

The present disclosure relates to a method of forming a laminate comprising incrementally mechanically stretching a first nonwoven substrate having a first plane by engaging at least a first portion of the first nonwoven substrate with a first pair of forming members to form within the first portion a plurality of first protrusions extending out of the first plane and a first region adjacent to the plurality of first protrusion in the first plane. Each first protrusion has a first distal end. The first pair of forming members comprise a first forming member having a plurality of male forming elements and a second forming member having a plurality of recesses. The method further comprises incrementally mechanically stretching a second substrate having a second plane by engaging at least a second portion of the second substrate with a second pair of forming members to form within the second portion a plurality of second protrusions extending out of the second plane and a second region adjacent to the plurality of second protrusion in the second plane. Each of the second protrusion has a second distal end. The second pair of forming members comprises a first forming member having a plurality of male forming elements and a second forming member having a plurality of recesses. While the portion of the first nonwoven substrate is engaged with the first forming member male elements from the first pair of forming members and while the portion of the second substrate is engaged with the first forming member male elements from the second pair of forming members, the first distal ends of the plurality of first protrusions are directly connected to the second distal ends of the plurality of second protrusions forming attachment areas.

The present disclosure relates to a method of forming a laminate comprising the step of incrementally mechanically stretching a first nonwoven substrate having a first plane by engaging at least a first portion of the first nonwoven substrate with a first pair of forming members to form within the first portion a plurality of first protrusions extending out of the first plane and a first region adjacent to the plurality of first protrusion in the first plane. The first pair of forming members includes: a first forming member having a surface comprising a plurality of male forming elements and a second forming member having a surface comprising a plurality of recesses in the second forming member. The method also comprises the step of incrementally mechanically stretching a second substrate having a second plane by engaging at least a second portion of the second substrate with a second pair of forming members to form within the second portion a plurality of second protrusions extending out of the second plane and a second region adjacent to the plurality of second protrusion in the second plane. The second pair of forming members include: a first forming member having a surface comprising a plurality of male forming elements and a second forming member having a surface comprising a plurality of recesses in the second forming member. The method further comprises the step of directly connecting the first nonwoven substrate to the second substrate by attaching the first region adjacent to the plurality of first protrusion in the first plane of the first nonwoven substrate to the second region adjacent to the plurality of second protrusion in the second plane of the second substrate at a plurality of attachment areas, to form the laminate. The plurality of attachment areas is formed while the portion of the first nonwoven substrate is engaged with the second forming member from the first pair of forming members, comprising a plurality of recesses and while the second portion of the second substrate is engaged with the second forming member from the second pair of forming members comprising a plurality of recesses.

BRIEF DESCRIPTION OF THE DRAWINGS

FIG. 2 illustrates a partially broken top view of a portion of a laminate with patterned areas having protrusions oriented in a cross direction.

FIG. 3A illustrates a top view of a patterned area having protrusions oriented in a machine direction with an overall shape like a rhombus.

FIG. 3B illustrates a top view of a patterned area having protrusions oriented in a cross direction with an overall shape like a rhombus.

FIG. 3C illustrates a top view of a patterned area having protrusions oriented in a machine direction with an overall shape like a square.

FIG. 3D illustrates a top view of a patterned area having protrusions oriented in a cross direction with an overall shape like a square.

FIG. 3E illustrates a top view of a patterned area having protrusions oriented in a machine direction with an overall shape like a circle.

FIG. 3F illustrates a top view of a patterned area having protrusions oriented in a cross direction with an overall shape like a circle.

FIG. 4A illustrates an enlarged end view of a laminate with a patterned area formed by first and second substrates having deformed and undeformed portions, wherein within the deformed portion, distal ends of the protrusions of the substrates are directly connected at narrow attachment areas, and within the undeformed portions the substrates are offset.

FIG. 4B is a modified version of the laminate of FIG. 4A, wherein the substrates are directly connected at wide attachment areas.

FIG. 5A illustrates an enlarged end view of a modified version of the laminate of FIG. 4A, with outer substrates joined to the first and second substrates.

FIG. 5B illustrates an enlarged end view of a modified version of the laminate of FIG. 4B, with outer substrates joined to the first and second substrates.

FIG. 6A illustrates an enlarged end view of a laminate with a patterned area formed by first and second substrates having deformed portions forming protrusions and undeformed portions forming regions in the plane of the first and second substrates, wherein the first and second substrates are directly connected at narrow attachment areas within the regions in the plane of the first and second substrates.

FIG. 6B is a modified version of the laminate of FIG. 6A, wherein the substrates are directly connected at wide attachment areas.

FIG. 7A illustrates an enlarged end view of a modified version of the laminate of FIG. 6A, with outer substrates joined to the first and second substrates.

FIG. 7B illustrates an enlarged end view of a modified version of the laminate of FIG. 6B, with outer substrates joined to the first and second substrates.

FIG. 10A illustrates an enlarged partial cross-sectional view of two mating patterning rolls from the machine of FIG. 9, wherein the rolls are incrementally stretching a first substrate.

FIG. 10B illustrates an enlarged partial cross-sectional view of two mating patterning rolls from the machine of FIG. 9, wherein the rolls are incrementally stretching a second substrate.

FIG. 14A illustrates an enlarged partial cross-sectional view of two mating patterning rolls from the machine of FIG. 13, wherein the rolls are incrementally stretching a first substrate.

FIG. 14B illustrates an enlarged partial cross-sectional view of two mating patterning rolls from the machine of FIG. 13, wherein the rolls are incrementally stretching a second substrate.

FIG. 15A illustrates an enlarged partial cross-sectional view of the first substrate engaged with the first patterning roll from the machine of FIG. 13, wherein an adhesive is applied to the bases of first protrusions of the first substrate and to the adjacent undeformed portions.

FIG. 15B illustrates an enlarged partial cross-sectional view of the second substrate engaged with the second patterning roll from the machine of FIG. 13.

DETAILED DESCRIPTION

Bonded formed laminates of the present disclosure can be made from multiple layers of formed substrates, such as nonwovens, and can offer significant improvements over unformed, single layer substrates, including: greater resistance to bending, improved resilience to compression, directionally oriented responses to tensile loads, better aesthetics, enhanced structural properties, thicker portions, and designed patterns, without relying on more expensive polymers and/or high concentrations of additives. As a result, such bonded formed laminates offer significant improvements at a reasonable cost, when compared with unformed, single layer substrates. Further, these bonded formed laminates may be components of various products such as, for example, absorbent articles (for instance, as topsheets, backsheets, acquisition layers, liquid handling layers, absorbent cores), wipes, facial tissue, toilet tissue, paper towels, filtration media, sound absorption media, and the like.

Throughout the figures, the machine direction is shown as MD and the cross direction is shown as CD; a labeled arrow indicates the orientation of the labeled direction with respect to the figure, while a labeled X indicates that the labeled direction is orthogonal (i.e. into) to the page. And, throughout the figures, laminates are illustrated with patterned areas having particular numbers of protrusions, however, for any patterned area disclosed herein, any number of protrusions may be used; as examples, a patterned area can have 2-100 protrusions, or any number of protrusions between 2 and 100, or any range formed by any of these values such as 2-50 protrusions, 3-40 protrusions, 4-30 protrusions, 5-20 protrusions, etc.

Formed substrates according to the present disclosure include layers of material having permanently deformed regions where the shape or density of the material has been permanently altered in response to stresses or strains applied by a mechanical deformation process exerting a mechanical force on the material. Formed substrates are generally produced by a mechanical process which includes passing web through a set of intermeshing rolls. The intermeshing rolls include one roll having male elements disposed on the outer surface of the roll and another roll including recesses on the outer surface for receiving the male elements when the rolls intermesh. The intermeshing rolls incrementally strain the web creating protrusions that extend from the plane of the web. The region adjacent to the protrusions is primarily undeformed and remains in the plane of the web. The undeformed regions could be small or large depending on the pattern formed in the intermeshing rolls. Protrusions comprise a distal end and sidewalls that connect the distal end to the plane of the web. Most of the strain occurs in sidewalls during the incremental straining process.

Figure 1:
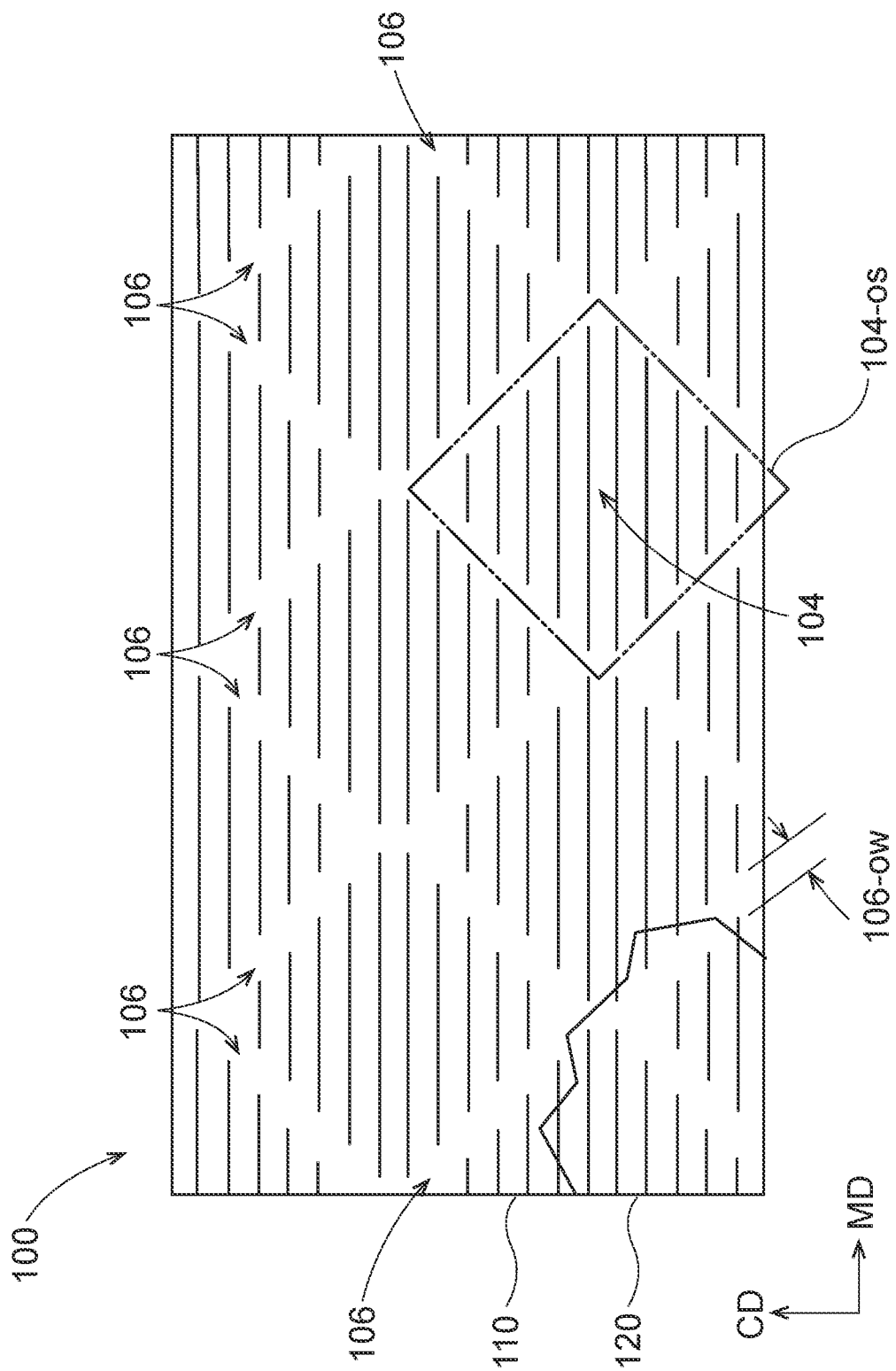
FIG. 1 illustrates a partially broken top view of a portion of a laminate with patterned areas having protrusions oriented in a machine direction.

FIG. 1 illustrates a partially broken top view of a portion of a laminate 100 with patterned areas having protrusions oriented lengthwise alternating in a machine direction. The laminate 100 is made of a first substrate 110 on the top and a second substrate 120 (shown in the broken portion) on the bottom of the laminate 100. The first substrate 110 is directly connected to the second substrate 120 at a plurality of attachment areas shown by straight line segments, which are parallel with the machine direction. The plurality of attachment areas forms the patterned area 104, which has an overall shape 104-os like a rhombus; however, in various embodiments, for any laminate disclosed herein, the laminate may include patterned areas having any overall shape disclosed herein or known in the art of patterned substrates. The attachment areas that form the patterned area 104 are repeating over the laminate 100, to form a plurality of discrete patterned areas, each with the same configuration, including the same overall shape; however, in various embodiments, for any laminate disclosed herein, the laminate may include two or more different patterned areas, which may or may not repeat in a pattern over the laminate. The patterned areas are arranged in repeating linear arrays, which form a tessellating pattern, wherein the patterned areas are separated from each other by linear pathways 106, disposed between the patterned areas, and wherein the pathways are formed by the undeformed portions of the substrates. Each of the pathways has an overall width 106-ow, which is substantially uniform. For the laminate 100 and for any laminate disclosed herein, any of the pathways can have an overall width of 1-100 millimeters, or any integer value between 1 and 100 millimeters, or any range formed by any of these values, such as 1-50 millimeters, 1-20 millimeters, 1-10 millimeters, etc. Also part, parts, or all of any pathway disposed between patterned areas can have a variable overall width and/or can be curved. The pathways can be linear or nonlinear and span the entire width of the web as shown in FIGS. 1 and 2.

The laminate 100 can be configured according to any laminate described herein, such as the laminate 400-a of FIG. 4A, the laminate 400-b of FIG. 4B, the laminate 600-a of FIG. 6A, or the laminate 600-b of FIG. 6B, or any alternative laminate embodiment disclosed herein or known in the art. In various embodiments, the laminate 100 can be modified by adding first and/or second outer substrates, such as in the laminate 500-a of FIG. 5A, the laminate 500-b of FIG. 5B, the laminate 700-a of FIG. 7A, or the laminate 700-b of FIG. 7B.

Figure 8:
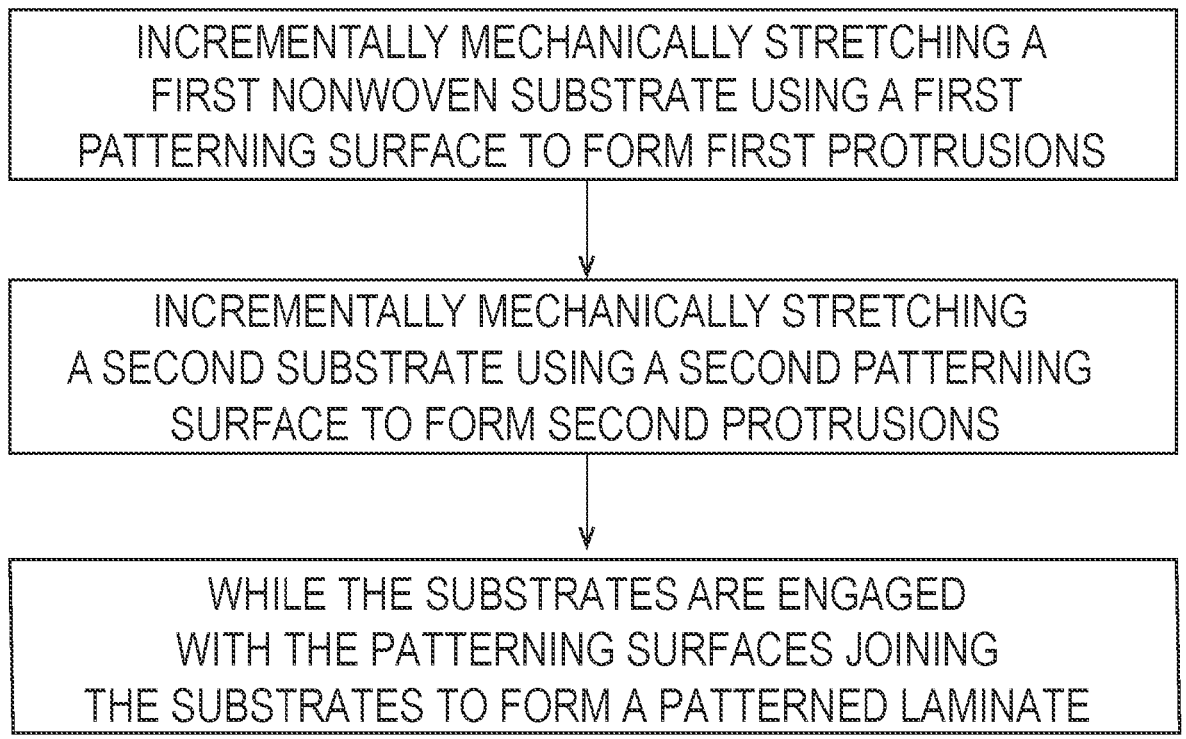
FIG. 8 shows a flow diagram for methods of making a laminate with patterned areas.

The laminate 100 can be made according to the method 800 of FIG. 8 or made according to any alternative method embodiment disclosed herein. The laminate 100 can be made using the machine 902 of FIG. 9, the machine 1402 of FIG. 13, or made using any alternative machine embodiment disclosed herein. In various embodiments, part, parts, or all of the laminate 100 or any laminate disclosed herein can be modified such that some or all of the protrusions are oriented at a positive or negative angle from 1-90 degrees with respect to the machine direction, or any integer value between 1 and 89 degrees, or any range formed by any of these values, such as 1-60 degrees, 1-45 degrees, 1-30 degrees, 30-89 degrees, 45-89 degrees, 60-89 degrees, 30-60 degrees, 40-50 degrees, etc.

FIG. 2 illustrates a partially broken top view of a portion of a laminate 200 with patterned areas having protrusions oriented lengthwise in the cross direction. The laminate 200 is made of a first substrate 210 and a second substrate 220, with discrete patterned areas including patterned area 204 with an overall shape like a rhombus, repeating over the laminate 200, separated from each other by pathways 206. The laminate 200 of FIG. 2 is configured in the same way as the laminate 100 of FIG. 1, with like-numbered elements configured in the same way, except as described differently below. The first substrate 210 and the second substrate 220 are directly connected at a plurality of attachment areas shown by line segments, which are parallel with the cross direction. Since all of the attachment areas of the laminate 200 are oriented in the cross direction, the attachment areas provide the laminate 200 with a relatively higher bending stiffness in the cross direction, and since the pathways 206 are linear pathways disposed in parallel, the pathways 206 provide the laminate 200 with relatively lower bending stiffness at angles taken perpendicular to the pathways. The laminate 200 can be configured or modified in any of the ways that the laminate 100 of FIG. 1 can be configured or modified. The laminate 200 can be made according to the method 800 of FIG. 8 or made according to any alternative method embodiment disclosed herein. The laminate 200 can be made using the machine 902 of FIG. 9, the machine 1402 of FIG. 13, or made using any alternative machine embodiment disclosed herein where the male elements disposed on the patterning rolls are oriented in the cross direction rather than the machine direction as shown.

FIGS. 3A-3F illustrate top views of exemplary patterned areas having attachment areas that form protrusions oriented in various directions, and patterned areas with various overall shapes. FIG. 3A illustrates a patterned area 304-a having protrusions oriented lengthwise in the machine direction and an overall shape like a rhombus, as shown with the patterned area 104 in the laminate 100 of FIG. 1. FIG. 3B illustrates a patterned area 304-b having protrusions oriented lengthwise in the cross direction, and an overall shape like a rhombus, as shown with the patterned area 204 in the laminate 200 of FIG. 2. FIG. 3C illustrates a patterned area 304-c having protrusions oriented lengthwise in the machine direction, and an overall shape like a square, which can be used for any patterned area of any laminate disclosed herein. FIG. 3D illustrates a patterned area 304-d having protrusions oriented lengthwise in a cross direction, and an overall shape like a square, which can be used for any patterned area of any laminate disclosed herein. In various embodiments, a laminate can have patterned areas with an overall shape like a rectangle, trapezoid, triangle, pentagon, hexagon, heptagon, octagon, or any other regular or irregular polygon having any number of sides. FIG. 3E illustrates a patterned area 304-e having protrusions oriented lengthwise in a machine direction, and an overall shape like a circle. FIG. 3F illustrates a patterned area 304-f having protrusions oriented lengthwise in a cross direction, and an overall shape like a circle. In various embodiments, a laminate can have patterned areas with an overall shape like an oval, ellipse, or any other rounded shape having any configuration. Any of the overall shapes of the exemplary patterned areas of FIGS. 3A-3F or any other overall shape disclosed herein or known in the art can be used for any patterned area in any laminate disclosed herein, in any workable combination.

FIGS. 4A-7B illustrate enlarged end views of laminates formed, at least in part, by a patterned portion of a first nonwoven substrate directly connected to a patterned portion of a second substrate.

These laminates are illustrated with patterned areas having a particular number of protrusions, however any number of protrusions may be used, including any number disclosed herein, for any embodiment of laminate disclosed herein. These laminates are illustrated with protrusions having particular, uniform proportions, however, these particular shapes are not required, and the uniformity and/or proportions of part, parts, or all of one or more of any of the protrusions may vary within any patterned area or between patterned areas in any substrate and/or between any substrates, for any embodiment of laminate disclosed herein. Any of the embodiments of FIGS. 4A-7B can be used to produce a bonded formed laminate with some or all of the protrusions oriented in any convenient direction for the laminate, such as the machine direction, the cross direction, or any positive or negative angle from 1-90 degrees with respect the machine direction and/or the cross direction.

FIGS. 4A-4B, 5A-5B, 6A-6B, and 7A-7B illustrate embodiments wherein the laminates are formed, at least in part, by a patterned portion of a first nonwoven substrate directly connected to a patterned portion of a second substrate. For ease of illustration, each substrate is illustrated as a smooth, continuous substrate having a particular uniform thickness, however these particular shapes are not required, and the smoothness, continuity, and/or thickness of part, parts, or all of one or more of any of the substrates may vary within any patterned area and/or between patterned areas in any substrate and/or between any substrates, in any way disclosed herein and/or in any way known in the art, for any embodiment of laminate disclosed herein. Although each of these embodiments describes and illustrates a first nonwoven substrate directly connected to a second substrate, in various embodiments, some or all the connections between the substrates may be indirect connections, which include one or more intermediate materials (in addition to any adhesive used for making the connection). Also, any of the embodiments disclosed herein can be modified to include one or more intermediate substrates (e.g. film layers), disposed between the first substrate and the second substrate. The intermediate layers may include substrates providing absorbent functions such as cellulose or foam; a substrate providing a barrier function such as a film, or another nonwoven. The intermediate substrate may be elastic or non-elastic. It may be part of the bond and facilitate bonding of the first and second deformed substrates or the material may be pushed out of the bond sites such that the first and second substrate are bonded together through the center intermediate layer.

FIG. 4A illustrates an enlarged end view of a laminate 400-a formed by a first substrate, which is a first nonwoven 410-a having a first plane 414-a, a first upper surface 415-a, and a first lower surface 416-a and a second substrate 420-a having a second plane 424-a, second upper surface 425-a and a second lower surface 426-a. The laminate 400-a has a discrete patterned area 404-a surrounded by pathways 406-a. The pathways 406-a comprise a first pathway in the first plane 414-a of the first substrate 410-a and a second pathway in the second plane 424-a of the second substrate 420-a. The laminate 400-a also has a central deformed portion 401-a and undeformed portions 408-1a and 408-2a disposed on either side of the deformed portion 401-a. For this embodiment the first upper surface 415a of the first nonwoven substrate 410-a faces the second upper surface 425a of the second substrate 420-a such that the first and second upper surfaces 415-a and 425-a are directed toward the interior of the laminate. Within the deformed portion 401-a, the first nonwoven substrate 410-a is directly connected to the second substrate 420-a at a plurality of long (into the page) but relatively narrow (across the page) attachment areas 405-a. The deformed portion 401-a forms the patterned area 404-a. Within the undeformed portions 408-1a and 408-2a, the first substrate 410-a and the second substrate 420-a are not connected but are offset from each other by offset distance 419-oda. The undeformed portions 408-1a and 408-2a of the substrates 410-a and 420-a form the pathways 406-a between the patterned area 404-a and other patterned areas of the laminate 400-a.

In the deformed portion 401-a, the first substrate 410-a has a plurality of first protrusions 411-a extending out of the first plane 414-a on the first upper surface 415-a in an undulating pattern wherein each of the first protrusions 411-a has a first distal end 412-a and a first sidewall 419-a connecting the first distal end 412-a to the first upper surface 415-a in the first plane 414-a. The first nonwoven substrate 410-a includes a first region on the first lower surface 416-a in the first plane 414-a adjacent to the first protrusions 411-a. The first regions include the base 413-a of the first protrusions 411-a of the deformed regions 401-a and the pathways 406-a formed in the undeformed portions 408-1a and 408-2a. The bases 413-a are substantially undeformed areas adjacent to the first protrusions 411-a and primarily in the first plane 414-a. In the first substrate 410-a of FIG. 4A, the first protrusions 411-a have the same center to center spacing and height, however, in various embodiments, for any laminate disclosed herein, a first substrate may have a patterned area with protrusions having varying center to center spacing and height. The first protrusions 411-a are disposed linearly, in parallel, side-by-side and are integrally connected to each other since they are formed from the same material, which is the first nonwoven substrate 410-a. However, in various embodiments, for any laminate disclosed herein, some or all of the protrusions in a patterned area may not be completely parallel with each other, but may have overall orientations (taken end-to-end) that are 1-15 degrees out of parallel with each other, or out of parallel by any integer value between 1 and 15 degrees, or by any range formed by any of these values, such as 1-10 degrees, 1-5 degrees, 1-2 degrees, etc. Each of the first protrusions 411-a is incrementally stretched, or strained, such that the first distal ends 412-a and the bases 413-a in the first region are permanent features of the first nonwoven substrate 410-a separated sidewalls 419-a. The straining in the side walls 419-a can result in fiber thinning, change in fiber alignment and/or a reduction in fiber concentration in the sidewalls 419-a. The straining can also cause thermal point bonds present in the precursor nonwoven, located in the sidewalls of the protrusions, to break or even disappear due to fibers being pulled out of the bond site. When multiple layers with different extensibilities are strained at the same time, interpenetrating protrusions can be formed, such as those described in (Tufted Laminate Web—U.S. Pat. No. 7,410, 683). Each of the protrusions 411-a is elongated since it has an overall length (into to the page) that is greater than its overall width. In various embodiments, for any patterned area of any laminate disclosed herein, one, or some, or all of the protrusions may be continuous with an overall length that continues all the way along the laminate and/or one, or some, or all of the protrusions may be discrete with an overall length that does not continue all the way along the laminate. Embodiments comprising discrete protrusions can be tunnel shaped or bulbous as described further herein. Table 1, set forth below, describes nine embodiments of laminate, which represent various combinations of protrusion lengths and protrusions orientations for the first substrate and the second substrate, which are contemplated as applicable to any laminate described herein. In Table 1, "angled at α" means that an elongated protrusion has an overall orientation that is oriented at any angle α of 1-90 degrees between the machine direction and the cross direction.

TABLE 1

| | protrusions of first substrate | | protrusions of second substrate | |
|---|---|---|---|---|
| # | length | orientation | length | orientation |
| 1 | continuous | machine direction | continuous | machine direction |
| 2 | continuous | machine direction | discrete | machine direction |
| 3 | discrete | machine direction | discrete | machine direction |
| 4 | continuous | cross direction | continuous | cross direction |
| 5 | continuous | cross direction | discrete | cross direction |
| 6 | discrete | cross direction | discrete | cross direction |
| 7 | continuous | angled at α | continuous | angled at α |
| 8 | continuous | angled at α | discrete | angled at α |
| 9 | discrete | angled at α | discrete | angled at α |

In various embodiments, for any patterned area of any laminate disclosed herein, some or all of the protrusions may have a same overall length and/or some or all of the protrusions may have differing overall lengths; the overall lengths of the protrusions may be selected such that that the patterned area has a particular overall shape (when viewed from a top view), such as any overall shape disclosed herein or known in the art.

The second substrate 420-a has the same configuration as the first nonwoven substrate 410-a, except that the second substrate 420-a is configured and oriented as a mirrored version of the first substrate 410-a, mirrored around an imaginary horizontal line disposed along the bottoms of the first distal ends 412-a of the first protrusions 411-a of the first nonwoven substrate 410-a. So, in the deformed portion 401-a, the second substrate 420-a has a plurality of second protrusions 421-a, which are also integrally connected, discrete, elongated, incrementally stretched, and disposed linearly, in parallel, side-by-side manner. The plurality of second protrusions 421-a extend out of the second plane 424-a on the second upper surface 425-a. Each of the second protrusions 421-a has a second distal end 422-a and a second sidewall 429-a connecting the second distal end 422-a to the second upper surface 425-a in the second plane 424-a. The second substrate 420-a includes a second region on the second lower surface 426-a in the second plane 424-a adjacent to the second protrusions 424-a. The second region includes the bases 423-a of the second protrusions 421-a of the deformed regions 401-a and the pathways 406-a of the undeformed portions 408-1a and 408-2a. The bases 423-a are substantially undeformed areas adjacent to the second protrusions 421-a and primarily in the second plane 424-a. Due to the mirrored configuration, the second protrusions 421-a have the same center to center spacing and height as the first protrusions 411-a, and all of the first and second distal ends 412-a and 422-a face inward while all of the first and second bases 413-a and 423-a face outward. The first nonwoven substrate 410-a is aligned both side-to-side and lengthwise (into the page) with the second substrate 420-a and is attached to the second substrate 420-a by a plurality of attachment areas 405-a. For the embodiment shown in FIG. 4A, each of the attachment areas 405-a is directly connected to the first distal ends 412-a of the first protrusions 411-a and the second distal ends 422-a of the second protrusions 421-a. Since the attachment areas 405-a attach the first nonwoven substrate 410-a to the second substrate 420-a, the protrusions 411-a have the same overall lengths as the protrusions 421-a.

In various embodiments, for any patterned area of any laminate disclosed herein, a second substrate may not be a mirrored version of the first substrate but may differ from the first substrate in any way disclosed herein; in particular, the protrusions of the second substrate may differ in center to center spacing and/or height from the protrusions of the first substrate. Table 2, set forth below, describes nine embodiments of laminate, which represent various combinations of protrusion center to center spacings and heights for the first substrate and the second substrate, which are contemplated as applicable to any laminate described herein. In Table 2, "same," "smaller," and "larger" are used as terms of relative size; same means protrusions having an equivalent size; smaller means protrusions having a relatively lesser size; larger means protrusions having a relatively greater size; the protrusions of either substrate may otherwise have any size disclosed herein or known in the art.

TABLE 2

| | protrusions of first substrate | | protrusions of second substrate | |
|---|---|---|---|---|
| # | center to center spacing | height | center to center spacing | height |
| 1 | same | same | same | same |
| 2 | smaller | same | larger | same |
| 3 | larger | same | smaller | same |
| 4 | same | smaller | same | larger |
| 5 | smaller | smaller | larger | larger |
| 6 | larger | smaller | smaller | larger |
| 7 | same | larger | same | smaller |
| 8 | smaller | larger | larger | smaller |
| 9 | larger | larger | smaller | smaller |

The plurality of attachment areas 405-a directly connects the first distal ends 412-a with the second distal ends 422-a such that each of the first distal ends 412-a is directly connected to a single one of the second distal ends 422-a, and each of the second distal ends 422-a is directly connected to a single one of the first distal ends 412-a; however, in various embodiments, for any patterned area of any laminate disclosed herein, multiple distal ends from the protrusions of the first substrate may be directly connected to a single distal end from a protrusion of the second substrate. In other embodiments, some of the distal ends may not be connected to another distal end. Any of the attachment areas disclosed herein can be formed by one or more adhesives and/or fused portions, which extend continuously or discontinuously along part or parts of about all, approximately all, substantially all, nearly all, or all of either or both of the connected distal ends. Any suitable adhesive for connecting nonwoven substrates may be used, such as 5100-N ZP (Full Care), available from H.B. Fuller of Saint Paul, Minnesota, United States of America; the substrates may be fused together by the application of heat and/or pressure to the substrates as they are held in contact, using ultrasonic welding or in any way known in the art. In the embodiment of FIG. 4A, the protrusions 411-a of the first nonwoven substrate 410-a are only attached to the protrusions 421-a of the second substrate 420-a at the plurality of attachment areas 405-a. Further, in the embodiment of FIG. 4A, the first nonwoven substrate 410-a is only attached to the second substrate 420-a at the plurality of attachment areas 405-a; however, in various embodiments, for any laminate disclosed herein, the first substrate and the second substrate may be joined together in various ways at one or more other locations on the laminate, such as locations in undeformed portions.

The first nonwoven substrate 410-*a* changes from an undulating pattern in the protrusions 411-*a* of the deformed portion 401-*a* to a flat shape in the undeformed portions 408-1*a* and 408-2*a*; Similarly, the second substrate 420-*a* changes from a undulating shape in the protrusions 421-*a* of the deformed portion 401-*a* to a flat shape in the undeformed portions 408-1*a* and 408-2*a*.

FIG. 4B illustrates an enlarged end view of a laminate 400-*b* formed by a first substrate, which is a first nonwoven substrate 410-*b* and a second substrate 420-*b*. The laminate 400-*b* of FIG. 4B is configured in the same way as the laminate 400-*a* of FIG. 4A, with like-numbered elements configured in the same way, except that the first nonwoven substrate 410-*b* and the second substrate 420-*b* are directly connected at a plurality of attachment areas 405-*b*, which are relatively wider (across the page) than the attachment areas 405-*a* of the laminate 400-*a*. In alternative embodiments, the laminate 400-*b* can be modified in any of the ways that the laminate 400-*a* of FIG. 4A can be modified.

FIG. 5A illustrates an enlarged end view of a laminate 500-*a* formed by a first substrate, which is a first nonwoven substrate 510-*a*, a second substrate 520-*a*, a third substrate 540-1*a*, and a fourth substrate 540-2*a*. The second, third and fourth substrates can comprise a film, a nonwoven or other substrate. The laminate 500-*a* of FIG. 5A is configured in the same way as the laminate 400-*a* of FIG. 4A, with like-numbered elements configured in the same way, except that the laminate 500-*a* includes the third substrate 540-1*a*, which is an outer substrate joined to the bases 513-*a* on the first lower surface 516-*a* of the first substrate 510-*a* and also joined to the undeformed portions 508-1*a* and 508-2*a* of the first substrate 510-*a*. The third substrate 540-1*a* can be joined to the first substrate 510-*a* directly or indirectly in any way described herein and/or known in the art. The laminate 500-*a* includes the fourth substrate 540-2*a*, which is an outer substrate joined to the bases 523-*a* on the second lower surface 526-*a* of the second substrate 520-*a* and also joined to the undeformed portions 508-1*a* and 508-2*a* of the second substrate 520-*a*. The fourth substrate 540-2*a* can be joined to the second substrate 520-*a* directly or indirectly in any way described herein and/or known in the art. In alternative embodiments, the laminate 500-*a* can be modified in any of the ways that the laminate 400-*a* of FIG. 4A can be modified. For any laminate with outer substrates, disclosed herein, part, parts, or all either or both of the outer substrates may be omitted from the laminate and/or other substrates may be added in place of part, parts, or all of either or both of the outer substrates, in any workable combination. In alternative embodiments, for any laminate disclosed herein, one or more additional substrates (e.g. films or nonwovens) and/or structures, in any form disclosed herein or known in the art, may be added to the laminate.

FIG. 5B illustrates an enlarged end view of a laminate 500-*b* formed by a first substrate, which is a first nonwoven substrate 510-*b*, a second substrate 520-*b*, a third substrate 540-1*b*, and a fourth substrate 540-2*b*. The laminate 500-*b* of FIG. 5B is configured in the same way as the laminate 400-*b* of FIG. 4B, with like-numbered elements configured in the same way, except as described differently below. The laminate 500-*b* includes the third substrate 540-1*b*, which is an outer substrate joined to the bases 513-*b* on the first lower surface 516-*b* of the first substrate 510-*b* and also joined to the undeformed portions 508-1*b* and 508-2*b* of the first substrate 510-*b*. The third substrate 540-1*b* can be joined to the first substrate 510-*b* directly or indirectly in any way described herein and/or known in the art. The laminate 500-*b* includes the fourth substrate 540-2*b*, which is an outer substrate joined to the bases 523-*b* of the second substrate 520-*b* and also joined to the undeformed portions 508-1*b* and 508-2*b* of the second substrate 520-*b*. The fourth substrate 540-2*b* can be joined to the second substrate 520-*b* directly or indirectly in any way described herein and/or known in the art. In alternative embodiments, the laminate 500-*a* can be modified in any of the ways that the laminate 500-*a* of FIG. 5A can be modified.

FIG. 6A illustrates an enlarged end view of a laminate 600-*a* formed by a first nonwoven substrate 610-*a*, and a second substrate 620-*a*. The laminate 600-*a* of FIG. 6A is configured in the same way as the laminate 400-*a* of FIG. 4A, with like-numbered elements configured in the same way, except as described differently below. For the embodiment shown in FIG. 6A, each of the attachment areas 605-*a* is directly connected to first region on the first lower surface 616-*a* of the first nonwoven substrate 610-*a* and the second region on the second lower surface 626-*a* of the second substrate 620-*a*. The first region is adjacent to the first protrusions 611-*a* in the first plane 614-*a* of the first nonwoven substrate 610-*a*. The first region includes the bases 612-*a* of the first protrusions 611-*a* in the deformed region 601-*a* and the pathways 606-*a* formed in the undeformed portions 608-1*a* and 608-2*a*. The second region is adjacent to the second protrusions 621-*a* in the second plane 624-*a* of the second nonwoven substrate 620-*a*. The second region includes the bases 622-*a* of the second protrusions 621-*a* in the deformed region 601-*a* and the pathways 606-*a* formed in the undeformed portions 608-1*a*, 608-2*a*. Each of the attachment areas 605-*a* directly connects to the bases 612-*a* in the first plane 614-*a* and to bases 622-*a* in the second plane 624-*a*. As described above and shown in FIG. 6A, the first and second regions includes the pathways 606-*a* of the undeformed portions 608-1*a* and 608-2*a* such that the first nonwoven substrate 610-*a* and the second substrate 620-*a* are in contact with each other, and are directly or indirectly joined to each other in the undeformed portions 608-1*a* and 608-2*a*. In any embodiment of laminate disclosed herein, in the undeformed portions, the first substrate and the second substrate can be joined together in any convenient way (e.g. directly connected by adhesive at one or more locations); however, in various embodiments, the first substrate and the second substrate may be proximate to each other and/or not in contact with each other and/or not joined to each other at one or more locations in the undeformed portions. In alternative embodiments, the laminate 600-*a* can be modified in any of the ways that the laminate 400-*a* of FIG. 4A can be modified.

FIG. 6B illustrates an enlarged end view of a laminate 600-*b* formed by a first nonwoven substrate 610-*b* and a second substrate 620-*b*. The laminate 600-*b* of FIG. 6B is configured in the same way as the laminate 600-*a* of FIG. 6A, with like-numbered elements configured in the same way, except that the first nonwoven substrate 610-*b* and the second substrate 620-*b* are directly connected at a plurality of attachment areas 605-*b*, which are relatively wider (across the page) than the attachment areas 605-*a* of the laminate 600-*a*. In alternative embodiments, the laminate 600-*b* can be modified in any of the ways that the laminate 600-*a* of FIG. 6A can be modified.

FIG. 7A illustrates an enlarged end view of a laminate 700-*a* formed by a first nonwoven substrate 710-*a*, a second substrate 720-*a*, a third substrate 740-1*a*, and a fourth substrate 740-2*a*. The laminate 700-*a* of FIG. 7A is configured in the same way as the laminate 600-*a* of FIG. 6A, with like-numbered elements configured in the same way, except that the laminate 700-*a* includes the third substrate 740-1*a*, which is an outer substrate joined to the first upper surface 715-*a* of the first nonwoven substrate 710-*a* at the first distal ends 712-*a* of the first protrusions 711-*a*. The third substrate 740-1*a* can be joined to the first nonwoven substrate 710-*a* directly or indirectly in any way described herein and/or known in the art. The laminate 700-*a* includes the fourth substrate 740-2*a*, which is an outer substrate joined to the second upper surface 725-*a* of the second substrate 720-*a* at the second distal ends 722-*a* of the second protrusions 721-*a*. The fourth substrate 740-2*a* can be joined to the second substrate 720-*a* directly or indirectly in any way described herein and/or known in the art. In alternative embodiments, the laminate 700-*a* can be modified in any of the ways that the laminate 600-*a* of FIG. 6A can be modified.

FIG. 7B illustrates an enlarged end view of a laminate 700-*b* formed by a first nonwoven substrate 710-*b*, a second substrate 720-*b*, a third substrate 740-1*b*, and a fourth substrate 740-2*b*. The laminate 700-*b* of FIG. 7B is configured in the same way as the laminate 600-*b* of FIG. 6B, with like-numbered elements configured in the same way, except as described differently below. The laminate 700-*b* includes the third substrate 740-1*b*, which is an outer substrate joined to the first upper surface 715-*b* of the first nonwoven substrate 710-*b* in the deformed portions 701-*b* of the first nonwoven substrate 710-*b* at the first distal ends 712-*b* of the first protrusions 711-*b*. The third substrate 740-1*b* can be joined to the first nonwoven substrate 710-*b* directly or indirectly in any way described herein and/or known in the art. The laminate 700-*b* includes the fourth substrate 740-2*b*, which is an outer substrate joined to the second upper surface 725-*a* of the second substrate 720-*b* in the deformed portions 701-*b* of the second substrate 720-*b* at the second distal ends 722-*b* of the second protrusions 721-*b*. The fourth substrate 740-2*b* can be joined to the second substrate 720-*b* directly or indirectly in any way described herein and/or known in the art. In alternative embodiments, the laminate 700-*a* can be modified in any of the ways that the laminate 700-*a* of FIG. 7A can be modified.

For any of the laminates disclosed herein, the protrusions can have any convenient sizes and proportions, including any of the following. Any of the protrusions can have a center to center spacing of 0.5-10 millimeters, or any value between 0.5 and 5 millimeters in increments of 0.5 millimeters, or any range formed by any of these values, such as 1-4 millimeters, 1-3 millimeters, 1-2 millimeters, etc. Any of the protrusions can have a height of 0.1-10 millimeters, or any value between 0.1 and 10 millimeters in increments of 0.1 millimeters, or any range formed by any of these values, such as 0.1-5 millimeters, 1-4 millimeters, 1-2 millimeters, etc. Any of the protrusions can have a ratio of height to spacing that is from 0.2 to 10 or any value in increments of 0.1 between 0.2 and 10, or any range formed by any of these values, such as 0.5-7.5, 0.7-5, 1-3, etc. Any of the attachment areas between protrusions can have an overall width of 0.1-5 millimeters, or any value between 0.1 and 5 millimeters in increments of 0.1 millimeters, or any range formed by any of these values, such as 0.1-3 millimeters, 0.2-1 millimeters, 0.2-0.5 millimeters, etc. Any of the protrusions can have a ratio of center to center spacing to overall width of an attachment area that is from 1.1 to 100 or any value in increments of 0.1 between 1 and 100, or any range formed by any of these values, such as 1-80, 5-65, 25-50, etc. Any of the protrusions can have an overall length of 1-10,000 millimeters, or any integer value between 1 and 10,000 millimeters, or any range formed by any of these values, such as 1-1,000 millimeters, 1-100 millimeters, 2-60 millimeters, 3-50 millimeters, 4-40 millimeters, 5-30 millimeters, etc.

The nonwoven materials of the present disclosure can be made of any suitable nonwoven materials ("precursor materials"). The nonwoven webs can be made from a single layer, or multiple layers (e.g., two or more layers). If multiple layers are used, they can be comprised of the same type of nonwoven material, or distinct types of nonwoven materials. In some cases, the precursor materials may be free of any film layers.

The fibers of the nonwoven precursor material(s) can be made of any suitable materials including, but not limited to natural materials, synthetic materials, and combinations thereof. Suitable natural materials include, but are not limited to cellulose, cotton linters, bagasse, wool fibers, silk fibers, etc. Cellulose fibers can be provided in any suitable form, including but not limited to individual fibers, fluff pulp, drylap, liner board, etc. Suitable synthetic materials include, but are not limited to nylon, rayon and polymeric materials. Suitable polymeric materials include but are not limited to: polyethylene (PE), polyester, polyethylene terephthalate (PET), polypropylene (PP), and co-polyester. In some embodiments, however, the nonwoven precursor materials can be either substantially, or completely free, of one or more of these materials. For example, in some embodiments, the precursor materials may be substantially free of cellulose, and/or exclude paper materials. In some embodiments, one or more precursor materials can comprise up to 100% thermoplastic fibers. The fibers in some cases may, therefore, be substantially non-absorbent. In some embodiments, the nonwoven precursor materials can be either substantially, or completely free, of tow fibers.

The precursor nonwoven materials can comprise any suitable types of fibers. Suitable types of fibers include, but are not limited to: monocomponent, bicomponent, and/or biconstituent, non-round (e.g., shaped fibers (including but not limited to fibers having a trilobal cross-section) and capillary channel fibers). The fibers can be of any suitable size. The fibers may, for example, have major cross-sectional dimensions (e.g., diameter for round fibers) ranging from 0.1-500 microns. Fiber size can also be expressed in denier, which is a unit of weight per length of fiber. The constituent fibers may, for example, range from about 0.1 denier to about 100 denier. The constituent fibers of the nonwoven precursor web(s) may also be a mixture of different fiber types, differing in such features as chemistry (e.g., PE and PP), components (mono- and bi-), shape (i.e. capillary channel and round) and the like.

The nonwoven precursor webs can be formed from many processes, such as, for example, air laying processes, wetlaid processes, meltblowing processes, spunbonding processes, and carding processes. The fibers in the webs can then be bonded via spunlacing processes, hydroentangling, calendar bonding, through-air bonding and resin bonding. Some of such individual nonwoven webs may have bond sites 46 where the fibers are bonded together.

The basis weight of nonwoven materials is usually expressed in grams per square meter (gsm). The basis weight of a single layer nonwoven material can range from about 8 gsm to about 100 gsm, depending on the ultimate use of the material.

The precursor nonwoven webs may have certain desired characteristics. The precursor nonwoven web(s) each have a first surface, a second surface, and a thickness. The first and second surfaces of the precursor nonwoven web(s) may be generally planar. It is typically desirable for the precursor nonwoven web materials to have extensibility to enable the fibers to stretch and/or rearrange into the form of the protrusions. If the nonwoven webs are comprised of two or more layers, it may be desirable for all of the layers to be as extensible as possible. Extensibility is desirable in order to maintain at least some non-broken fibers in the sidewalls around the perimeter of the protrusions. It may be desirable for individual precursor webs, or at least one of the nonwovens within a multi-layer structure, to be capable of undergoing an apparent elongation (strain at the breaking force, where the breaking force is equal to the peak force) of greater than or equal to about one of the following amounts: 100% (that is double its unstretched length), 110%, 120%, or 130% up to about 200%. It is also desirable for the precursor nonwoven webs to be capable of undergoing plastic deformation to ensure that the structure of the deformations is "set" in place so that the nonwoven web will not tend to recover or return to its prior configuration.

In addition to the nonwoven substrate used in forming the formed laminates disclosed herein other substrates (e.g. films) of various chemistries can be used, including one or more of any kind of polymeric material such as polyethylene (e.g. Linear low density PE, Low Density PE, and High Density PE), polypropylene, nylon, ethyl vinyl acetate, and/or any other polymer suitable for making substrates, along with any additives (e.g. pigments/colorants) and/or modifiers (e.g. titanium dioxide) known in the art of substrate-making, in any combination (e.g. homopolymers, copolymers, blends, etc.) and in any form (e.g. single layers, laminates, layered structures, coextrusions, etc.) made by any kind of substrate-making process. Any of the bonded formed laminates disclosed herein can be made from substrates of various thicknesses, such substrates having an overall thickness of 5-250 microns (0.2-10 mils), or any integer value between 5 and 250 microns, or any range formed by any of these values, such as 5-100 microns (0.2-3.9 mils), 10-50 microns (0.39-2 mils), 10-30 microns (0.39-1.4 mils), etc.

For any of the laminates disclosed herein, the first substrate, the second substrate (as well as either or both outer substrates, if present), may be the same or may be different in any way known in the art; for example, such differences may include differences in color, opacity, thickness, mechanical properties (e.g. elasticity, inelasticity, extensibility, inextensibility, ductility or brittleness, puncture resistance, etc.), polymeric type, presence of additives, use of modifiers, etc., in any workable combination.

In some embodiments the nonwoven materials used in the laminates disclosed herein can be renewable polymer materials. As defined herein renewable polymer materials are those that can be synthesized or derived from sources that can be produced annually or on time scales faster than petroleum or natural gas sources. Non-limiting examples of such renewable polymers are Lyocell, polyvinyl alcohol and copolymers, polylactic acid and copolymers, polyhydroxyalkanoates and copolymers. Renewable polymers can be comprised of monomers synthesized from bioderived sources. Non-limiting examples of polymers comprising bioderived monomers are polyethylene (PE), polypropylene (PP), polyethylene terephthalate (PET), polyesters, aliphatic polyesters and co-polyesters.

In some embodiments, the precursor webs used to form bonded laminates may be apertured before entering into the incremental straining process. Different processes can be used to aperture the webs, such as pin aperturing processes or bonding and stretching processing like that described in U.S. Pat. No. 5,628,097. The precursor webs may also be over bonded to create melt-weakened sites, such that the melt-weakened sites form apertures in the strained regions of the web during the incremental straining process.

FIG. 8 shows a flow diagram 800 for methods of making a laminate with patterned areas, as described herein. The patterned areas are formed by passing the substrates forming the laminates between intermeshing rolls to incrementally mechanically strain the substrates. The method 800 includes a first step 801 of incrementally mechanically stretching a first substrate using a first patterning surface to form first protrusions. The method 800 includes a second step 802 of incrementally mechanically stretching a second substrate using a second patterning surface to form second protrusions. The method 800 includes a third step 803, performed while the first substrate is engaged with the first patterning surface and while the second substrate is engaged with the second patterning surface, wherein the third step 803 includes directly connecting the first substrate to the second substrate to form the bonded formed laminate.

In various modified embodiments applying the process 800 of FIG. 8, one or more additional intermediate substrates (e.g. films, nonwovens), can be fed in between a first substrate and a second substrate at the joining proximity, such that the first substrate, the intermediate substrate(s), and the second substrate can all be joined together by the first patterning roll and the second patterning roll, with the intermediate substrate(s) disposed in between, according to embodiments disclosed herein; this approach can be used to modify any embodiments of process and equipment disclosed in FIGS. 8-17, including any alternative embodiments.

The different processes that utilize intermeshing rolls to incrementally strain a web producing protrusions and undeformed regions that can be used to produce the bonded laminates described herein include ring rolling, SELF and Nested SELF. Each of the processes comprise a roll that has male elements that extend outward from the surface of the roll, and cavities/recesses designed to receive the male elements.

Ring Rolling is described in U.S. Pat. No. 5,626,571 and can produce protrusions that resemble corrugations and extend the full length of the product or the full length of the region that is deformed.

The terms "SELF" and "SELF'ing", refer to Procter & Gamble technology in which SELF stands for Structural Elastic Like Film. While the process was originally developed for deforming polymer film to have beneficial structural characteristics, it has been found that the SELF'ing process can be used to produce beneficial structures in other materials such as nonwovens. Processes, apparatuses, and patterns produced via SELF are illustrated and described in U.S. Pat. Nos. 5,518,801; 5,691,035; 5,723,087; 5,891,544; 5,916,663; 6,027,483; and 7,527,615 B2. One such SELF process is described in (Tufted Fibrous Web—U.S. Pat. No. 7,829,173). The term "tuft", as used herein, refers to a protrusion in the surface of a nonwoven web comprising a plurality of looped fibers extending from the surface of the web. Tufts may have a tunnel-like configuration which may be open at both of their ends.

Another SELF process is nested SELF. Nested SELF is a process described in U.S. Pat. No. 10,045,888 that produces protrusions having a bulbous shape on one side of the material and apertures or base openings formed in the opposing side of the material. Nested SELF is described in more detail herein.

Figure 9:
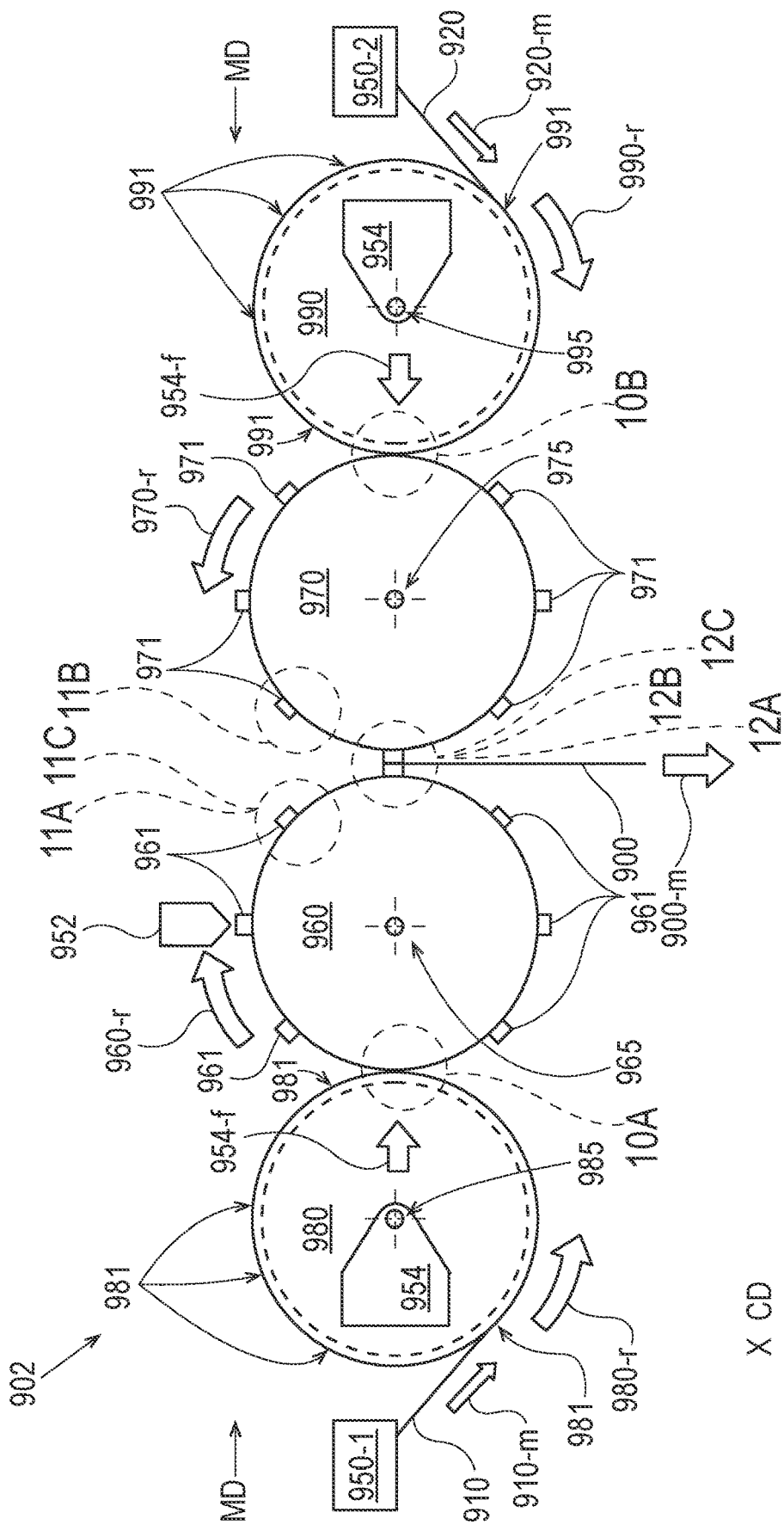
FIG. 9 is an assembly diagram illustrating a machine with four patterning rolls having male elements and recesses oriented in the machine direction, for incrementally stretching first and second substrates forming a plurality of protrusions therein and for joining the substrates together at the distal ends of the protrusions to form a bonded formed laminate with offset undeformed portions.
Figure 13:
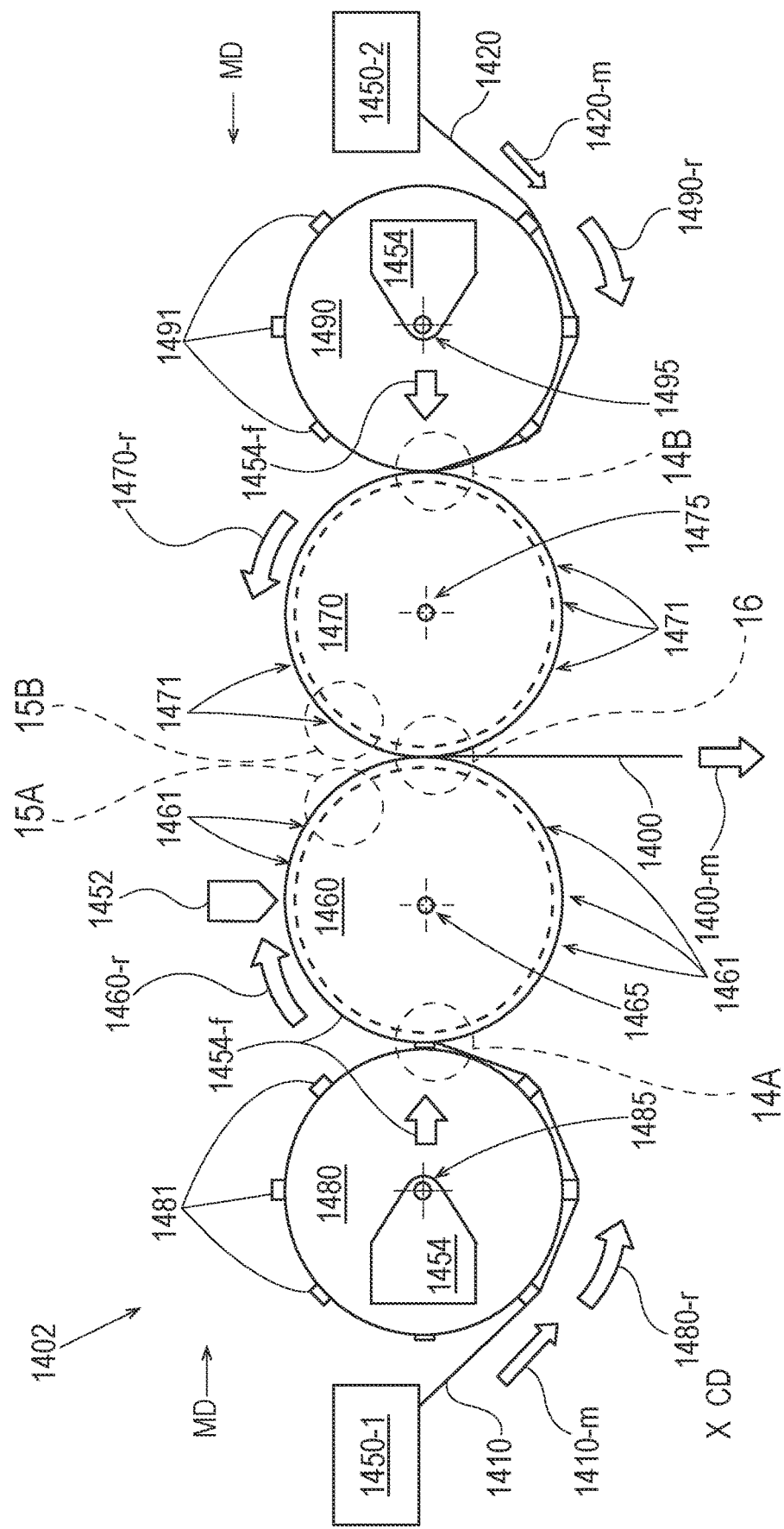
FIG. 13 is an assembly diagram illustrating a machine with four patterning rolls having male elements and recesses oriented in the machine direction, for incrementally stretching first and second substrates forming a plurality of protrusions therein and for joining the substrates together at the bases of the protrusions to form a bonded formed laminate with adjacent undeformed portions.
Figure 20:
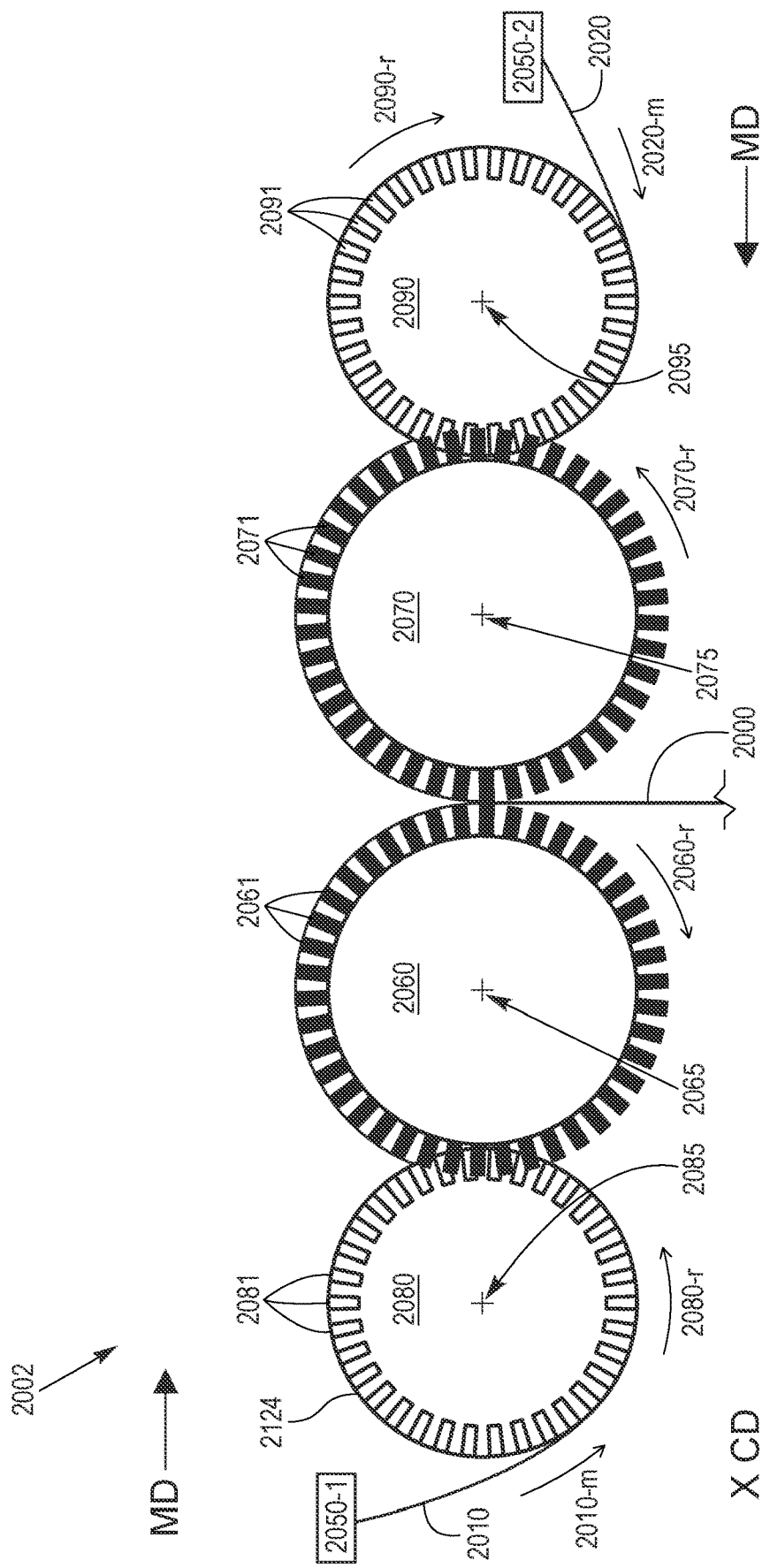
FIG. 20 is an assembly diagram illustrating a machine with four patterning rolls having discrete spaced apart male elements and recesses for incrementally stretching first and second substrates forming discrete spaced apart protrusions therein and for joining the substrates together at the distal ends of the discrete spaced apart protrusions to form a bonded formed laminate with offset undeformed portions.
Figure 21:
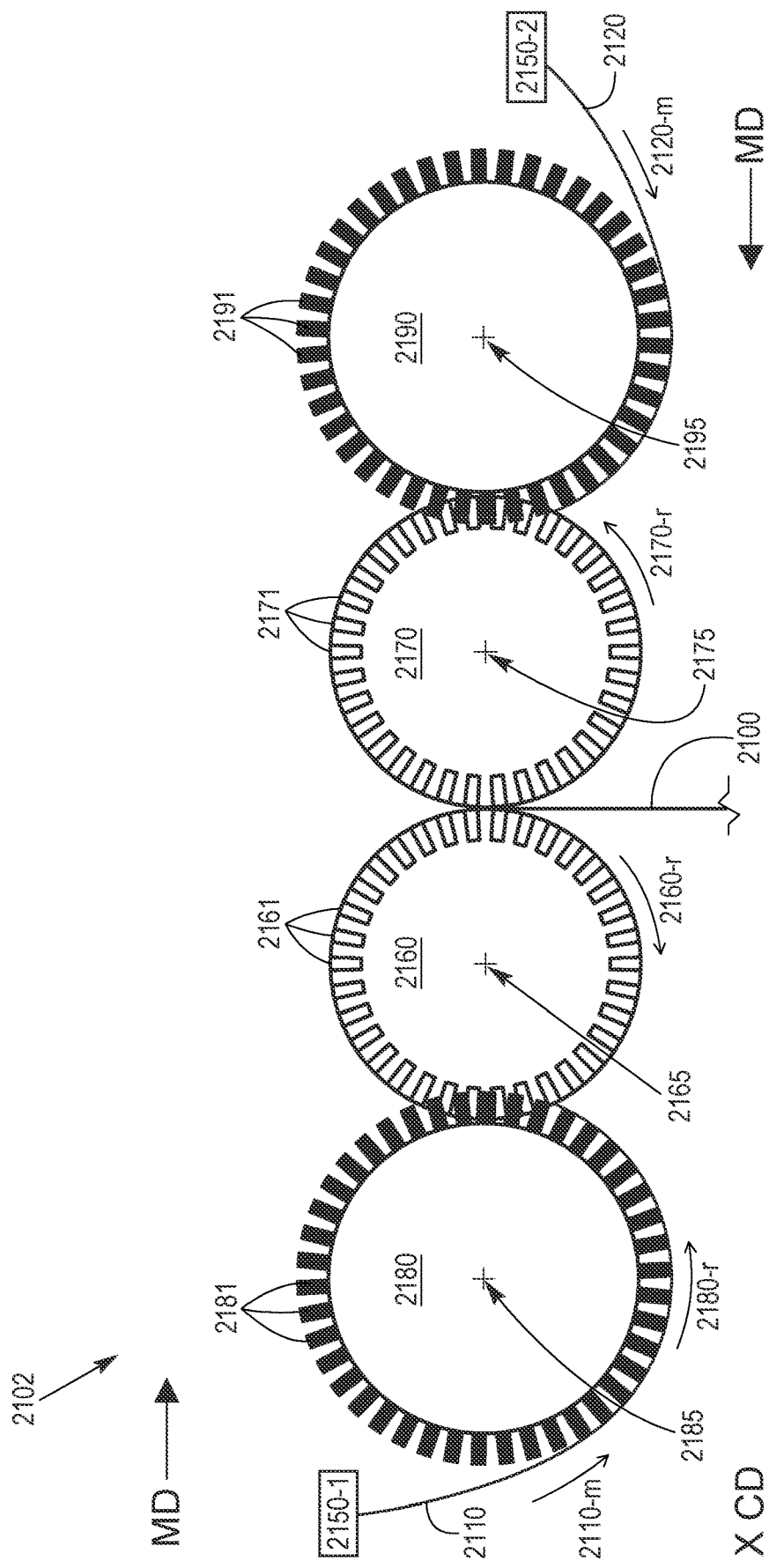
FIG. 21 is an assembly diagram illustrating a machine with four patterning rolls having discrete spaced apart male elements and recesses for incrementally stretching first and second substrates forming discrete spaced apart protrusions therein and for joining the substrates together at the bases of the discrete spaced apart protrusions to form a bonded formed laminate with adjacent undeformed portions.

The incremental stretching and joining of the substrates in the method 800 can be performed using the machine 902 of FIG. 9, the machine 1402 of FIG. 13, the machine 2002 of FIG. 20, the machine 2102 of FIG. 21 or any alternative machine embodiment disclosed herein. The laminate resulting from the method 800 can be configured according to any laminate described herein, such as the laminate 400-*a* of FIG. 4A, the laminate 400-*b* of FIG. 4B, the laminate 600-*a* of FIG. 6A, the laminate 600-*b* of FIG. 6B, or any alternative embodiment of any of these, as disclosed herein. In various alternative embodiments, the process 800 can be modified by the additional process steps of adding one or two outer substrates, to form the laminate 500-*a* of FIG. 5A, the laminate 500-*b* of FIG. 5B, the laminate 700-*a* of FIG. 7A, or the laminate 700-*b* of FIG. 7B.

FIGS. 9-16, 20 and 21 illustrate machines for incrementally stretching and joining substrates to form bonded formed laminates, as described herein. In FIGS. 9-16, 20 and 21 the substrates are nonwovens and films.

FIG. 9 is an assembly diagram illustrating a machine 902 with four solid state formation rolls, which are a first patterning roll 960, a second patterning roll 970, a third patterning roll 980, and a fourth patterning roll 990, wherein the machine incrementally stretches a first substrate 910 and a second substrate 920 and joins the substrates together to form a bonded formed laminate 900. The first and third patterning rolls 960 and 980 incrementally stretch the first substrate 910; the second and fourth patterning rolls 970 and 990 incrementally stretch the second substrate 920. While the first substrate 910 is engaged with the first patterning roll 960 and while the second substrate 920 is engaged with the second patterning roll 970, the first and second patterning rolls 960 and 970 join together the first and second substrates 910 and 920 to form the laminate 900. In FIG. 9, the overall machine direction for the first substrate 910 is shown on the left as an arrow pointing to the right and the overall machine direction for the second substrate 920 is shown on the right as an arrow pointing to the left; however, for each of these substrates, the precise machine direction at any particular point is defined by the path of the substrate as it travels through the machine.

The first patterning roll 960 is a SELF'ing roll with discrete male elements 961 that rotates 960-*r* clockwise around an axis 965 oriented in the cross direction. The first patterning roll 960 has a roll face with a cylindrical base and a plurality of rigid, elongated, discrete male elements 961 attached to the base as radial projections. The male elements 961 are like rows of teeth, and, on the roll 960, are disposed linearly, in parallel, side-by-side, with adjacent teeth separated by gaps. Each of the male elements 961 is elongated since it has an overall length that is greater than its overall width. And, each of the male elements 961 is oriented lengthwise in the machine direction, such that its overall length is parallel with the rotation of the roll 960. Each of the male elements 961 is discrete with an overall length that does not continue all the way around the roll face of the roll 960. Alternatively, the male elements can be oriented lengthwise in the cross-machine direction such that the overall length is parallel with the axis 965 of the roll 960. Each of the male elements 961 has a distal end that forms a tip, which is the part of the male element that is farthest from the axis 965. The second patterning roll 970 is also a solid-state formation roll with discrete male elements 971 and is configured in the same way as the first patterning roll 960, except that the roll 970 rotates 970-*r* counterclockwise around an axis 975 oriented in the cross direction.

The first patterning roll 960 is positioned with respect to the second patterning roll 970 such that, as the rolls rotate, the tips of the male elements 961 are always unmated with the tips of the male elements 971; that is, when the tips of the male elements 961 and 971 pass by each other, the tips of the male elements 961 are never closer to the axis 975 than the tips of the male elements 971 and the tips of the male elements 971 are never closer to the axis 965 than the tips of the male elements 961. As a result, there is no intermeshing of the male elements 961 and 971, as the rolls 960 and 970 rotate; so, the rolls 960 and 970 are unmated, with respect to each other.

The first patterning roll 960 is also positioned with respect to the second patterning roll 970 such that, as the rolls rotate, while the first substrate 910 is engaged with the first patterning roll 960 and while the second substrate 920 is engaged with the second patterning roll 970, the tips of the male elements 961 come within joining proximity of the tips of the male elements 971; that is, when the tips of the male elements 961 pass by the tips of the male elements 971, a substrate engaged with the male elements 961 can be directly connected to a substrate engaged with the male elements 971. As a result, the rolls 960 and 970 can join substrates to form a laminate, as they rotate; so, the rolls 960 and 970 are joining rolls with respect to each other.

The first patterning roll 960 is registered with the second patterning roll 970 in both the machine direction and the cross direction, to enable the connection of the substrates 910 and 920. The registration in the machine direction includes controlling the relative angular positions of the rolls 960 and 970, such that, as the rolls 960 and 970 rotate, the tips of the male elements 961 and 971 pass by each other in joining proximity, so the opposing tips of the male elements can position protrusions from the first substrate 910 with protrusions from the second substrate 920 along their overall lengths, to form direct connections, as described and illustrated in connection with FIG. 12B. The registration in the cross direction includes positioning the roll faces of the rolls 960 and 970, such that, as the rolls 960 and 970 rotate, when the tips of the male elements 961 are in joining proximity with the tips of the male elements 971, the tips are aligned in the cross direction opposite from each other, so the opposing tips can position protrusions from the first substrate 910 with protrusions from the second substrate 920 across their widths, to form direct connections, as described and illustrated in connection with FIG. 12A.

The third patterning roll 980 is a ring-roll that rotates 980-*r* counterclockwise around an axis 985 oriented in the cross direction. The third patterning roll 980 has a roll face with a cylindrical base and a plurality of rigid, elongated, continuous male elements 981 attached to the base as radial projections. The male elements 981 are like rows of rings, and are disposed linearly, in parallel, side-by-side, with adjacent rings separated by recesses 982. Each of the rings is elongated since it has an overall length that is greater than its overall width. And, each of the male elements 981 is oriented lengthwise in the machine direction, such that its overall length is parallel with the rotation of the roll 980. Each of the male elements 981 is continuous with an overall length that continues all the way around the roll face of the roll 980. Alternatively, the male elements can be oriented in the cross direction, continuous with an overall length that continues across the roll face width of the roll 980. Each of the male elements 981 has a distal outer surface that forms a tip, which is the part of the male element that is farthest from the axis 995. The fourth patterning roll 990 is also a ring-roll with male elements 991 forming recesses 992 therebetween and is configured in the same way as the third patterning roll 980, except that the roll 990 rotates 980-*r* clockwise around an axis 995 oriented in the cross direction.

The third patterning roll 980 is positioned with respect to the first patterning roll 960 such that, as the rolls rotate, the continuous male elements 981 mate with the tips of the discrete male elements 961; that is, the tips of the male elements 961 pass within the recesses 982 formed by the male elements 981 and the male elements 981 pass within the recesses formed by the tips of the male elements 961. As a result, there is an intermeshing of the male elements 961 and male elements 981 as the rolls 960 and 980 rotate; so, the rolls 960 and 980 are mated, with respect to each other.

The third patterning roll 980 is registered with the first patterning roll 960 in the cross direction, to enable the incremental stretching of the substrate 910. The registration in the cross direction includes positioning the roll faces of the rolls 960 and 980, such that, as the rolls 960 and 980 rotate, the tips of the continuous male elements 981 are offset in the cross direction from the tips of the discrete male elements 961, so the tips can intermesh to form incrementally stretched protrusions in the first substrate 910, as described and illustrated in connection with FIG. 10A. That is, the tips of the male elements 961 pass within the recesses 982 formed by the male elements 981 and the male elements 981 pass within the recesses 962 formed by the tips of the male elements 961. Since the male elements 981 are continuous, there is no need to register the third patterning roll 980 with the first patterning roll 960 in the machine direction.

The fourth patterning roll 990 is ring roll positioned and registered with the second patterning roll 970 in the same way that the third patterning roll 980 is positioned and registered with the first patterning roll 960, such that, the rolls 990 and 970 are mated, with respect to each other, and the tips of the continuous male elements 991 intermesh with the tips of the discrete male elements 971, that is, the tips of the male elements 971 pass within the recesses 992 formed by the male elements 991 and the male elements 991 pass within the recesses 972 formed by the tips of the male elements 971. As a result of the intermeshing of the male elements 971 and male elements 991 as rolls 970 and 990 rotate; the second substrate 920 is incrementally stretched forming protrusions in the second substrate 920, as described and illustrated in connection with FIG. 10B. Since the male elements 991 are continuous, there is no need to register the fourth patterning roll 990 with the second patterning roll 970 in the machine direction.

The machine 902 also includes several additional apparatuses. A first web supply apparatus 950-1 is positioned upstream from the third patterning roll 980 and supplies the first substrate 910 in the form of a nonwoven web; a web supply apparatus can take any convenient form, such as an unwind stand. Similarly, a second web supply apparatus 950-2 is positioned upstream from the fourth patterning roll 990 and supplies the second substrate 920 in the form of a web. An adhesive application apparatus 952 is positioned adjacent to the first patterning roll 960 and applies adhesive to a substrate engaged with the male elements 961 of the roll 960; an adhesive application apparatus can take any convenient form, such as a glue head with a comb shim, a gravure print roll, an inkjet printer, etc. A force application apparatus 954 includes a first part that pushes and holds the third patterning roll 980 into mating relation with the first patterning roll 960 and a second part that pushes and holds the fourth patterning roll 990 into mating relation with the second patterning roll 970; a force application apparatus can take any convenient form, such as air cylinders that move the rolls' rotating axes.

The first substrate 910 generally moves through the machine 902 from left to right, as indicated by its overall machine direction. The first substrate 910 moves 910-*m* from the first web supply apparatus 950-1 onto the third patterning roll 980, then between the intermeshing male elements 961 and male elements 981 of the mated rolls 960 and 980, then past the adhesive application apparatus 952, and then into the joining proximity between the protrusions 961 and 971 of the rolls 960 and 970. As the first substrate 910 is supplied by the first web supply apparatus 950-1, the first substrate 910 has the form of a substantially flat, unformed, continuous web. The first substrate 910 moves 910-*m* from the first web supply apparatus 950-1 and follows the roll face of the third patterning roll 980. As the third patterning roll 980 rotates, the first substrate 910 moves into and engages with the intermeshing male elements 981 and male elements 961 of the patterning rolls 980 and 960, which incrementally mechanically stretch the first substrate 910 to form a plurality of protrusions, as described and illustrated in connection with FIG. 10A. As the patterning rolls 980 and 960 rotate, the first substrate 910 moves out of the intermeshing male elements 961 and male elements 981 and disengages from the male elements 981 of the third patterning roll 980 but remains engaged with the male elements 961 of the first patterning roll 960 and follows the roll face of the first patterning roll 960. As the first patterning roll 960 rotates farther, the first substrate 910 continues to follow the roll face of the first patterning roll 960, remaining engaged with the male elements 961, and moving past the adhesive application apparatus 952, which applies adhesive to the first distal ends of the first protrusions of the first substrate 910, as described and illustrated in connection with FIGS. 11A and 11C. The adhesive application apparatus 952 can be positioned adjacent to the first patterning roll 960 at any convenient location downstream from the disengagement of the first and third rolls 960 and 980 and upstream from the joining proximity of the first and second rolls 960 and 970. In alternative embodiments, another adhesive application apparatus (in addition to or instead of the adhesive application apparatus 952) can be adjacent to the second patterning roll 970 at any convenient location downstream from the disengagement of the second and fourth rolls 970 and 990 and upstream from the joining proximity of the first and second rolls 960 and 970. As the first patterning roll 960 rotates even farther, the first substrate 910 continues to follow the roll face of the first patterning roll 960, remaining engaged with the male elements 961, and moving between the patterning rolls 960 and 970.

The second substrate 920 generally moves through the machine 902 from right to left, as indicated by its overall machine direction. The second substrate 920 moves 920-*m* from the second web supply apparatus 950-2 onto the fourth patterning roll 990, then between the intermeshing male elements 971 and male elements 991 of the mated rolls 970 and 990, and then into the joining proximity between the male elements 971 and male elements 991 of the rolls 970 and 990. As the second substrate 920 is supplied by the second web supply apparatus 950-2, the second substrate 920 has the form of a substantially flat, unformed, continuous web. The second substrate 920 moves 920-*m* from the second web supply apparatus 950-2 and follows the roll face of the fourth patterning roll 990. As the fourth patterning roll 990 rotates, the second substrate 920 moves into and engages with the intermeshing male elements 991 and male elements 971 of the patterning rolls 990 and 970, which incrementally mechanically stretch the second substrate 920 to form a plurality of second protrusions, as described and illustrated in connection with FIG. 10B. As the patterning rolls 990 and 970 rotate, the second substrate 920 moves out of the intermeshing male elements 991 and male elements 971 and disengages from the male elements 991 of the fourth patterning roll 990 but remains engaged with the male elements 971 of the second patterning roll 970 and follows the roll face of the second patterning roll 970. As the second patterning roll 970 rotates farther, the second substrate 920 continues to follow the roll face of the second patterning roll 970, remaining engaged with the male elements 971, as described and illustrated in connection with FIG. 11B. As the second patterning roll 970 rotates even farther, the second substrate 920 continues to follow the roll face of the second patterning roll 970, remaining engaged with the male elements 971, and moving between the patterning rolls 970 and 960.

As the first patterning roll 960 and the second patterning roll 970 rotate farther, the first substrate 910 is engaged with the first patterning roll 960, the second substrate 920 is engaged with the second patterning roll 970, and the tips 962 of the male elements 961 of the first patterning roll 960 come into joining proximity with the tips 972 of the male elements 971 of the second patterning roll 970, such that the first distal ends 912 of the first protrusions 911 from the first substrate 910 become connected by the adhesive to the second distal ends 922 of the second protrusions 921 from the second substrate 920, to form the bonded formed laminate 900, which moves 900-m off of the rolls 960 and 970 in its finished form.

FIG. 10A illustrates an enlarged partial cross-section view of a portion 1003-a of the machine 902 of FIG. 9, showing the male elements 961 of the first patterning roll 960 intermeshing with the male elements 981 of the third patterning roll 980 in recesses 982 to incrementally stretch the first substrate 910, and form a plurality of first protrusions 911 in the first substrate 910. On the left and right sides of the portion 1003-a where there are no male elements of the first patterning roll 960 intermeshing with the male elements 981 of the third patterning roll 980, undeformed portions of the first substrate 910 lie on top of the male elements 981 of the third patterning roll 980, in the first plane 914 of the first substrate 910.

FIG. 10B illustrates an enlarged partial cross-section view of a portion 1003-b of the machine 902 of FIG. 9, showing the male elements 971 of the second patterning roll 970 intermeshing with the male elements 991 of the fourth patterning roll 990 in recesses 992 to incrementally stretch the second substrate 920, and form a plurality of second protrusions 921 in the second substrate. On the left and right sides of the portion 1003-b where there are no male elements of the second patterning roll 970 intermeshing with the male elements 991 of the fourth patterning roll 990, undeformed portions of the second substrate 920 lie on top of the male elements 991 of the fourth patterning roll 990, in the second plane 924 of the second substrate 920.

Figure 11A:
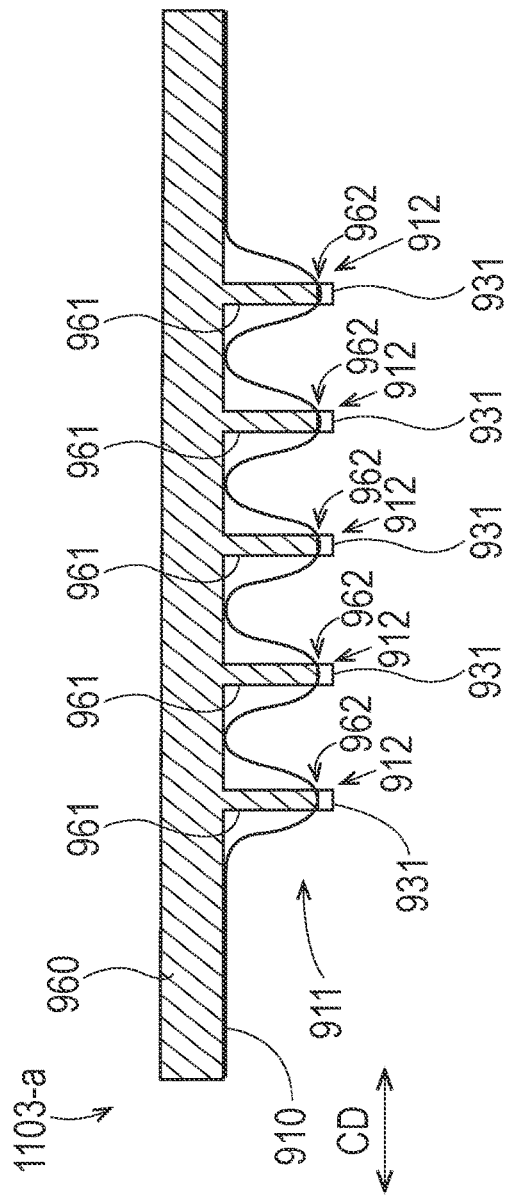
FIG. 11A illustrates an enlarged partial cross-sectional view of the first substrate engaged with the first patterning roll from the machine of FIG. 9, wherein an adhesive is applied to distal ends of protrusions of the first substrate.

FIG. 11A illustrates an enlarged partial cross-sectional view of a portion 1103-a of the machine 902 of FIG. 9, at a location downstream from the portion 1003-a of FIG. 10A, showing the protrusions 911 of the first substrate 910 engaged with the male elements 961 of the first patterning roll 960, wherein the first distal end 912 of the first protrusions 911 are disposed on tips 962 of the male elements 961 of the first pattern roll 960 and an adhesive 931 is selectively applied to the first distal ends 912. In FIG. 11A, the undeformed portions of the first substrate 910 are in the same positions as in FIG. 10A.

Figure 11B:
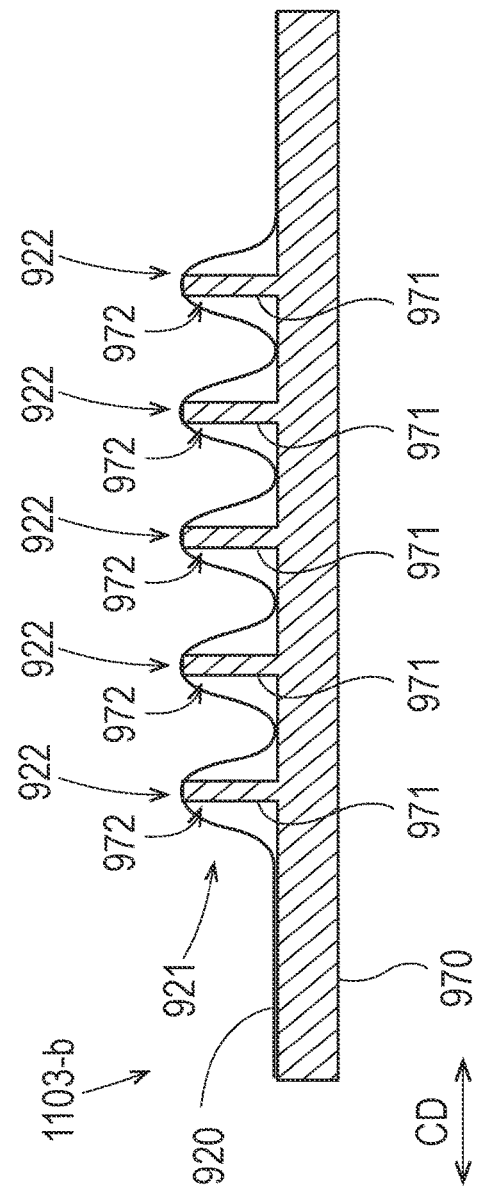
FIG. 11B illustrates an enlarged partial cross-sectional view of the second substrate engaged with the second patterning roll from the machine of FIG. 9.

FIG. 11B illustrates an enlarged partial cross-sectional view of a portion 1103-b of the machine 902 of FIG. 9, at a location downstream from the portion 1003-b of FIG. 10B, showing the protrusions 921 of the second substrate 920 engaged with the male elements 971 of the second patterning roll 970, wherein the second distal ends 922 of the protrusions 921 are disposed on tips 972 of the male elements 971 of the second pattern roll 970. In FIG. 11B, the undeformed portions of the second substrate 920 are in the same positions as in FIG. 10B.

Figure 11C:
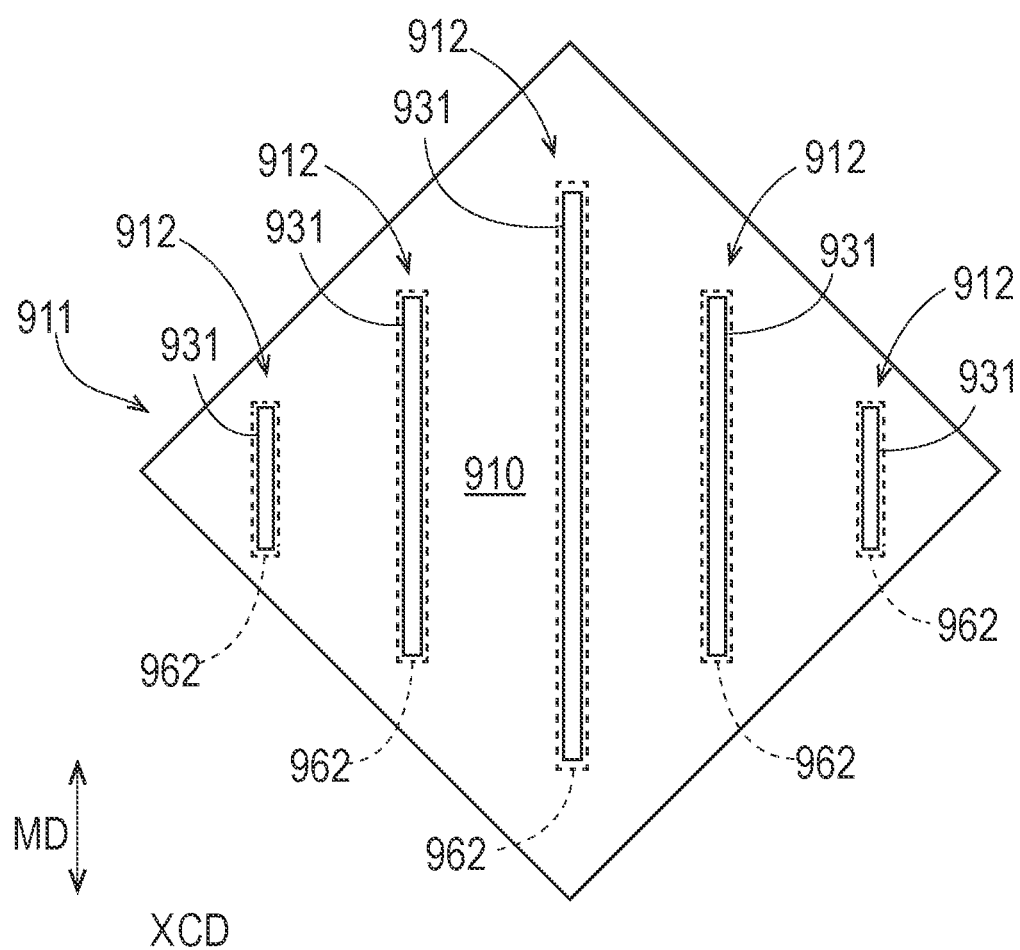
FIG. 11C illustrates a partial outside view of the first substrate of FIG. 11A.

FIG. 11C illustrates a partial outside view of the first substrate 910 (shown in broken part) of FIG. 11A engaged with the first patterning roll 960 (not shown), showing the first distal ends 912 of the protrusions 911 disposed on the tips 962 (shown as hidden) of the protrusions 961 and the adhesive 931 selectively applied to the first distal ends 912.

Figure 12A:
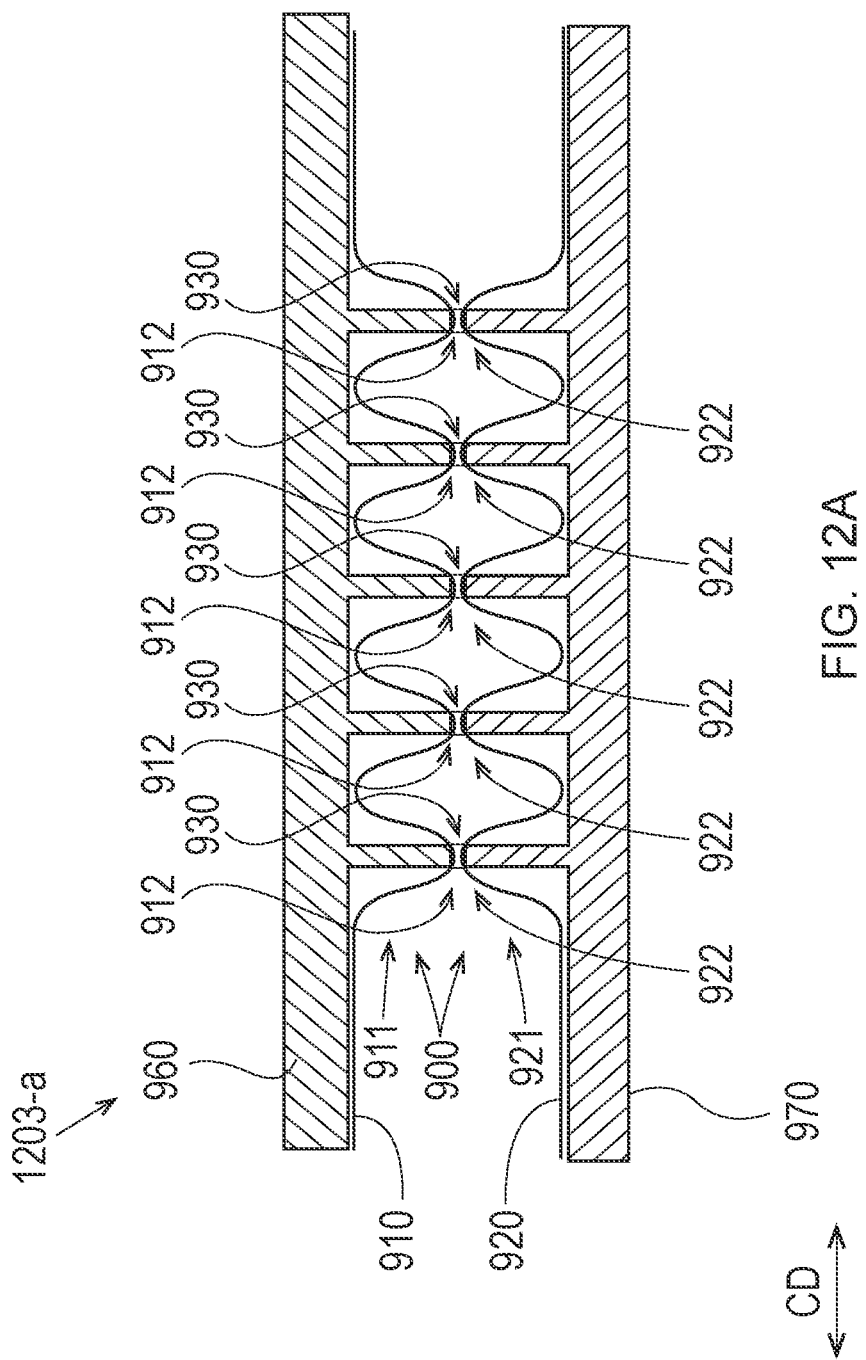
FIG. 12A illustrates an enlarged partial cross-sectional view in the machine direction of the distal ends of the protrusions from the first substrate being adhesively connected to the distal ends of the protrusions from the second substrate, while the substrates are engaged with patterning rolls from the machine of FIG. 9, to form the bonded formed laminate of FIG. 4A.

FIG. 12A illustrates an enlarged partial cross-sectional view (in the machine direction) of a portion 1203-a of the machine 902 of FIG. 9, at a location downstream from the portions 1103-a of FIG. 11A and 1103-b of FIG. 11B, wherein the first substrate 910 is engaged with the first patterning roll 960, the second substrate 920 is engaged with the second patterning roll 970, and the male elements 961 of the first patterning roll 960 are in joining proximity with the male elements 971 of the second patterning roll 970, such that the first distal ends 912 of the first protrusions 911 from the first substrate 910 are being adhesively connected to the second distal 922 of the second protrusions 921 from the second substrate 920 at a plurality of attachment areas 930, to form the bonded formed laminate 900 of FIG. 9.

Figure 12B:
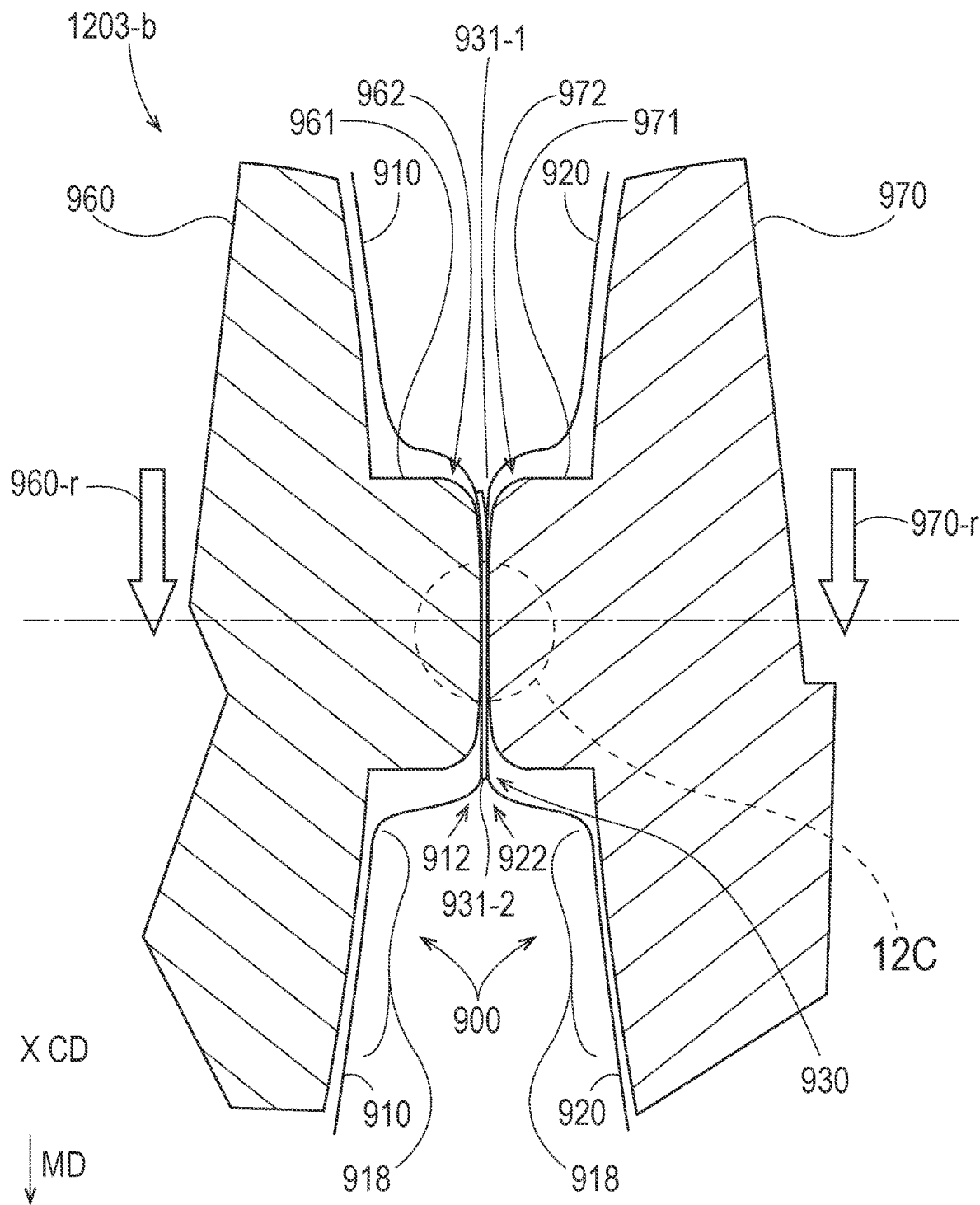
FIG. 12B illustrates an enlarged partial cross-sectional view in the cross direction of a first distal end of the first protrusions from the first substrate being adhesively connected to a second distal end of the second protrusions from the second substrate, while the substrates are engaged with patterning rolls from the machine of FIG. 9, to form the bonded formed laminate of FIG. 4.

FIG. 12B illustrates an enlarged partial cross-sectional view (in the cross direction) of the portion 1203-a of FIG. 12A, wherein the first substrate 910 is engaged with the first patterning roll 960, the second substrate 920 is engaged with the second patterning roll 970, and the 962 of one of the male elements 961 of the first patterning roll 960 is in joining proximity with the tip 972 of one of the male elements 971 of the second patterning roll 970, such that one of the first distal ends 912 of the first protrusions 911 from the first substrate 910 is being connected by an adhesive 931-1 and 931-2 to one of the second distal ends 922 of the second protrusions 921 from the second substrate 920 at an attachment area 930, to form the bonded formed laminate 900 of FIG. 9. A first portion of the adhesive 931-1 is an upstream portion of the adhesive and is disposed on the first substrate 910 but not yet in contact with the second substrate 920. A second portion of the adhesive 931-2 is a downstream portion of the adhesive and is contact with both the first substrate 910 and the second substrate 920.

Figure 12C:
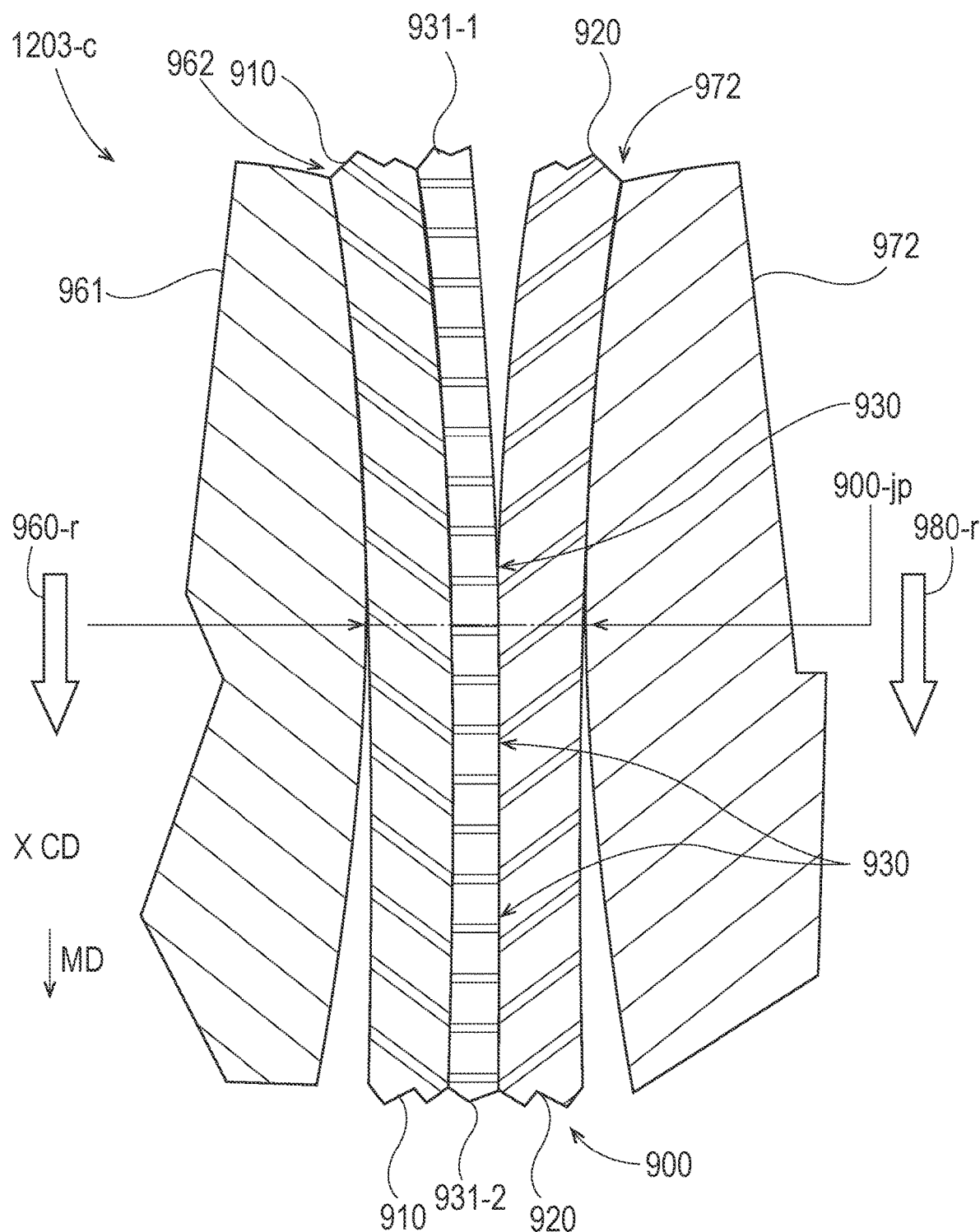
FIG. 12C illustrates a further enlarged portion of the view from FIG. 12B.

FIG. 12C illustrates a further enlarged portion of the view from FIG. 12B, wherein the first substrate 910 is engaged with the first patterning roll 960, the second substrate 920 is engaged with the second patterning roll 970, and the tip 962 of one of the male elements 961 of the first patterning roll 960 is in joining proximity 900-jp with the tip 972 of one of the male elements 971 of the second patterning roll 970. Upstream from the joining proximity 900-jp, the first substrate 910 is separate from the second substrate 920, and a first portion of the adhesive 931-1 is disposed on an outer portion of a first distal end 912 of a first protrusion 911 of the first substrate 910. At the joining proximity 900-jp, the tips 962 and 972 pass by each other, and the adhesive comes into contact with an outer portion of a second distal end 922 of a second protrusion 921 of the second substrate 920. Downstream from the joining proximity 900-jp, a second portion of the adhesive 931-2 connects the first distal end 912 of the first substrate 910 to the second distal end 922 of the second substrate 920, such that the adhesively connected substrates 910 and 920 form the bonded formed laminate 900 of FIG. 9.

FIG. 13 is an assembly diagram illustrating a machine 1402 with four solid state formation rolls, which are a first patterning roll 1460, a second patterning roll 1470, a third patterning roll 1480, and a fourth patterning roll 1490, wherein the machine incrementally stretches a first substrate 1410 and a second substrate 1420 and joins the substrates together to form a bonded formed laminate 1400. The first and third patterning rolls 1460 and 1480 incrementally stretch the first substrate 1410; the second and fourth patterning rolls 1470 and 1490 incrementally stretch the second substrate 1420. While the first substrate 1410 is engaged with the first patterning roll 1460 and while the second substrate 1420 is engaged with the second patterning roll 1470, the first and second patterning rolls 1460 and 1470 join together the first and second substrates 1410 and 1420 to form the laminate 1400. In FIG. 13, the overall machine direction for the first substrate 1410 is shown on the left as an arrow pointing to the right and the overall machine direction for the second substrate 1420 is shown on the right as an arrow pointing to the left; however, for each of these substrates, the precise machine direction at any particular point is defined by the path of the substrate as it travels through the machine.

The machine 1402 of FIG. 13 is configured in the same way as the machine 902 of FIG. 9, with like-numbered elements configured in the same way, except as described differently below. The first patterning roll 1460 is a ring-roll with continuous male elements 1461. The second patterning roll 1470 is also a ring-roll with continuous male elements 1471. The rolls 1460 and 1470 are unmated joining rolls, with respect to each other, and are registered with each other in the cross direction, to enable the connection of the substrates 1410 and 1420. Since the male elements 1461 and 1471 are continuous, there is no need to register the first patterning roll 1460 with the second patterning roll 1470 in the machine direction.

The third patterning roll 1480 is a SELF'ing roll with discrete male elements 1481. The third patterning roll 1480 intermeshes with the first patterning roll such that the third patterning roll 1480 is mated to the first patterning roll 1460, and the third patterning roll 1480 is registered to the first patterning roll 1460 in the cross direction, to enable the incremental stretching of the first substrate 1410. Since the male elements 1461 are continuous, there is no need to register the third patterning roll 1480 with the first patterning roll 1460 in the machine direction.

The fourth patterning roll 1490 is also a SELF'ing roll with discrete male elements 1491. The fourth patterning roll 1490 intermeshes with the second patterning roll 1470 such that the fourth patterning roll 1490 is mated to the second patterning roll 1470, and the fourth patterning roll 1490 is registered to the second patterning roll 1470 in the cross direction, to enable the incremental stretching of the second substrate 1420. Since the male elements 1471 are continuous, there is no need to register the fourth patterning roll 1490 with the second patterning roll 1470 in the machine direction.

In various embodiments, the machine 1402 of FIG. 13 can be configured according to any alternative machine embodiments disclosed herein, in any workable combination.

FIG. 14A illustrates an enlarged partial cross-section view of a portion of the machine 1402 of FIG. 13, showing the male elements 1461 of the first patterning roll 1460 intermeshing with the male elements 1481 of the third patterning roll 1480 to incrementally stretch the first substrate 1410, and form a plurality of first protrusions 1411. On the left and right sides of the portion where there are no male elements of the third patterning roll 1480 intermeshing with the protrusions 1461 of the first patterning roll 1460, undeformed portions of the first substrate 1410 lie on top of the protrusions 1461, in the first plane 1414 of the first substrate 1410.

FIG. 14B illustrates an enlarged partial cross-section view of a portion of the machine 1402 of FIG. 13, showing the male elements 1471 of the second patterning roll 1470 intermeshing with the male elements 1491 of the fourth patterning roll 1490 to incrementally stretch the second substrate 1420, and form a plurality of second protrusions 1421. On the left and right sides of the portion where there are no male elements of the fourth patterning roll 1490 intermeshing with the male elements 1471 of the second patterning roll 1470, undeformed portions of the second substrate 1420 lie on top of the male elements 1471, in the second plane 1424 of the second substrate 1420.

FIG. 15A illustrates an enlarged partial cross-sectional view of a portion of the machine 1402 of FIG. 13, at a location downstream from the portion of FIG. 14A, showing the first protrusions 1411 of the first substrate 1410 disposed in recesses 1463 of the first patterning roll 1460, wherein the bases 1412 of the first protrusions 1411 are disposed on tips 1462 of the male elements 1461 and an adhesive 1431 is selectively applied to the first lower surface 1416 of the first substrate 1410 on the first bases 1412. In FIG. 15A, the undeformed portions of the first substrate 1410 are in the same positions as in FIG. 14A, and the undeformed portions of the first substrate 1410 also receive the adhesive 1431 selectively applied across their widths at locations opposite the tips 1462 of the male elements 1461.

FIG. 15B illustrates an enlarged partial cross-sectional view of a portion of the machine 1402 of FIG. 13, at a location downstream from the portion of FIG. 14B, showing the second protrusions 1421 of the second substrate 1420 disposed in recesses 1473 of the second patterning roll 1470, wherein the bases 1422 of the second protrusions 1421 are disposed on tips 1472 of the male elements 1471. In FIG. 15B, the undeformed portions of the second substrate 1420 are in the same positions as in FIG. 14B.

Figure 16:
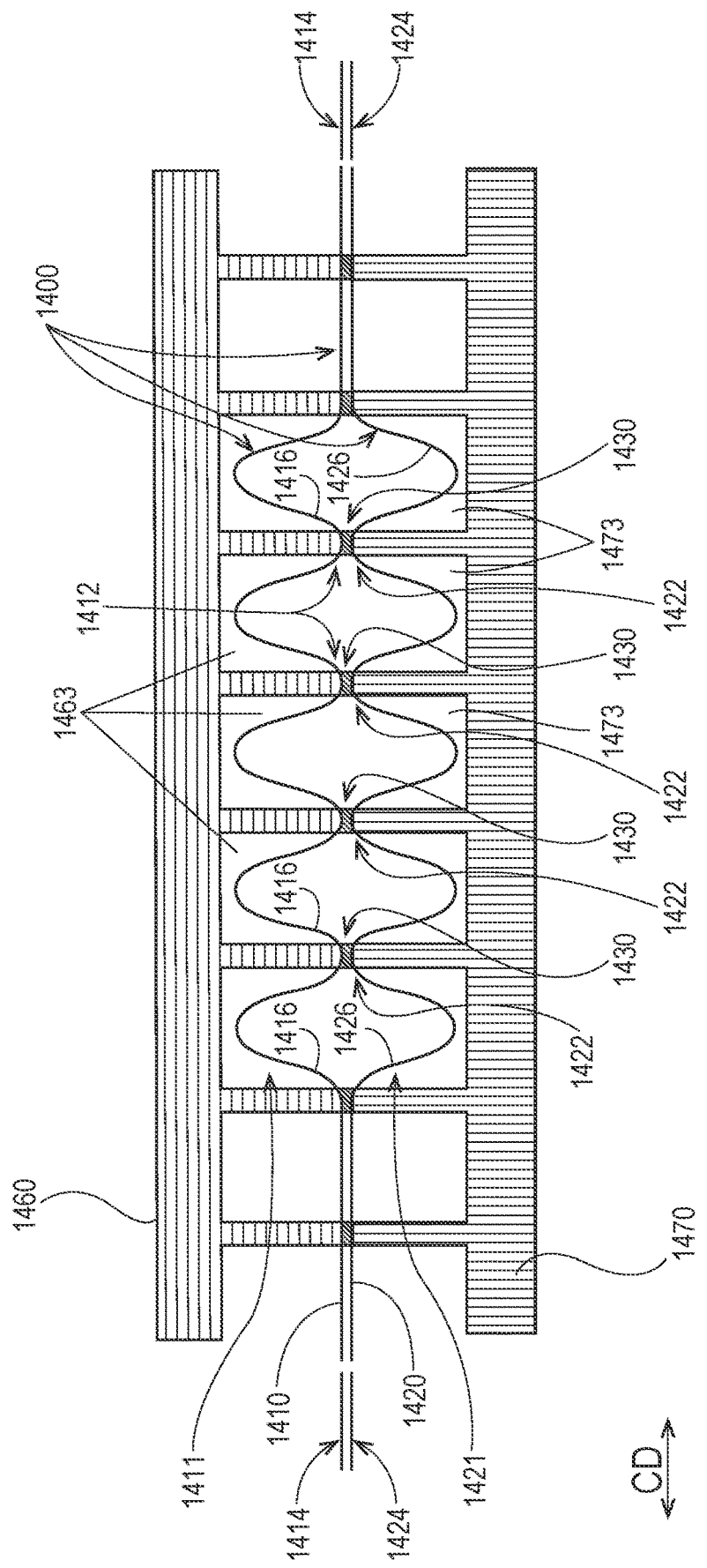
FIG. 16 illustrates an enlarged partial cross-sectional view in the machine direction of the first regions on the first lower surface of the first substrate are adhesively connected to the second region on the second lower surface of the second substrate at a plurality of attachment areas and the undeformed portions of the first substrate are being adhesively connected to the undeformed portions of the second substrate while the substrates are engaged with patterning rolls from the machine of FIG. 13 to form the bonded formed laminate of FIG. 6A.

FIG. 16 illustrates an enlarged partial cross-sectional view (in the machine direction) of a portion of the machine 1402 of FIG. 13, at a location downstream from the portions of FIG. 15A and of FIG. 15B, wherein the first substrate 1410 is engaged with the first patterning roll 1460, the second substrate 1420 is engaged with the second patterning roll 1470, and the male elements 1461 of the first patterning roll 1460 are in joining proximity with the male elements 1471 of the second patterning roll 1470, such that the bases 1412 in the first plane 1414 on the first lower surface 1416-a of the first substrate 1410 are adhesively connected to the bases 1422 in the second plane 1424 on the second lower surface 1426 from the second substrate 1420 at a plurality of attachment areas 1430, and the undeformed portions of the first substrate 1410 are being adhesively connected to the undeformed portions of the second substrate 1420, to form the bonded formed laminate 1400 of FIG. 13.

Although the machine embodiments disclosed herein describe and illustrate SELF'ing rolls and solid state formation elements as rotating patterning rolls, in various embodiments, any such rolls may be replaced by one or more other kinds of solid state formation elements, such as planar patterning surfaces having similar protrusions, but which move into mating relationship and/or joining proximity with non-rotating movement (e.g. linear motion), as will be understood by one skilled in the art of solid state formation.

Figure 17:
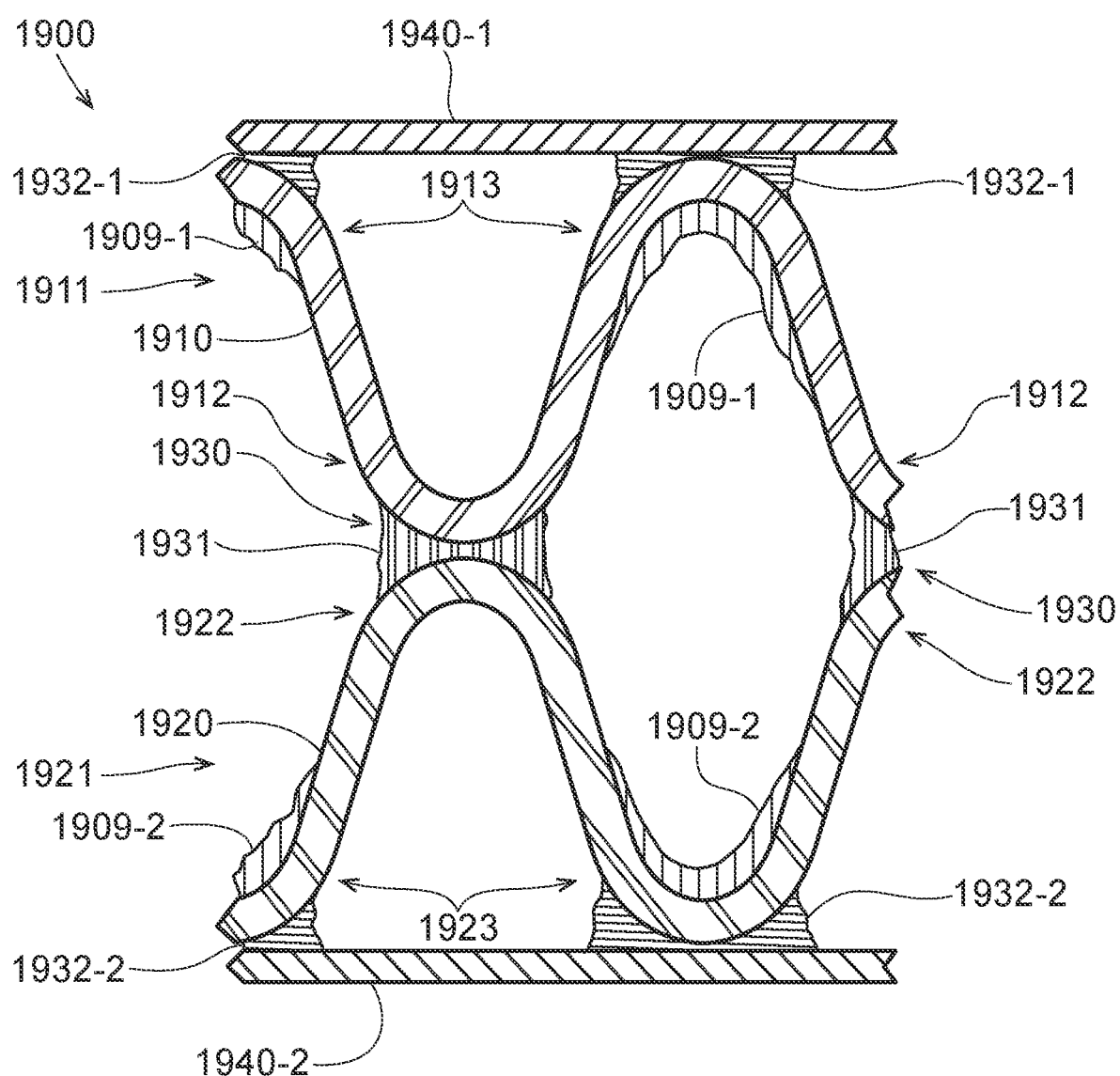
FIG. 17 is an enlarged cross-sectional view of a portion of a laminate with a patterned area formed by first and second substrates along with outer films, wherein the laminate includes benefit agents disposed at locations within the laminate.

FIG. 17 is an enlarged cross-sectional view of a portion of a laminate 1900 with a patterned area formed by a first substrate 1910 and a second substrate 1920 along with a first outer substrate 1940-1 and a second outer substrate 1940-2 wherein the laminate includes benefit agents disposed at locations within the laminate 1900. The portion of the laminate 1900 is configured in the same way as a corresponding portion from the laminate 500-a of FIG. 5A and is also configured in the same way as a corresponding portion from the laminate 700-a of FIG. 7A, with like-numbered elements in configured in the same way, except as described below.

The first distal ends 1912 of the protrusions 1911 from the first substrate 1910 are connected by an adhesive 1931 to the second distal ends 1922 of the protrusions 1921 from the second substrate 1920 at attachment areas 1930, and the adhesive 1931 includes one or more benefit agents, which can be any benefit agent disclosed herein or known in the art; for any laminate disclosed herein, any adhesive that connects the distal ends of protrusions of first and second substrates, can include a benefit agent, which can be mixed into the adhesive and thus disposed on the laminate as part of the adhesive application process.

The inner portions of the first region 1913 of the first protrusions 1911 from the first substrate 1910 include a benefit agent 1909-1 disposed on their surfaces, and the inner portions of the second regions 1923 of the protrusions 1921 from the second substrate 1920 include a benefit agent 1909-2 disposed on their surfaces; the benefit agents 1909-1 and 1909-2 can be one or more of any benefit agent disclosed herein or known in the art, and may be applied directly or indirectly to the surfaces, in any convenient way (e.g. by spraying on) disclosed herein or known in the art.

The outer portions of the first region 1913 of the first protrusions 1911 from the first substrate 1910 are connected by an adhesive 1932-1 at a plurality of locations to an inner side of the first outer substrate 1940-1 and the outer portions of the second regions 1923 of the second protrusions 1921 from the second substrate 1920 are connected by an adhesive 1932-2 at a plurality of locations to an inner side of the second outer substrate 1940-2, wherein the adhesive 1932-1 and the adhesive 1932-2 each include one or more benefit agents, which can be any benefit agent disclosed herein or known in the art; for any laminate disclosed herein having an outer substrate, any adhesive that connects the regions of protrusions of a substrate to an outer substrate, can include a benefit agent, which can be mixed into the adhesive and thus disposed on the laminate as part of the adhesive application process.

In various alternative, embodiments, the presence of some or all of the benefit agents disposed in the portion of the laminate 1900 may be omitted; the presence or absence of benefit agents may be repeated across part, parts, or all of a laminate.

The nonwoven materials of at least some embodiments described herein are intended to better preserve the structure of discrete protrusions in the nonwoven materials. Such nonwoven materials and method of making such materials described hereunder are disclosed in U.S. Pat. No. 10,045,888.

Figure 18A:
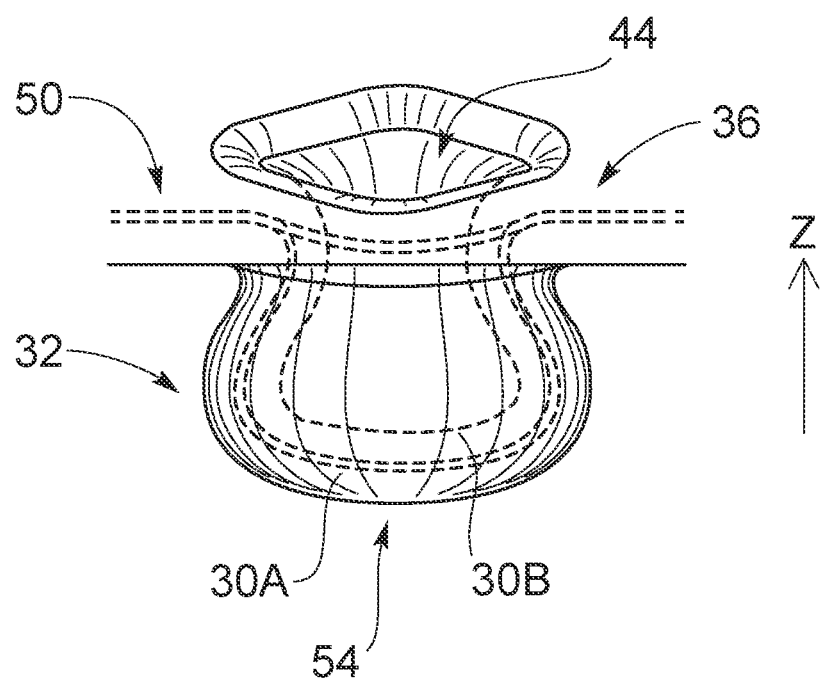
FIG. 18A is a perspective view of a protrusion in a two-layer nonwoven material with the opening facing upward.
Figure 18B:
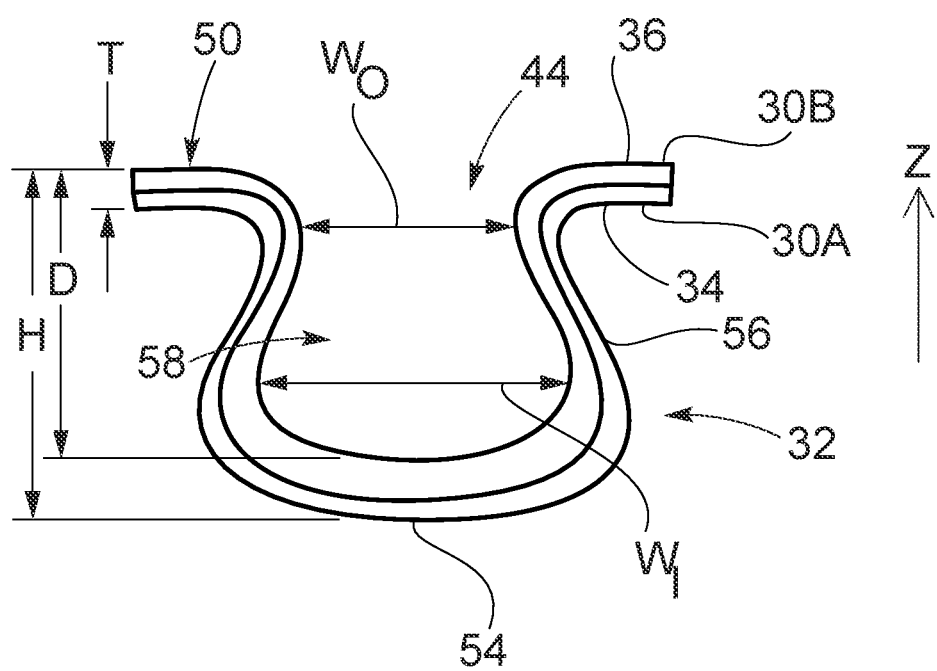
FIG. 18B is a schematic view of a protrusion in a two-layer nonwoven material.

FIGS. 18A and 18B show an example of nonwoven substrate 30 with three-dimensional deformations comprising discrete protrusions 32 therein. The term "deformation", as used herein, includes both the protrusions 32 formed on one side of the nonwoven material and the base openings 44 formed in the opposing side of the material. The base openings 44 are most often not in the form of an aperture or a through-hole and may instead appear as depressions. The base openings 44 can be analogized to the opening of a bag. A bag has an opening that typically does not pass completely through the bag.

The nonwoven substrates 30 have an upper surface 34, a lower surface 36, and a thickness T therebetween. In each of FIGS. 18A and 18B, protrusion 32 is oriented downward with respect to the upper surface 36 and the base opening 44 oriented upward. The protrusions 32 may, in some cases, be formed from looped fibers (which may be continuous) that are pushed outward so that they extend out of the plane of the nonwoven web in the Z-direction. The protrusions 32 will typically comprise more than one looped fiber. In some cases, the protrusions 32 may be formed from looped fibers and at least some broken fibers. In addition, in the case of some types of nonwoven materials (such as carded materials, which are comprised of shorter fibers), the protrusions 32 may be formed from loops comprising multiple discontinuous fibers. The looped fibers may be: aligned (that is, oriented in substantially the same direction); not be aligned; or, the fibers may be aligned in some locations within the protrusions 32, and not aligned in other parts of the protrusions.

The protrusions 32 may comprise fibers that at least substantially surround the side walls 56 of the protrusions. This means that there are multiple fibers that extend (e.g., in the Z-direction) from the base 50 of the protrusions 32 to the distal end 54 of the protrusions and contribute to form a portion of the side walls 56 and distal end 54 of a protrusion. In some cases, the fibers may be substantially aligned with each other in the side walls 56 of the protrusions 32.

FIG. 18B shows a multi-layer nonwoven material 30 having a three-dimensional deformation in the form of a protrusion 32 on the upper surface 34 of the substrate that provides a wide base opening 44 on the lower surface 36 of the substrate. When there is more than one nonwoven layer, the individual layers can be designated 30A, 30B, etc.

As shown in FIG. 18B, the protrusions 32 form a bulbous shape and comprise: sidewalls proximate the upper surface 34 of the nonwoven substrate; an opposed enlarged distal end 54; and an interior 58. The "base" 50 of the protrusions 32 is on the lower surface 36 of the substrate surrounding opening 44. The protrusion 32 has a maximum interior width, $W_1$.

Also shown in FIG. 18B, the protrusions 32 have a depth D measured from the lower surface 36 of the nonwoven substrate to the interior of the protrusion at the distal end 54. The protrusions 32 have a height H measured from the lower surface 36 of the nonwoven web to the distal end 54 of the protrusions 32. The relationship between the various portions of the protrusions 32 may be such that as shown in FIG. 18B, when viewed from the end, the maximum interior width $W_1$ of the distal end 54 of the protrusion 32 is wider than the width, $W_O$, of the base opening 44.

In certain embodiments, similar-shaped looped fibers may be formed in each layer of multiple layer nonwoven materials, including in the layer 30A that is spaced furthest from the discrete male elements during the process of forming the protrusions 32 therein, and in the layer 30B that is closest to the male forming elements during the process. In the protrusions 32, portions of one layer such as 30B may fit within the other layer, such as 30A. These layers may be referred to as forming a "nested" structure in the protrusions 32. Formation of a nested structure may require the use of two (or more) highly extensible nonwoven precursor webs. In the case of two-layer materials, nested structures may form two complete loops, or two incomplete loops of fibers.

Figure 18C:
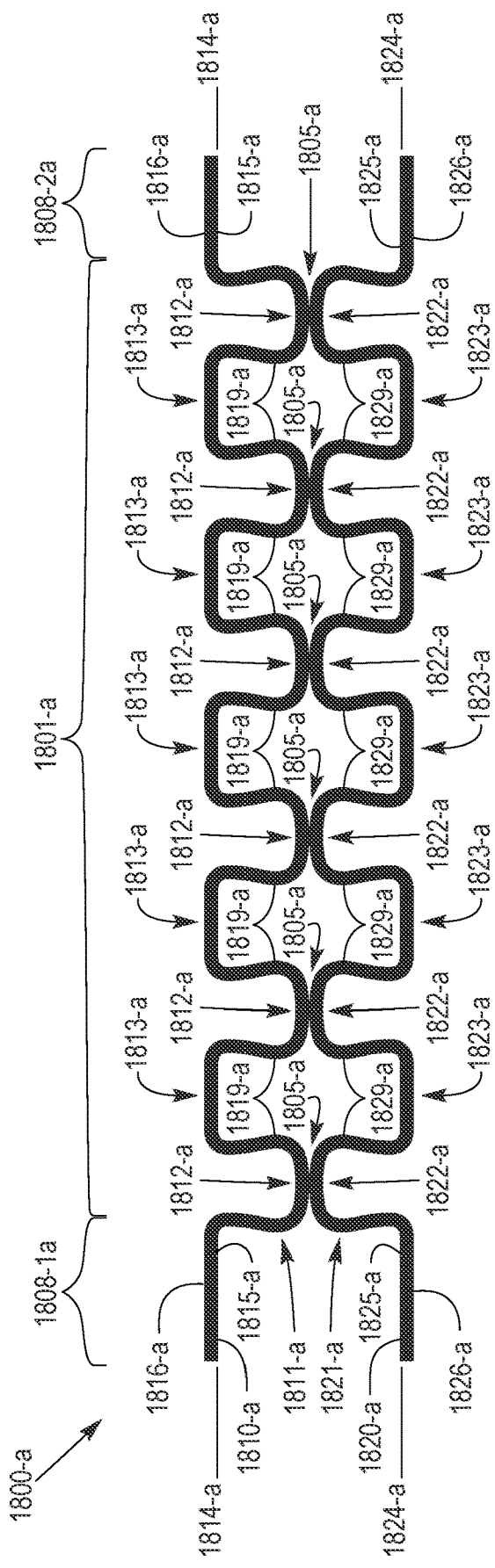
FIG. 18C illustrates an enlarged end view of a laminate with a patterned area formed by first and second substrates having deformed and undeformed portions, wherein within the deformed portion, distal ends of the discrete protrusions of the substrates are directly connected at attachment areas, and within the undeformed portions the substrates are offset.

Similar to the embodiment shown in FIG. 4 substrates including protrusions 32 described above and illustrated in FIGS. 18A and 18B can be combined and formed into a laminate. FIG. 18C illustrates an enlarged end view of a laminate 1800-*a* formed by a first substrate, which is a first nonwoven 1810-*a* having a first plane 1814-*a*, a first upper surface 1815-*a*, and a first lower surface 1816-*a* and a second substrate 1820-*a* having a second plane 1824-*a*, second upper surface 1825-*a* and a second lower surface 1826-*a*. The laminate 1800-*a* has a central deformed portion 1801-*a* and undeformed portions 1808-1*a* and 1808-2*a* disposed on either side of the deformed portion 1801-*a*. For this embodiment the first upper surface 1815*a* of the first nonwoven substrate 1810-*a* faces the second upper surface 1825*a* of the second substrate 1820-*a* such that the first and second upper surfaces 1815-*a* and 1825-*a* are directed toward the interior of the laminate. Within the deformed portion 1801-*a*, the first nonwoven substrate 1810-*a* is directly connected to the second substrate 1820-*a* at a plurality of discrete attachment areas 1805-*a*. Within the undeformed portions 1808-1*a* and 1808-2*a*, the first substrate 1810-*a* and the second substrate 1820-*a* are not connected but are offset from each other.

In the deformed portion 1801-*a*, the first substrate 1810-*a* has a plurality of discrete first protrusions 1811-*a* extending out of the first plane 1814-*a* on the first upper surface 1815-*a* wherein each of the first protrusions 1811-*a* has a first distal end 1812-*a* and a first sidewall 1819-*a* connecting the first distal end 1812-*a* to the first upper surface 1815-*a* in the first plane 1814-*a*. The first nonwoven substrate 1810-*a* includes a first region on the first lower surface 1816-*a* in the first plane 1814-*a* surrounding the first protrusions 1811-*a*. The first regions include the base 1813-*a* of the first protrusions 1811-*a* of the deformed regions 1801-*a* and the undeformed portions 1808-1*a* and 1808-2*a*. In the first substrate 1810-*a* of FIG. 18C, the first protrusions 1811-*a* have the same spacing and height, however, in various embodiments, for any laminate disclosed herein, a first substrate may have a patterned area with protrusions having varying spacing and height. The second substrate 1820-*a* has the same configuration as the first nonwoven substrate 1810-*a*, except that the second substrate 1820-*a* is configured and oriented as a mirrored version of the first substrate 1810-*a*, mirrored around an imaginary horizontal line disposed along the bottoms of the first distal ends 1812-*a* of the first protrusions 1811-*a* of the first nonwoven substrate 1810-*a*. So, in the deformed portion 1801-*a*, the second substrate 1820-*a* has a plurality of second protrusions 1821-*a* which are also discrete. The plurality of second protrusions 1821-*a* extend out of the second plane 1824-*a* on the second upper surface 1825-*a*. Each of the second protrusions 1821-*a* has a second distal end 1822-*a* and a second sidewall 1829-*a* connecting the second distal end 1822-*a* to the second upper surface 1825-*a* in the second plane 1824-*a*. The second substrate 1820-*a* includes a second region on the second lower surface 1826-*a* in the second plane 1824-*a* surrounding the second protrusions 1824-*a*. The second region includes the bases 1823-*a* of the second protrusions 1821-*a* of the deformed regions 1801-*a* and the undeformed regions 1808-1*a* and 1808-2*a*. Due to the mirrored configuration, the second protrusions 1821-*a* have the same center to center spacing and height as the first protrusions 1811-*a*, and all of the first and second distal ends 1812-*a* and 1822-*a* face inward while all of the first and second bases 1813-*a* and 1823-*a* face outward. The first nonwoven substrate 1810-*a* is aligned both side-to-side and lengthwise (into the page) with the second substrate 1820-*a* and is attached to the second substrate 1820-*a* by a plurality of attachment areas 1805-*a*. For the embodiment shown in FIG. 18C, each of the attachment areas 1805-*a* is directly connected to the first distal ends 1812-*a* of the first protrusions 1811-*a* and the second distal ends 1822-*a* of the second protrusions 1821-*a*. Since the attachment areas 1805-*a* attach the first nonwoven substrate 1810-*a* to the second substrate 1820-*a*, the first protrusions 1811-*a* have the same overall lengths as the second protrusions 1821-*a*.

Figure 18D:
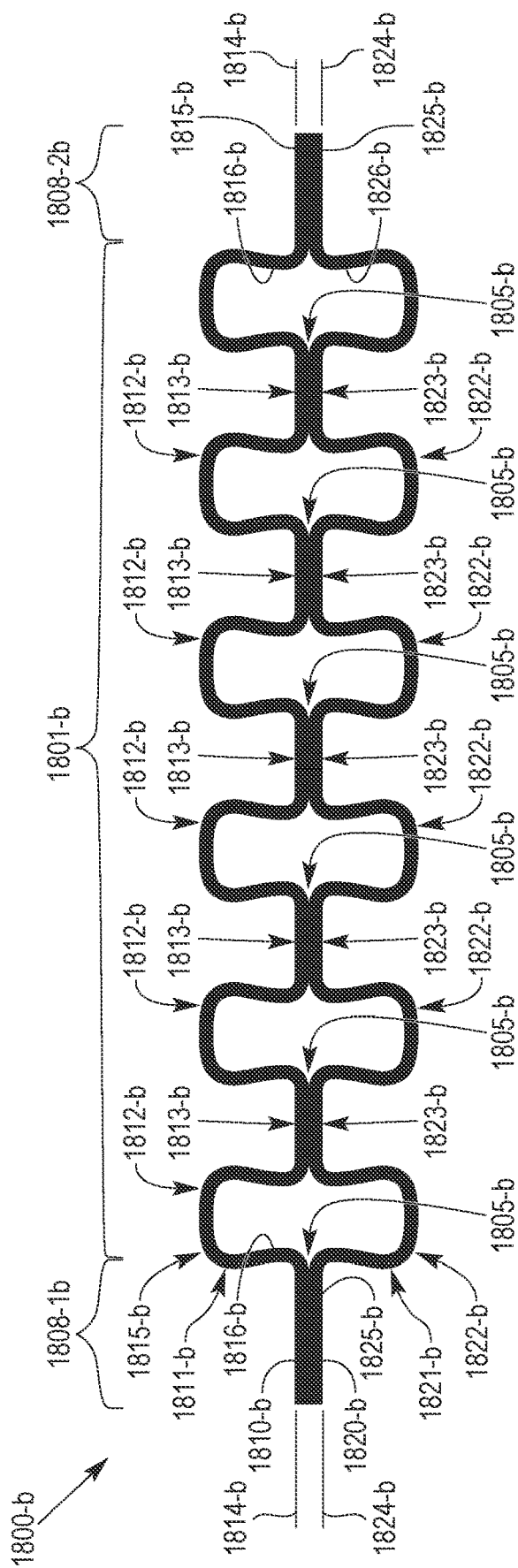
FIG. 18D illustrates an enlarged end view of a laminate with a patterned area formed by first and second substrates having deformed portions forming discrete protrusions and undeformed portions forming regions in the plane of the first and second substrates, wherein the first and second substrates are directly connected at attachment areas within the regions in the plane of the first and second substrates.

FIG. 18D illustrates an enlarged end view of a laminate 1800-*b* formed by a first nonwoven substrate 1810-*b*, and a second substrate 1820-*b*. The laminate 1800-*b* of FIG. 18D is configured in the same way as the laminate 1800-*a* of FIG. 18C, with like-numbered elements configured in the same way, except as described differently below. For the embodiment shown in FIG. 18D, each of the attachment areas 1805-*b* is directly connected to the first region on the first lower surface 1816-*b* of the first nonwoven substrate 1810-*b* and the second region on the second lower surface 1826-*b* of the second substrate 1820-*b*. The first region surrounds the first protrusions 1811-*b* in the first plane 1814-*b* of the first nonwoven substrate 1810-*b*. The first region includes the bases 1813-*b* of the first protrusions 1811-*b* in the deformed region 1801-*b* and the undeformed regions 1808-1*a* and 1808-2*a*. The second region surrounds the second protrusions 1821-*b* in the second plane 1824-*b* of the second nonwoven substrate 1820-*b*. The second region includes the bases 1823-*b* of the second protrusions 1821-*b* in the deformed region 1801-*b* and the undeformed regions 1808-1*b*, 1808-2*b*. Each of the attachment areas 1805-*b* directly connects the bases 1813-*b* in the first plane 1814-*b* of the first nonwoven substrate 1810-*b* to bases 1823-*b* in the second plane 1824-*b* of the second substrate 1820-*b*. As described above and shown in FIG. 18D, the first and second regions includes the undeformed regions 1808-1*b* and 1808-2*b* such that the first nonwoven substrate 1810-*b* and the second substrate 1820-*b* are in contact with each other and are directly or indirectly joined to each other in the undeformed regions 1808-1*b* and 1808-2*b*.

The nonwoven materials having discrete protrusions described above are made by a method comprising the steps of: a) providing at least one precursor nonwoven web; b) providing an apparatus comprising a pair of forming members comprising a first forming member (a "male" forming member) and a second forming member (a "female" forming member); and c) placing the precursor nonwoven web(s) between the forming members and mechanically deforming the precursor nonwoven web(s) with the forming members. The forming members have a machine direction (MD) orientation and a cross-machine direction (CD) orientation.

The first and second forming members can be plates, rolls, belts, or any other suitable types of forming members. In some embodiments, it may be desirable to modify the apparatus for incrementally stretching a web described in U.S. Pat. No. 8,021,591, Curro, et al. entitled "Method and Apparatus for Incrementally Stretching a Web" by providing the activation members described therein with the forming elements of the type described herein. In the embodiment of the apparatus 100 shown in FIG. 19, the first and second forming members 102 and 104 are in the form of non-deformable, meshing, counter-rotating rolls that form a nip 106 therebetween. The precursor web(s) is/are fed into the nip 106 between the rolls 102 and 104. Although the space between the rolls 102 and 104 is described herein as a nip, in some cases, it may be desirable to avoid compressing the precursor web(s) to the extent possible.

The first forming member (such as "male roll") 102 has a surface comprising a plurality of first forming elements which comprise discrete, spaced apart male forming elements 112. The male forming elements are spaced apart in the machine direction and in the cross-machine direction. The term "discrete" as used herein refers to an element that is discontinuous in both the machine direction and in the cross-machine direction.

Figure 19:
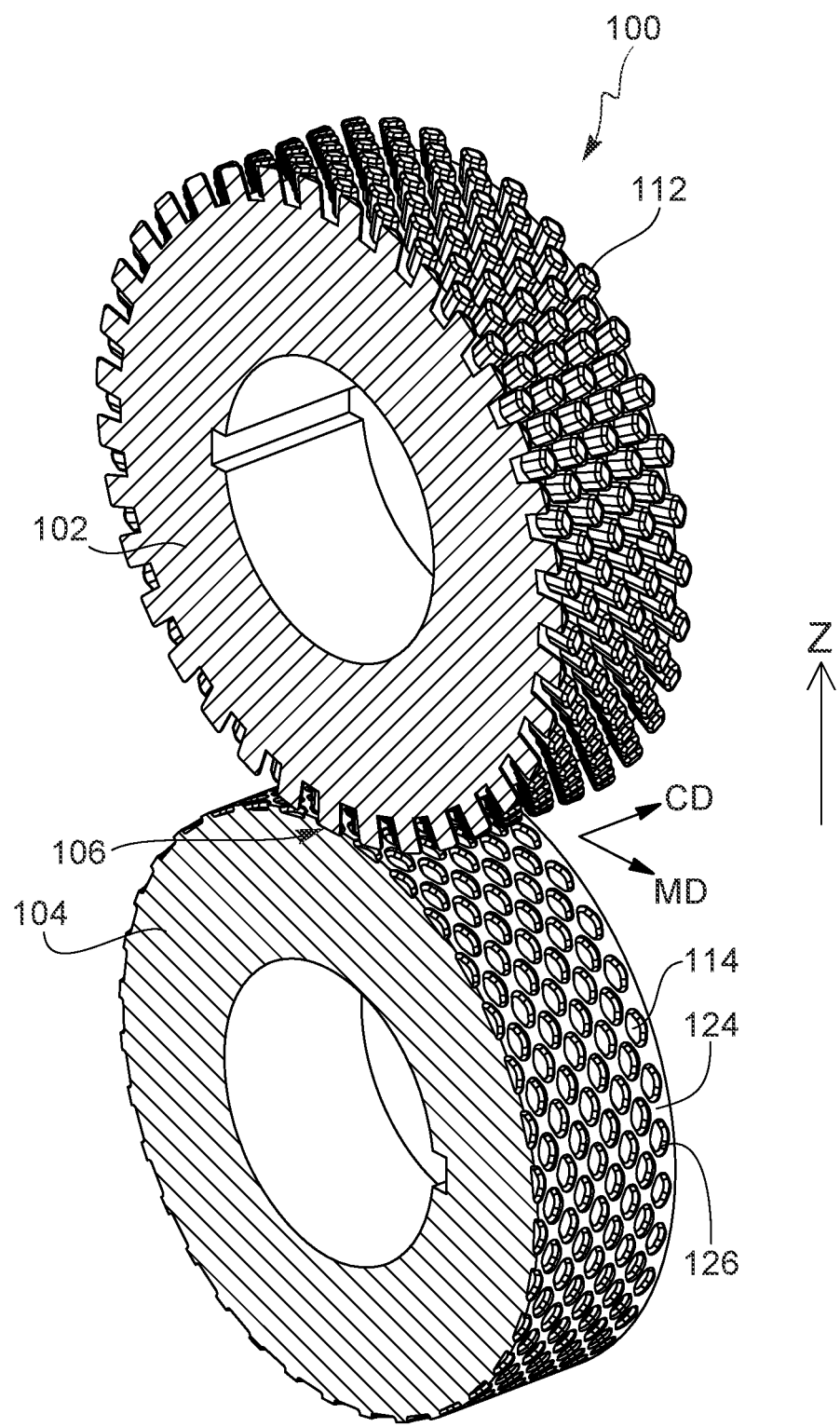
FIG. 19 is a perspective view of an example of an apparatus for forming discrete spaced apart protrusions in a nonwoven substrate.

As shown in FIG. 19, the second forming member (such as "female roll") 104 has a surface 124 having a plurality of cavities or recesses 114 therein. The recesses 114 are aligned and configured to receive the male forming elements 112 therein. Thus, the male forming elements 112 mate with the recesses 114 so that a single male forming element 112 fits within the periphery of a single recess 114, and at least partially within the recess 114 in the z-direction. The recesses 114 have a plan view periphery 126 that is larger than the plan view periphery of the male elements 112. As a result, the recess 114 on the female roll may completely encompass the discrete male element 112 when the rolls 102 and 104 are intermeshed.

FIG. 20 is an assembly diagram illustrating a machine 2002 with four solid state formation rolls, which are a first patterning roll 2060, a second patterning roll 2070, a third patterning roll 2080, and a fourth patterning roll 2090, wherein the machine incrementally stretches a first substrate 2010 and a second substrate 2020 and joins the substrates 2010 and 2020 together to form a bonded laminate 2000. The first and third patterning rolls 2060 and 2080 incrementally stretch the first substrate 2010 forming a plurality of protrusions in the first substrate 2010; the second and fourth patterning rolls 2070 and 2090 incrementally stretch the second substrate 2020 forming a plurality of discrete spaced apart protrusions in the second substrate 2020. While the first substrate 2010 is engaged with the first patterning roll 2060 and while the second substrate 2020 is engaged with the second patterning roll 2070, the first and second patterning rolls 2060 and 2070 join the first and second substrates 2010 and 2020 at the distal ends of the protrusions to form the laminate 2000. In FIG. 20, the overall machine direction for the first substrate 2010 is shown on the left as an arrow pointing to the right and the overall machine direction for the second substrate 2020 is shown on the right as an arrow pointing to the left; however, for each of these substrates, the precise machine direction at any particular point is defined by the path of the substrate as it travels through the machine.

The machine 2002 of FIG. 20 is configured in the same way as the machine 902 of FIG. 9, with like-numbered elements configured in the same way, except as described differently below. On the first patterning roll 2060, the male elements 2061 are discrete spaced apart male elements spaced apart in the machine direction and the cross-machine direction. The second patterning roll 2070 includes male elements 2071 and is configured in the same way as the first patterning roll 2060, except that the roll 2070 rotates 2070-r counterclockwise around an axis 2075 while roll 2060 rotates 2060-r clockwise around axis 2065. The rolls 2060 and 2070 are unmated joining rolls, with respect to each other, and are registered with each other in both the machine direction and the cross direction, to enable the connection of the substrates 2010 and 2020.

The third patterning roll 2080 has a surface 2124 having a plurality of cavities or recesses 2081 therein. The recesses 2081 are discrete recesses spaced apart in the machine direction and the cross-machine direction and aligned and configured to receive the male forming elements 2061 therein. The third patterning roll 2080 is mated to the first patterning roll 2060, and the third patterning roll 2080 is registered to the first patterning roll 2060 in both the machine direction and the cross direction, to enable the incremental stretching of the first substrate 2010 forming discrete spaced apart protrusions therein.

The fourth patterning roll 2090 includes recesses 2091 and is configured in the same way as the third patterning roll 2080, except that the roll 2090 rotates 2090-r clockwise around an axis 2095 while patterning roll 2080 rotates counterclockwise around an axis 2085. The fourth patterning roll 2090 is mated to the second patterning roll 2070, and the fourth patterning roll 2090 is registered to the second patterning roll 2070 in both the machine direction and the cross direction, to enable the incremental stretching of the second substrate 2020 forming discrete spaced apart protrusions therein.

In various embodiments, the machine 2002 of FIG. 20 can be configured according to any alternative machine embodiments disclosed herein, in any workable combination.

FIG. 21 is an assembly diagram illustrating a machine 2102 with four solid state formation rolls configured in the same way as the machine 2002 of FIG. 20; however, the rolls are arranged such that first and second patterning rolls 2160 and 2170 include cavities or recesses while the third and fourth patterning rolls 2180 and 2190 include a plurality of discrete spaced apart protrusions. The first and third patterning rolls 2160 and 2180 incrementally stretch the first substrate 2110 forming a plurality of protrusions in the first substrate 2110 and the second and fourth patterning rolls 2170 and 2190 incrementally stretch the second substrate 2120 forming a plurality of discrete spaced apart protrusions in the second substrate 2120. While the first substrate 2110 is engaged with the first patterning roll 2160 and while the second substrate 2120 is engaged with the second patterning roll 2170, the first and second patterning rolls 2160 and 2170 join the first and second substrates 2110 and 2120 at the first and second regions forming the bases of the protrusions of the first and second substrates 2110 and 2120.

As shown in FIG. 21, the first patterning roll 2160 includes discrete cavities or recesses 2061 spaced apart in the machine direction and the cross-machine direction. The second patterning roll 2170 includes recesses 2071 and is configured in the same way as the first patterning roll 2160, except that the roll 2170 rotates 2170-r counterclockwise around an axis 2175 while roll 2160 rotates 2160-r clockwise around axis 2165. The rolls 2160 and 2170 are unmated joining rolls, with respect to each other, and are registered with each other in both the machine direction and the cross direction, to enable the connection of the substrates 2110 and 2120.

The third patterning roll 2180 has an outer surface having a plurality of male elements 2181 therein. The male elements 2181 are discrete male elements spaced apart in the machine direction and the cross-machine direction and aligned and configured to penetrate the recesses 2161. The third patterning roll 2180 is mated to the first patterning roll 2160, and the third patterning roll 2180 is registered to the first patterning roll 2160 in both the machine direction and the cross direction, to enable the incremental stretching of the first substrate 2010 forming discrete spaced apart protrusions therein.

The fourth patterning roll 2190 includes a plurality of male elements 2191 and is configured in the same way as the third patterning roll 2180, except that the roll 2190 rotates 2190-r clockwise around an axis 2195 while patterning roll 2180 rotates counterclockwise around an axis 2185. The fourth patterning roll 2190 is mated to the second patterning roll 2170, and the fourth patterning roll 2190 is registered to the second patterning roll 2170 in both the machine direction and the cross direction, to enable the incremental stretching of the second substrate 2020 forming discrete spaced apart protrusions therein.

In various embodiments, the machine 2102 of FIG. 21 can be configured according to any alternative machine embodiments disclosed herein, in any workable combination.

Bonded formed laminates of the present disclosure can be made from multiple layers of formed substrates, and can offer significant improvements over unformed, single layer substrates, including: greater resistance to bending, improved resilience to compression, directionally oriented responses to tensile loads, better aesthetics, enhanced structural properties, thicker portions, and designed patterns, without relying on more expensive polymers and/or high concentrations of substrate additives; as a result, such bonded formed laminates offer significant improvements at a reasonable cost, when compared with unformed, single layer substrates.

Test Method to Measure Thickness Under Compression
Sample Preparation

Three different structures of similar basis weight were produced using 3 different SELFing techniques:
Sample 1: 2 layers of 40 gsm nonwoven SELFed individually and then bonded at the distal ends of the protrusions (tufts) to form a bonded structure
Sample 2: 2 layers of 40 gsm nonwoven stacked on top of one-another and SELFed together in a single step to form a dual-layer nested structure
Sample 3: 1 layer of 80 gsm nonwoven SELFed The 40 gsm and 80 gsm nonwovens were bicomponent nonwoven produced by Fitesa using a 50/50 concentric sheath core design with PE on the sheath and PP in the core, and thermal point bonded.

All samples were SELFed at low speed (~25 fpm) using a 60 pitch diamond-shaped SELF pattern at a depth of engagement of 0.100" (2.54 mm) depth of engagement. The bonded structure was bonded using heat and pressure. The SELF rolls were set to 245° F., with a surface temperature of 225° F.

DMA Method

To measure the height and stiffness of the samples, unconfined compression tests are performed on a Dynamic Mechanical Analyzer (DMA), which should have the following minimum specifications:
Two circular compression plates, each 40 mm in diameter (0.0012566 m2 area) and having a flat surface
Maximum force of 18 N
Force resolution of 10 µN
Strain resolution of 1 µm
Modulus precision of ±1%
Furnace or oven capable of heating to 40° C. or higher
Isothermal stability of ±0.1° C.

For example, a suitable instrument is a TA Instruments Q800 Dynamic Mechanical Analyzer (DMA) or equivalent instrument.

A minimum of two specimens are tested for each sample. Each specimen is cut with a hammer-driven (arch) circular punch having a diameter of 40 mm. The specimen is weighed to the nearest 0.001 grams so the basis weight can be calculated.

Compression plates are installed so that their flat surfaces are aligned and parallel. The instrument is calibrated according to the manufacturer's instructions such that the load cell is tared, and when the two plates are in contact, the instrument reads a gap of 0 mm. The data acquisition rate is set to 10 Hz. The gap between the plates is set to be greater than the unrestrained thickness of the test specimen. The as-prepared specimen is inserted (centered) between the plates, and the plates are moved towards each other until a force of 0.1256 N (0.1 kPa) is reached.

The DMA furnace is then closed around the specimen and the test is initiated. The data storage is turned on. The height, temperature and applied force vs. time is recorded during all segments of the protocol, and specific data points are pulled from the data set as specified in the steps below. The segments are as follows:

The specimen is heated to a temperature of 40° C. at a rate of approximately 1° C./min while still under a force of 0.1256 N (0.1 kPa).

The specimen is allowed to equilibrate at 40° C. and 0.1 kPa for an additional 2 minutes. The initial height, H1, is taken at the end of this step.

The specimen is compressed in controlled-force mode to a static force of 2.6 N (2.07 kPa), which is then held constant for 10 minutes. H2 is taken at the end of this step.

The force is decreased to 0.1256N (0.1 kPa) and held constant for 5 minutes. H3 is taken at the end of this step.

The specimen is compressed in controlled-force mode to a static force of 17.4 N (13.8 kPa), which is then held constant for 10 minutes. H4 is taken at the end of this step.

The force is decreased to 0.1256N (0.1 kPa) and held constant for 5 minutes. H5 is taken at the end of this step.

Basis weight is calculated by dividing the weight by the area and is reported in units of g/m2.

The stiffness is calculated by dividing the force applied by the height displacement that the sample undergoes when the force is applied, in units of N/m. Stiffness S1 is the stiffness of the sample when the 2.6 N force is applied. It is calculated by dividing 2.6/(H1−H2), where the heights are in units of meters. Stiffness S2 is the stiffness of the sample when the 17.4 N force is applied. It is calculated by dividing 17.4/(H3−H4), where the heights are in units of meters.

Results

The table below shows the average heights and calculated stiffnesses for each of the samples.

| | Sample 1: Tip-2-Tip* | Sample 2: Dual layer | Sample 3: Single Layer |
|---|---|---|---|
| Ave Basis Weight (g/m²) | 82.8 | 78.8 | 82.8 |
| Ave H1 (mm) | 2.353 | 1.741 | 1.793 |
| Ave H2 (mm) | 0.897 | 0.824 | 0.898 |
| Ave H3 (mm) | 1.693 | 1.468 | 1.514 |
| Ave H4 (mm) | 0.423 | 0.389 | 0.412 |
| Ave H5 (mm) | 1.479 | 1.298 | 1.279 |
| Ave S1 (N/m) | 1,789 | 2,835 | 2,910 |
| Ave S2 (N/m) | 13,703 | 16,137 | 15,859 |

Tip-2-Tip refers to a laminate where the distal ends of the protrusions formed in a first substrate layer are bonded to the distal ends of the protrusions formed in a second substrate layer.

Discussion

The data table shows that sample 1 (tip-2-tip) has a higher initial height (H1) than sample 2 (dual layer) because the 2 layers are SELF'ed separately and bonded in a way that does not allow the layers to nest with one-another, like in the dual-layer sample. The sample is very lofty, but is still very compressible, resulting in the lowest initial stiffness (S1) of the samples. After undergoing compression and recovery, sample 1 (tip-2-tip) still has the greatest height (H3—after 2.1 kPa, H5 after 13.8 kPa) and the lowest stiffness (S2—after 2.1 kPa) of all of the samples. This is surprising because materials that are stiffer, typically recover from compression much better than samples that are less stiff. The data show the bonding process can create a structure that is very soft and lofty, both before and after compression.

Definitions

As used herein, the term "Depth of Engagement" (DOE) is a measure of the level of intermeshing of two rolls measured from the outermost surface of the first roll to the outermost surface of the second roll.

As used herein, the term "Pitch" is the distance between adjacent rows of male forming elements on a patterning roll as described herein.

As used herein, when the term "about" modifies a particular value, the term refers to a range equal to the particular value, plus or minus twenty percent (+/−20%). For any of the embodiments disclosed herein, any disclosure of a particular value, can, in various alternate embodiments, also be understood as a disclosure of a range equal to about that particular value (i.e. +/−20%).

As used herein, when the term "approximately" modifies a particular value, the term refers to a range equal to the particular value, plus or minus fifteen percent (+/−15%). For any of the embodiments disclosed herein, any disclosure of a particular value, can, in various alternate embodiments, also be understood as a disclosure of a range equal to approximately that particular value (i.e. +/−15%).

As used herein, the term "benefit agent" refers to a chemistry (in solid or liquid form) that is disposed in or on the structure of a material in order for the chemistry to deliver one or more distinct functions, such as consumer noticeable effects; examples of benefit agents include: abrasives, absorbents, activators, additives, antibacterials, antifungals, antimicrobials, antioxidants, attractants, bleaches, brighteners, carriers, catalysts, chelators, cleaning agents, colorants, conditioners, desiccants, detergents, diluents, dispersants, dyes, enzymes, exfoliants, fertilizers, flavors or flavonoids, foaming agents, fragrances, herbicides, humectants, inhibitors, minerals, modifiers, moisturizers, moldicides, nutraceuticals, odor absorbent, oils, oxidizers, perfumes, pesticides, pharmaceuticals, phase change materials, pigments, plasticizers, preservatives, processing aids, purifiers, rinses, scavengers, scrubbers, sensates, sequestrants, shampoos, silicones, softeners, solvents, stabilizers, surfactants, thickeners, treatments, vitamins, waxes, and any other kind of benefit agent known in the art, in any workable combination.

As used herein, the term "like-numbered" refers to similar alphanumeric labels for corresponding elements, as described below. Like-numbered elements have labels with the same last two digits; for example, one element with a label ending in the digits 20 and another element with a label ending in the digits 20 are like-numbered. Like-numbered elements can have labels with differing leading digit(s), wherein that leading digit(s) matches the number for its Figure; as an example, an element of FIG. 3 labeled 320 and an element of FIG. 4 labeled 420 are like-numbered. Like-numbered elements can have labels with a suffix (i.e. the portion of the label following the dash symbol) that is the same or possibly different (e.g. corresponding with a particular embodiment); for example, a first embodiment of an element in FIG. 3A labeled 320-a and a second embodiment of an element in FIG. 3B labeled 320-b, are like numbered.

As used herein, when the term "nearly" modifies a particular value, the term refers to a range equal to the particular value, plus or minus five percent (+/−5%). For any of the embodiments disclosed herein, any disclosure of a particular value, can, in various alternate embodiments, also be understood as a disclosure of a range equal to approximately that particular value (i.e. +/−5%).

As used herein, the term "overall width of an attachment area" refers to the overall distance between farthest apart portions of the attachment area, wherein the overall width is measured linearly, parallel to a central plane of the laminate and perpendicular to the overall orientations of the attachment area, as described and illustrated in connection with FIGS. 4 through 7 inclusive and FIG. 17. For an attachment area formed by adhering, the overall width is the measured width of the attaching adhesive as illustrated in FIG. 17 as the width of attachment areas 1930. For an attachment area formed by fusing, the overall width is the measured width of the fused portions. For the embodiment where distal ends of protrusions are attached, the attachment area is shown as 405-a and 405-b in FIGS. 4A and 4B. For the embodiment where bases of protrusions are attached, the attachment area is indicated as 605-a and 605-b in FIGS. 6A and 6B.

As used herein, the term "solid state formation" refers to a process or equipment in which a mechanical force is exerted upon a substrate (e.g. film), which is in a solid state, wherein the force is applied by one or more rigid protrusions, which contact and permanently deform portions of the substrate by incremental stretching. Examples of solid state formation equipment include patterning rolls, patterning plates, and/or patterning belts with discrete and/or continuous rigid protrusions for engaging with and deforming one or more substrates of material, wherein the protrusions may be of any kind known in the art (e.g. fins, ridges, rings, rods, teeth, etc.), having any convenient size and proportions (e.g. uniform height, variable heights, etc.), and any overall shape known in the art (e.g. conical, cuboid, cylindrical, prismatic, pyramidal, etc.), along with any particular tip shape (e.g. flat, pointed, rounded, sharp, etc.), wherein the protrusions extend out from a base over part, parts, or all of the patterning roll/plate/belt. In particular, it contemplates that any of the patterning rolls disclosed herein can be replaced by a patterning roll or patterning belt, as known in the art of solid state formation. Notably, solid state formation of a film based substrate differs from other substrate formation processes such as molding (where substrates are shaped while in a semi-molten or molten state), wet-laid processes (where a wet substrate of fibers is shaped before being dried), and embossing (where a pattern of low-strain deformations is made in a substrate by using a patterning roll to press the substrate against a flat or deformable roll).

Any embodiment of substrate made of films, as described herein, can be made using various solid-state formation processes known in the art, including any processes applicable to films, which are disclosed in any of the following, each of which is incorporated by reference:

As used herein, when the term "substantially" modifies a particular value, the term refers to a range equal to the particular value, plus or minus ten percent (+/−10%). For any of the embodiments disclosed herein, any disclosure of a particular value, can, in various alternate embodiments, also be understood as a disclosure of a range equal to approximately that particular value (i.e. +/−10%).

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

Every document cited herein, including any cross referenced or related patent or application and any patent application or patent to which this application claims priority or benefit thereof, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A laminate comprising:
   a first nonwoven formed substrate having a first plane, a first upper surface, a first lower surface and a plurality of first male protrusions that extend out of the first plane on the first upper surface, each first protrusion having a first distal end and a first sidewall connecting the first distal end to the first upper surface;
   a second formed substrate having a second plane, a second upper surface, a second lower surface and a plurality of second male protrusions that extend out of the second plane on the second upper surface, each second protrusion having a second distal end and a second sidewall connecting the second distal end to the second upper surface; and
   a plurality of attachment areas connecting the first nonwoven formed substrate to the second formed substrate, wherein each of the attachment areas is directly connected to the first distal ends of the first male protrusions and the second distal ends of the second male protrusions wherein a void is created by the unattached portions of the first and second formed substrates adjacent attachment areas, and wherein the first nonwoven formed substrate and second formed substrate are in contact with each other only at the connection of first distal ends of the first male protrusions and the second distal ends of the second male protrusions, and further wherein the first protrusion and the second protrusion mirror one another about an imaginary horizontal line where the first distal end connects to the second distal end.

2. The laminate of claim 1, wherein the plurality of first protrusions and the plurality of second protrusions are discrete.

3. The laminate of claim 2, wherein the first nonwoven formed substrate comprises a first pathway in the first plane surrounding the plurality of first protrusions and a first width in a cross-machine direction and wherein the first pathway forms a continuous network that spans the width of the first nonwoven formed substrate.

4. The laminate of claim 2, wherein the second formed substrate comprises a second pathway in the second plane surrounding the plurality of second protrusions and a second width in a cross-machine direction and wherein the second pathway forms a continuous network that spans the second width of the second formed substrate.

5. The laminate of claim 1, comprising a third layer disposed between the first nonwoven formed substrate and the second formed substrate.

6. The laminate of claim 5, wherein the third layer comprises cellulose.

7. The laminate of claim 5, wherein the third layer is an inelastic layer.

8. The laminate of claim 1, comprising a third layer disposed on either the first lower surface or the second lower surface.

9. The laminate of claim 8, wherein the third layer comprises cellulose.

10. The laminate of claim 8, wherein the third layer is an inelastic layer.

11. The laminate of claim 2, wherein the first protrusions are bulbous protrusions.

12. The laminate of claim 2, wherein the first protrusions comprise looped aligned fibers.

* * * * *